United States Patent
Yon et al.

(10) Patent No.: US 12,044,577 B2
(45) Date of Patent: Jul. 23, 2024

(54) HIGH-SENSITIVITY ELECTROMAGNETIC RADIATION DETECTION COMPONENT AND METHOD FOR MANUFACTURING SUCH A COMPONENT

(71) Applicant: COMMISSARIAT A L'ENERGIE ATOMIQUE ET AUX ENERGIES ALTERNATIVES, Paris (FR)

(72) Inventors: Jean-Jacques Yon, Grenoble (FR); Antoine Albouy, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 227 days.

(21) Appl. No.: 17/785,566

(22) PCT Filed: Dec. 16, 2020

(86) PCT No.: PCT/FR2020/052462
§ 371 (c)(1),
(2) Date: Jun. 15, 2022

(87) PCT Pub. No.: WO2021/123616
PCT Pub. Date: Jun. 24, 2021

(65) Prior Publication Data
US 2023/0012423 A1    Jan. 12, 2023

(30) Foreign Application Priority Data
Dec. 19, 2019    (FR) .................................... 19 14784

(51) Int. Cl.
*G01J 5/02* (2022.01)
*G01J 5/08* (2022.01)
*G01J 5/22* (2006.01)

(52) U.S. Cl.
CPC ............. *G01J 5/024* (2013.01); *G01J 5/0853* (2013.01); *G01J 5/22* (2013.01)

(58) Field of Classification Search
CPC .. G01J 5/024; G01J 5/0853; G01J 5/22; G01J 5/20
See application file for complete search history.

(56) References Cited

U.S. PATENT DOCUMENTS 10,732,050 B2 *  8/2020  Yon ...................... G01J 5/0853
11,489,067 B2 * 11/2022  Buckley ................ H01L 29/207
(Continued)

FOREIGN PATENT DOCUMENTS

| FR | 3 056 292 A1 | 3/2018 | |
|----|---|---|---|
| JP | 2015070150 A * | 4/2015 | |
| JP | 3056292 B1 * | 11/2020 | ............ G01J 5/0853 |

OTHER PUBLICATIONS

International Search Report issued Apr. 23, 2021 in PCT/FR2020/052462, filed on Dec. 16, 2020, 2 pages.
(Continued)

*Primary Examiner* — David P Porta
*Assistant Examiner* — Gisselle M Gutierrez
(74) *Attorney, Agent, or Firm* — Oblon, McClelland, Maier & Neustadt, L.L.P.

(57) ABSTRACT

A component for detecting electromagnetic radiation includes a detection structure and a supply circuit for the detection structure. The detection structure includes a transistor associated with an absorbent element for detecting the rise in temperature of the absorbent element when electromagnetic radiation is absorbed. The supply circuit is configured to supply the detection structure in operation such that a channel zone of the structure has, at the location of one of its first and the second faces, a layer having carriers of a second type of conductivity opposite to a first type of (Continued)

conductivity of a source zone and of a drain zone of the transistor, the layer being referred to as blocking layer.

16 Claims, 38 Drawing Sheets

(56) References Cited

U.S. PATENT DOCUMENTS

| | | | |
|---|---|---|---|
| 2019/0051787 A1* | 2/2019 | Leduc | G01J 5/024 |
| 2019/0271598 A1* | 9/2019 | Yon | H01L 31/1136 |
| 2020/0168649 A1* | 5/2020 | Ingelberts | H01L 31/103 |
| 2022/0013573 A1* | 1/2022 | Aliane | G01J 5/24 |

OTHER PUBLICATIONS

Joseph et al. "Effect of channel layer doping on the performance of nanoscale DG MOSFETs", 2009 International Conference on Emerging Trends in Electronic and Photonic Devices & Systems (ELECTRO-2009), XP032187986, Dec. 22, 2009, pp. 49-52.

* cited by examiner

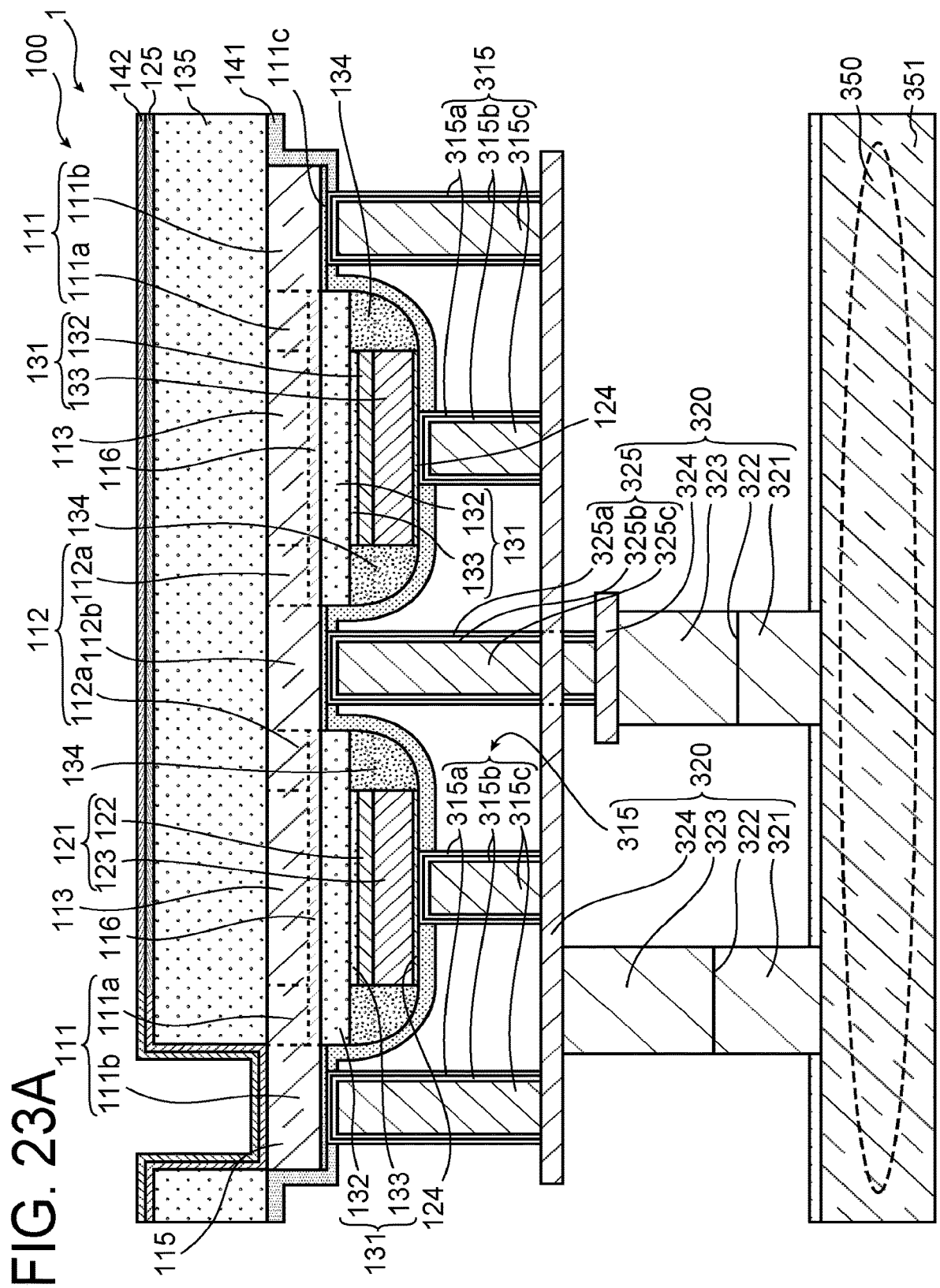

HIGH-SENSITIVITY ELECTROMAGNETIC RADIATION DETECTION COMPONENT AND METHOD FOR MANUFACTURING SUCH A COMPONENT

This invention is the result of a contract awarded by the Ministry of Defense, which has certain rights over it.

TECHNICAL FIELD

The invention relates to the field of optoelectronics and of electromagnetic radiation detection.

The invention is thus more specifically directed to a component for detecting electromagnetic radiation and a method for manufacturing such a component.

PRIOR ART

It is known from document U.S. Ser. No. 16/334,109 to use bolometers based on MOS-FET transducers to enable the detection of electromagnetic radiation.

According to the teaching of document U.S. Ser. No. 16/334,109 such a component comprises a detection structure comprising:
at least one absorbent element configured to absorb the electromagnetic radiation,
a transistor associated with the absorbent element for detecting the rise in temperature of said absorbent element when electromagnetic radiation is absorbed, the transistor comprising:
at least one first semiconductor zone, referred to as source zone, and at least one second zone, referred to as drain zone, with a first type of conductivity,
at least one third semiconductor zone, referred to as channel zone, separating the source zone and the drain zone from one another, having a first and a second face which are opposite faces and extending between the source zone and the drain zone,
a first gate arranged opposite the first face of the channel zone to bias the channel zone, said first gate forming the absorbent element,
a second gate arranged opposite the second face of the channel zone to bias the channel zone.

In accordance with the teaching of this document, the detection structure is connected to a reading circuit, which serves as a circuit for supplying, by means of a first conducting track which biases the source zone, the first gate and the second gate and a second conducting track which biases the drain zone (as a variant, it is also provided that the first gate be short-circuited with the drain). Thus, with such connection of the reading circuit, the reading circuit is configured in order that, in operation of the structure, the voltage of the second gate electrode, generally named back gate, is placed at the same potential as the first gate electrode. Thus, the detection structure is able to operate with a voltage between the main gate and the source zone comprised between 50 and 75 mV.

Although such a detection component makes it possible to provide a component for detecting electromagnetic radiation having increased sensitivity relative to the prior art, it would be worthwhile to provide components for detecting electromagnetic radiation that have improved sensitivity in relation to current detection components, such as that taught by document U.S. Ser. No. 16/334,109.

DISCLOSURE OF THE INVENTION

The invention is directed to mitigating this drawback and is thus directed to providing a detection component that has improved sensitivity relative to components of the prior art and in particular the component taught by document U.S. Ser. No. 16/334,109.

To that end, the invention relates to a component for detecting electromagnetic radiation comprising a detection structure and a supply circuit for said detection structure,
the detection structure comprising:
at least one absorbent element configured to absorb the electromagnetic radiation,
a transistor associated with the absorbent element for detecting the rise in temperature of said absorbent element when electromagnetic radiation is absorbed, the transistor comprising:
at least one first semiconductor zone, referred to as source zone, and at least one second zone, referred to as drain zone, each having a first type of conductivity,
at least one third semiconductor zone, referred to as channel zone, separating the source zone and the drain zone from one another, having a first and a second face which are opposite faces, the first and second faces extending between the source zone and the drain zone,
a first gate electrode arranged opposite the first face of the channel zone to bias the channel zone, said first gate electrode being separated from the channel zone by a first gate dielectric layer,
a second gate electrode arranged opposite the second face of the channel zone to bias the channel zone, said second gate electrode being separated from the channel zone by a second gate dielectric layer, wherein the supply circuit is configured to electrically supply each of the source zone, the drain zone, and the first and second gate electrodes of the detection structure by being connected to these zones, the supply circuit being configured to supply the detection structure in operation such that the channel zone has at the location of one of the first and the second face a layer in which the carriers of a second type of conductivity opposite to the first type of conductivity are preponderant, said layer being referred to as blocking layer.

Such a configuration of the supply circuit, and the blocking layer whose creation it enables, make it possible, as the inventors have discovered, to reduce the effectiveness (the strength) of coupling between the gate voltage and the surface potential of the channel face that is an opposite face to that at which the blocking layer is created. Due to this, the variation in surface potential is less constrained by the gate voltage and is better able to vary with the temperature than that which characterizes the prior art. This therefore results in better sensitivity of the detection structure relative to components of the prior art, such as the component taught by document U.S. Ser. No. 16/334,109, not comprising such a supply circuit.

As shown in the following part of this document in relation with FIGS. 1C and 5C, the inventors have thus obtained an increase in the thermal current coefficient, known by the initialism TCC, which can be greater than $1\% \cdot K^{-1}$.

The feature whereby "the channel zone has at the location of one of the first and the second face a layer" designated blocking layer, must be understood to mean that said blocking layer comprises said face. In other words, the blocking layer extends into the channel zone from said face.

The second gate dielectric layer may have a thickness comprised between 10 and 150 nm, the thickness of the second gate dielectric layer being preferably comprised between 30 and 70 nm.

With such a value of thickness of the second gate dielectric layer, the improvement in sensitivity of the detection component relative to detection components of the prior art is particularly great.

At least one of the first and of the second gate dielectric layer may comprise a first and a second sub-layer of respectively a first and a second dielectric material able to form an electrostatic dipole between them, the first and second materials being preferably and respectively silicon dioxide and alumina.

With such an electrostatic dipole, it is possible to reduce the voltage to apply to said gate electrode in operation and thus reduce the heating by joule effect of the detection structure. Moreover, such a reduction in the voltage to apply makes it possible to envision placing said gate electrode in short-circuit with the source zone, since the electrostatic dipole enables the potential difference to be generated between them.

In a portion of the channel zone provided to form the blocking layer the channel zone may comprise a concentration of doping elements greater than the rest of the channel zone.

Such overdoping of a portion of the channel zone makes it possible to reduce the voltage to apply for forming the blocking layer since the channel zone comprises an excess of majority carriers to enable the formation of said blocking layer. It is thus possible to reduce the voltage to apply to the corresponding gate electrode in operation and thus reduce the heating by joule effect of the detection structure. Moreover, such a reduction in the voltage to apply makes it possible to envision placing said gate electrode in short-circuit with the source zone, since the electrostatic dipole enables the potential difference to be generated between them.

The source zone and the first gate electrode may be short-circuited.

The source zone and the second gate electrode may be short-circuited.

In this way, it is possible to reduce the number of connections to the supply circuit, thereby facilitating the thermal insulation of the connection structure with respect to the supply circuit and a possible support in which said circuit would be arranged.

The drain zone and the second gate electrode may be short-circuited.

The drain zone and the first gate electrode may be short-circuited.

In this way, it is possible to reduce the number of connections to the supply circuit, thereby facilitating the thermal insulation of the connection structure with respect to the supply circuit and a possible support in which said circuit would be arranged.

The channel zone may be of the first conductivity type, the blocking layer being an inversion layer and the second gate electrode is short-circuited with the first gate electrode and with the source zone.

With such a configuration, it is possible to apply zero biasing to the first and second gate electrodes and to the source zone, only the drain zone then being biased.

The channel zone may have the second conductivity type, the blocking layer being an accumulation layer.

The channel zone may be of the first conductivity type, the blocking layer being an inversion layer.

Such configurations correspond respectively to an enhancement transistor and a depletion transistor. It will be noted that this latter configuration is particularly advantageous for providing a detection structure with a relatively low biasing voltage for the first gate, it even being possible, in certain configurations, for this to be zero (i.e. zero potential difference between the source zone and the first gate).

The absorbent element comprises at least one of:
at least one portion of the first gate electrode,
at least one portion of the second gate electrode, and
at least one conducting track connecting the detection structure and the supply circuit.

The invention further relates to a method for manufacturing a component for detecting electromagnetic radiation, comprising the following steps of:
providing a detection structure, the detection structure comprising:
at least one absorbent element configured to absorb the electromagnetic radiation,
a transistor associated with the absorbent element for detecting the rise in temperature of said absorbent element when electromagnetic radiation is absorbed, the transistor comprising:
at least one first semiconductor zone, referred to as source zone, and at least one second semiconductor zone, referred to as drain zone, with a first type of conductivity,
at least one third semiconductor zone, referred to as channel zone, separating the source zone and the drain zone from one another, having a first and a second face which are opposite faces and extending between the source zone and the drain zone,
a first gate electrode arranged opposite the first face of the channel zone to bias the channel zone,
a second gate electrode arranged opposite the second face of the channel zone to bias the channel zone,
providing a supply circuit configured to electrically supply each of the source zone, the drain zone and the first and second gate electrodes of the detection structure,
the method comprising a step of connecting the detection structure with the supply circuit, said step being either independent of the step of providing a detection structure and of providing the supply circuit or concomitant with at least one of these.

In providing the supply circuit, the supply circuit is configured to supply the detection structure in operation such that the channel zone has at the location of one of the first and the second face a layer in which the carriers of a second type of conductivity opposite to the first type of conductivity are preponderant, said layer being referred to as blocking layer.

Such a method makes it possible to provide a component according to the invention and to benefit from the advantages related thereto.

The step of providing the detection structure may comprise a sub-step of forming at least one of the first and the second gate dielectric layer wherein said gate dielectric layer comprises a first and a second sub-layer of respectively a first and a second dielectric material able to form an electrostatic dipole between them, the first and second materials preferably and respectively being silicon dioxide and alumina.

With such an electrostatic dipole, the detection structure may have a corresponding gate electrode voltage that is reduced and thus have reduced joule effect heating relative to detection structures of the prior art. Moreover, such a reduction in the voltage to apply makes it possible placing said gate electrode in short-circuit with the source zone, since the electrostatic dipole enables the potential difference to be generated between them.

The step of providing the detection structure may comprise a sub-step of doping the channel zone so as to form a portion of the channel zone, provided for forming the blocking layer, with a higher concentration of doping elements than the rest of the channel zone.

Such overdoping of a portion of the channel zone enables the detection structure of the component formed to have a reduced voltage to apply for the formation of the blocking layer since the channel zone comprises an excess of majority carriers to enable the formation of said blocking layer. Thus, the detection component so formed can have a reduced voltage to apply to the corresponding gate electrode and thus have reduced heating by joule effect of its detection structure. Moreover, such a reduction in the voltage to apply makes it possible placing said gate electrode in short-circuit with the source zone, since the electrostatic dipole enables the potential difference to be generated between them.

One of the step of forming the detection structure and the step of connecting the detection structure with the supply circuit, may comprise placing the source zone and the first gate electrode in short-circuit.

One of the step of forming the detection structure and the step of connecting the detection structure with the supply circuit, may comprise placing the source zone and the second gate electrode in short-circuit.

One of the step of forming the detection structure and the step of connecting the detection structure with the supply circuit, may comprise placing the drain zone and the second gate electrode in short-circuit.

One of the step of forming the detection structure and the step of connecting the detection structure with the supply circuit, may comprise placing the drain zone and the first gate electrode in short-circuit.

In this way, it is possible for the connection component so formed to have a reduced number of connections between the supply circuit and the detection structure, so facilitating the thermal insulation of the connection structure relative to the supply circuit and a possible support in which said circuit would be arranged.

BRIEF DESCRIPTION OF THE DRAWINGS

The present invention will be better understood on reading the description of example embodiments given purely by way of indication and in no way to be limiting, with reference to the accompanying drawings in which.

Figure 1A:
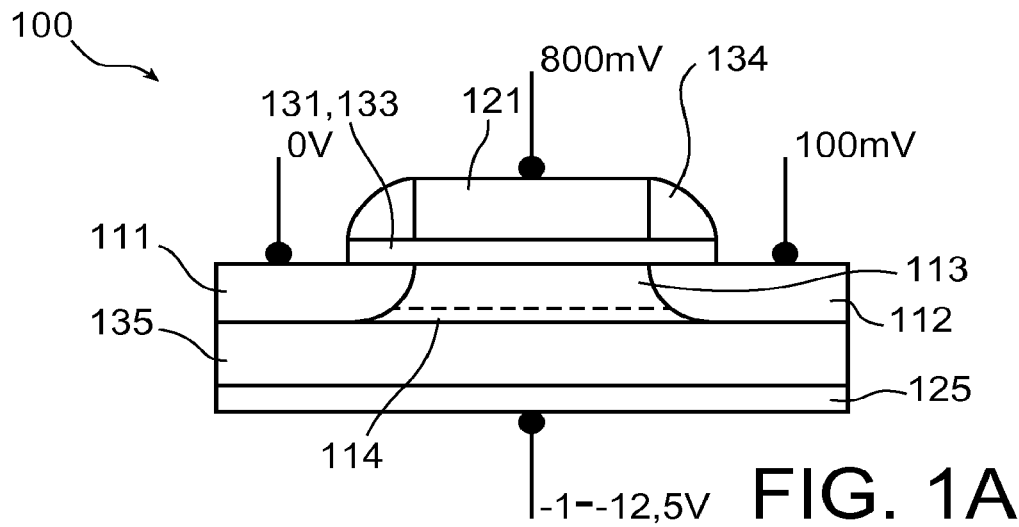
FIGS. 1A to 1C illustrate the principle of operation of a detection component according to a first possibility for the invention with FIG. 1A illustrating by a cross-section view the supply of a detection structure according to this first possibility, FIG. 1B illustrating the operating principle of such a detection structure and FIG. 1C illustrating graphically the variation in the sensitivity of such a detection structure according to the drain current compared with that of a detection structure taught by document U.S. Ser. No. 16/334,109.

The various parts shown in the drawings are not necessarily at a uniform scale, so as to render the drawings easier to read.

The various possibilities (variants and embodiments) must be understood as not being exclusive of each other and may be combined between each other.

DESCRIPTION OF THE EMBODIMENTS

Figure 1B:
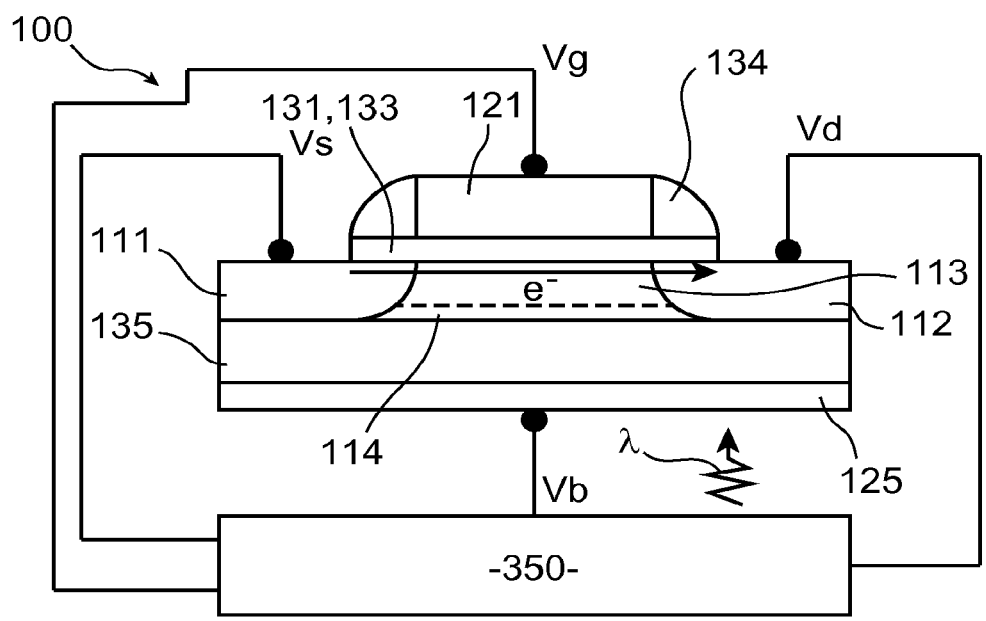

FIGS. 1A and 1B respectively illustrate a cross-section view of a detection structure 100 and of a detection component 1 comprising such a structure according to the principle of the invention, such a detection component being configured for detecting electromagnetic radiation λ.

Such a detection component 1 is directed more particularly to detecting electromagnetic radiation in an infrared wavelength range. Thus, the different values indicated in the embodiments described below concern this practical application, wherein the wavelength concerned is the far infrared, i.e. between 8 and 12 µm. Of course, the person skilled in the art is fully able, based on the present disclosure, to adapt these values to enable, using such a detection structure 100, the optimized detection of electromagnetic radiation in a wavelength range other than that of infrared.

It will be noted that the present invention concerns in particular the detection components comprising a plurality of detection structures arranged in an array with a network pitch of said array of 10 µm or less. Thus, if in the present description, the component is described in relation with a single detection structure, the invention naturally gives the possibility of a component comprising a plurality of detection structures, the person skilled in the art being capable of extrapolating the present teaching for such a configuration.

Principle of the Invention

Thus, according to the principle of the invention, as shown in FIG. 1B, a detection component according to the invention comprises the detection structure 100 and a supply circuit (350) of said detection structure 100, the detection structure 100 comprising:
at least one absorbent element configured to absorb the electromagnetic radiation,
a transistor associated with the absorbent element for detecting the rise in temperature of said absorbent element when electromagnetic radiation λ is absorbed, the transistor comprising:
at least one first semiconductor zone 111, referred to as source zone, and at least one second zone 112, referred to as drain zone, each having a first type of conductivity,
at least one third semiconductor zone 113, referred to as channel zone, separating the source zone 111 and the drain zone 112, from one another, having a first and a second face which are opposite faces, the first and second faces extending between the source zone 111 and the drain zone 112,
a first gate electrode 121 arranged opposite the first face of the channel zone 113 to bias the channel zone 113, the first gate electrode 121 being separated from the first face of the channel zone 113 by a first gate dielectric layer 131,
a second gate electrode 125 arranged opposite the second face of the channel zone 113 to bias the channel zone 113, the second gate electrode 125 being separated from the second face of the channel zone 113 by a second gate dielectric layer 135.

The supply circuit 350 is configured to electrically supply the detection structure 100 at the location of the source zone 111, the drain zone 112, and the first and second gate electrodes 121, 125. More specifically, the supply circuit 350 is configured to supply the detection structure 100 in operation such that the channel zone 113 has at the location of one of the first and the second face a layer 114 in which the carriers of a second type of conductivity opposite to the first type of conductivity are preponderant, said layer 114 being referred to as blocking layer.

Of course, if according to this first possibility for the invention, and according to the other possibilities described in the present document, the supply circuit 350 is configured to electrically supply the detection structure 100 with voltage, it may also be envisioned, without departing from the scope of the invention, for the supply of the structure to be made at least partly with current. Although this variant may not be further described in the present document, it may nevertheless be easily implemented by the person skilled in the art based on the present teaching.

The absorbent element, according to the first possibility illustrated in FIG. 1B, comprises the second gate electrode 125. Of course, in accordance with the teaching of document U.S. Ser. No. 16/334,109, the absorbent element may be provided by another element of the detection structure 100, such as the first gate electrode 121 or interconnection tracks enabling the detection structure 100 to be connected to the supply circuit 350, this absorbent element being in thermal contact with the transistor.

It will be noted that for such a detection component 1, the channel zone may be:

(i) either of the second conductivity type or of intrinsic type, the transistor then being a transistor of NPN or PNP type, and the blocking layer 114 being an accumulation layer.

(ii) or of the first conductivity type with a concentration of majority carriers reduced relative to that of the source zone 111 and of the drain zone 112, the blocking layer then being an inversion layer.

Configuration (ii) is a configuration in which the transistor of the detection structure is a so-called depleted or depletion transistor. Such a transistor, of an N+NN+ or P+PP+ type, is, in the absence of voltage on the gate, in a conducting state, the channel zone being of the same type of conductivity as the source and drain zones. By suitably biasing the gate relative to the source, that is to say generally negatively, in the case of a N+NN+ transistor, and positively, in the case of a P+PP+ transistor, or even with zero bias in both cases, it is then possible to deplete the channel zone, or even inverse the type of conductivity in the latter so as to block the conduction in the channel zone.

In the context of a of a component of electromagnetic radiation detector type, the inventors provide for using a depletion transistor to obtain the desired operating current of the transistor with a zero bias of the gate even in the presence of a blocking layer.

As a matter of fact, the threshold voltage of a transistor without a blocking layer is, for a depletion transistor, negative or close to zero, and, for an enhancement transistor, positive or close to zero. Creating a blocking layer results in increasing the threshold voltage of the transistor. An enhancement transistor is thus not suitable for obtaining an operating current of the transistor with zero gate bias even in the presence of a blocking layer. Using a depletion transistor with a blocking layer, the threshold voltage of which becomes positive or close to zero, thus makes it possible to obtain a desired operating current of the transistor with zero gate bias even in the presence of a blocking layer.

Such provision to use a depletion transistor for detecting electromagnetic radiation according to the bolometer principle is new relative to components of the prior art, such as that provided by document U.S. Ser. No. 16/334,109.

Thus, according to the principle of the invention, the supply voltages provided by the supply circuit 350 to the structure are such that, for arrangement (i), the blocking layer 114 is an accumulation layer, and, for arrangement (ii), the blocking layer is an inversion layer. In other words, for both arrangement (i) and (ii), the blocking layer 114 is a layer in which, in operation of the component, the conduction between the source zone 111 and the drain zone 112, the current is blocked, the current passing through the channel zone 113 having to pass via the rest of the channel zone 113. Therefore, in accordance with the invention, the supply circuit is then configured to supply the detection structure 100 in such a way as to have the rest of the channel zone 113 in inversion, for configuration (i) or in depletion, in neutral conditions or in accumulation, for configuration (ii) according to the voltage applied to the opposite gate to the blocking layer.

Thus the general principle of the invention may be implemented in several ways which are illustrated in FIGS. 1A to 9B with FIGS. 1A to 4B concerning arrangement (i) and FIGS. 5A to 9B concerning conformation (ii).

In describing these different possibilities for the invention, in order to define the relative voltages applied by the supply circuit to the detection structure 100, the features of the exemplary detection structure 100 have been established as follows:

- a source zone 111 and a drain zone 112 of a first conductivity type in which the electrons are majority carriers, that is to say N-doped, and have a concentration of electron donor doping elements equal to $1.10^{20}$ cm$^{-3}$,
- a channel zone 113 having, for the first to the fourth possibilities corresponding to arrangement (i), the second type of conductivity, that is to say P-doped, with a concentration of electron acceptor doping elements of $1.10^{15}$ cm$^{-3}$, and for the fifth to the ninth possibilities corresponding to arrangement (ii), the first type of conductivity with a concentration of electron donor doping elements equal to a concentration between $1.10^{16}$ cm$^{-3}$ and $1.10^{17}$ cm$^{-3}$,
- source 111, drain 112 and channel 113 zones made from silicon and having a thickness of 50 nm,
- a first gate dielectric layer 131 which, unless stated otherwise, has a thickness of 9 nm and is produced from silicon dioxide,
- a second gate dielectric layer 135 having a thickness comprised between 10 nm and 150 nm and produced from silicon dioxide,
- a first gate electrode and a second gate electrode 121, 125 comprising a conductor material of mid-gap type for the channel zone 113.

By "conductor material of mid-gap type" above and in the rest of this document it is meant that the conductor material is chosen so as to have, in the absence of biasing of the structure, its Fermi energy in the forbidden band zone of the third zone and more specifically in the neighborhood of the middle of the forbidden zone of the third zone, typically at an energy level remote from the middle of the forbidden band in the range comprised between −25% and +25% of the gap of the forbidden band. Such a gate configuration is generally known by the person skilled in the art as "mid-gap". Thus, if the third zone is produced from silicon, the "conductor materials of mid-gap type" comprise in particular titanium nitrides, tantalum nitrides and molybdenum silicides.

The features of the detection structure 100 described above have been established for a transistor of N-type. They could be established to adapt to a P-type transistor without departing from the scope of the invention.

It will furthermore be noted that the different values/configuration set out above are only given by way of example to illustrate the different possibilities for the invention, and it is thus possible to use different values/configuration without departing from the scope of the invention, provided that in accordance with the principle of the invention, these latter enable the formation of a blocking layer 114 on supplying the detection structure by the supply circuit. Thus, for example, at least one of the first gate electrode 121 and the second gate electrode 125, thus, or even both of them, cannot comprise conductor material of mid-gap type for the channel zone, without departing from the scope of the invention.

First Possibility

Figure 1C:
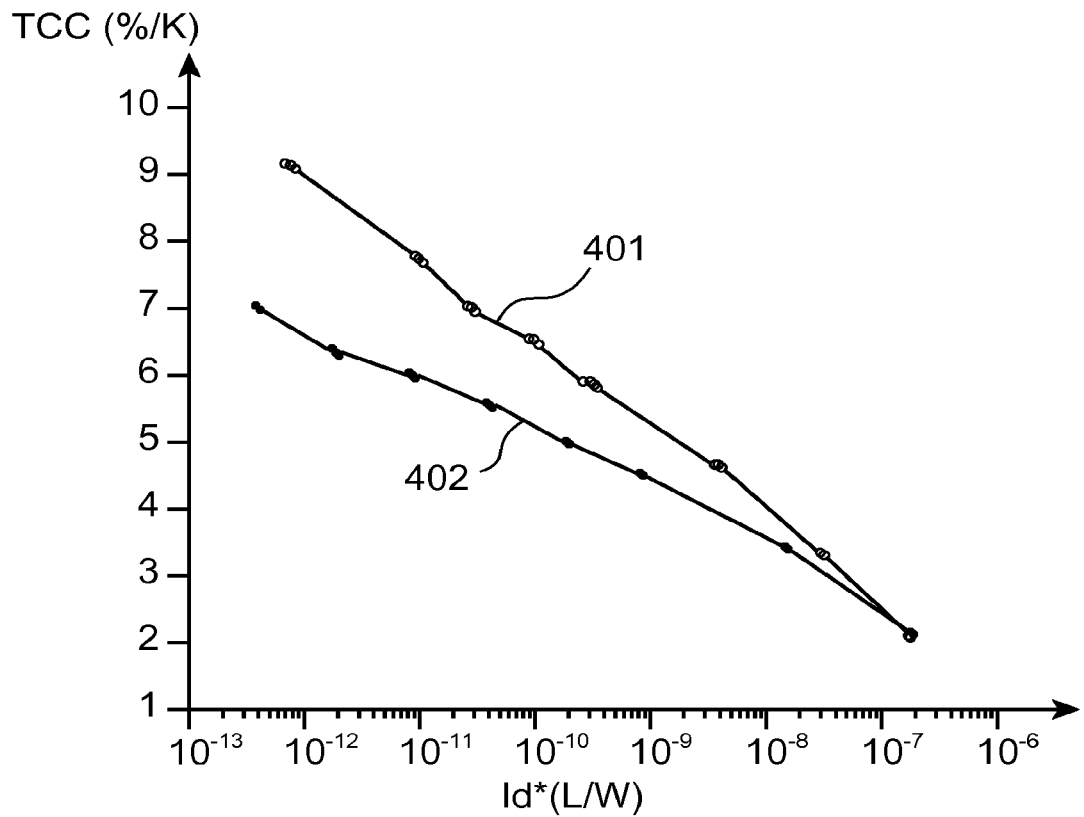

According to a first possibility for the invention, illustrated in FIGS. 1A to 1C, the supply circuit 350 may be arranged to independently electrically supply each of the source zone 111, the drain zone 112, the first electrode 121 and the second electrode 125 and to form the blocking layer 114 at the location of the second face of the channel zone 113.

According to this first possibility and with the exemplary configuration described above in the part "principle of the invention", the supply circuit 350 may be configured to apply in operation:
- a source voltage Vs of zero, 0V, to the source zone 111,
- a drain voltage Vd of 100 mV to the drain zone 112,
- a gate voltage Vg on the first gate electrode 121, provided to adjust the operating current of the transistor, for example a voltage Vg of 800 mV and
- a negative back gate voltage Vb comprised between −1 V and −12.5 to the second gate electrode 125, this gate voltage Vb having to be adapted according to the thickness of the second gate dielectric layer 135.

These values are of course valid solely for the exemplary configuration described in the Principle of the invention and in no way limits the invention. It will thus be noted, for example, that if one of the first and the second gate is not produced from a "mid-gap" material, the corresponding voltage will have to be adjusted.

In this way, the negative back gate voltage Vb makes it possible to create a blocking layer 114 taking the form of an accumulation layer at the location of the second face of the channel zone 113.

According to the principle of the invention and as the inventors have discovered, such a blocking layer 114 makes it possible to reduce the effectiveness (the strength) of coupling between the gate voltage and the surface potential of the channel face that is an opposite face to that at which the blocking layer is created. Due to this, the variation in surface potential is less constrained by the gate voltage and is better able to vary with the temperature than that which characterizes the prior art. This therefore results in better sensitivity of the detection structure relative to components of the prior art such as that taught by the document U.S. Ser. No. 16/334,109.

Thus, in order to illustrate this improvement in sensitivity, FIG. 1C illustrates the variation in the thermal current coefficient, also known by its initialism TCC, with the transistor current normalized by the width to length ratio of the transistor for a component according to this first possibility, this variation being referenced 401, and for a transistor, having the same characteristics, in accordance with the teaching of document U.S. Ser. No. 16/334,109, this variation being referenced 402. The features in common are: in addition to those already set out, a channel length of 500 nm, in order to normalize the current, and a thickness of the second oxide layer of 145 nm.

Thus in FIG. 1C it is observed that, for normalized currents ranging from 100 pA to 1 nA, the increase in the thermal current coefficient for the configuration of the invention is greater than $0.9\% \cdot K^{-1}$ and is of the order of $0.5\% \cdot K^{-1}$ for normalized currents comprised between 10 nA and 50 nA. Moreover, the inventors have identified that this increase is accompanied by a reduction in 1/f noise of the transistor. Thus, with an increase in sensitivity and reduced 1/f noise, a detection component 1 according to the invention has a signal/noise ratio particularly optimized relative to the components of the prior art. This reduction in 1/f noise can be attributed to the use of the blocking layer 114 and is thus also obtained with the other possibilities for the invention.

Second Possibility

Figure 2:
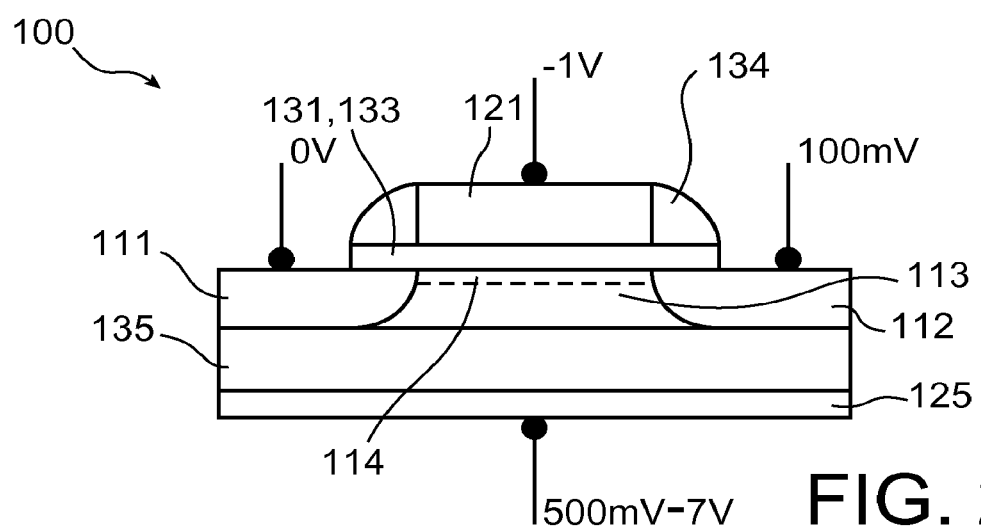
FIG. 2 illustrates the operating principle of a detection component according to a second possibility for the invention by showing, by a cross-section view, the supply of a detection structure according to that second possibility for the invention.

According to a second possibility for the invention illustrated in FIG. 2, the supply circuit 350 may be arranged to independently electrically supply each of the source zone 111, the drain zone 112, the first electrode 121 and the second electrode 125 and to form the blocking layer 114 at the location of the first face of the channel zone 113.

According to this second possibility and with the exemplary configuration described in the part "principle of the invention", the supply circuit 350 may be configured to apply in operation:
- a source voltage Vs of zero, 0V, to the source zone 111,
- a drain voltage Vd of 100 mV to the drain zone 112,
- a gate voltage Vg of −1 V on the first gate electrode 121, and
- a positive back gate voltage Vb comprised between 500 mV and 7 V to the second gate electrode 125, this back gate voltage Vb having to be adapted according to the thickness of the second gate dielectric layer 135 and the operating current of the transistor.

Thus, the negative gate voltage Vb makes it possible to create a blocking layer 114 taking the form of an accumulation layer at the location of the first face of the channel zone 113.

It will be noted that according to a variant of this first and second possibility, the supply circuit 350 may be configured to supply the detection structure according to the first possibility and according to the second possibility, it being possible for the supply circuit 350 to be controlled to pass from one to the other or configured to pass from one to the other according to certain conditions, for example such as conditions that are internal to the component, such as the source-drain current Ids or conditions that are external to the component, such as an instruction for passing from one to the other of the first and second possibility.

Third Possibility

Figure 3:
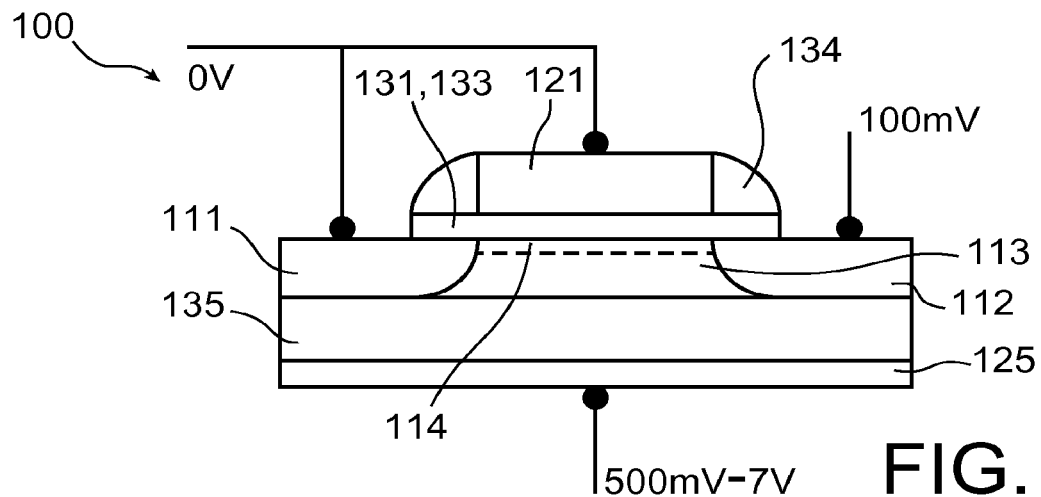
FIG. 3 illustrates the operating principle of a detection component according to a third possibility for the invention by showing, by a cross-section view, the supply of a detection structure according to that third possibility for the invention.

According to a third possibility for the invention illustrated in FIG. 3, the supply circuit 350 may be arranged to apply the same voltage to the source zone 111 and to the first gate electrode 121, the drain zone 112, and the second gate electrode 125 being supplied independently of one another and of the source zone 111/first gate electrode pair, and to form the blocking layer 114 at the location of the first face of the channel layer 113. Furthermore, to enable such biasing, according to this third possibility, the detection structure 100 presents "pre-biasing", that is to say a means for applying an "internal" potential in order to reduce the threshold voltage of the first gate electrode 121, of the blocking layer 114 supplied by:
- either, a first gate dielectric layer 121 comprising a first and a second sub-layer of respectively a first and a second dielectric material suitable for forming together a dipolar interface by the creation of an electrostatic dipole between them,
- or, over-doping a portion of the channel zone provided for forming the blocking layer 114 with electron acceptor doping elements, such as boron or indium atoms obtained by ionic implantation of Boron B, Boron fluoride ions BF2 or indium ions In.

Thus, with such a dipole interface of the first oxide layer of the gate 121 or such an over-doping of a portion of the channel zone 113 provided for forming the blocking layer 114, both equivalent to pre-biasing of the channel zone 113 at the location of its first face, it is possible to have a shift in the threshold voltage of the first gate electrode of +1 V, or even, if these two possibilities are combined, a shift in the threshold voltage of the first gate electrode 121 of +2 V. With such a "pre-biasing" at the location of the first gate electrode 121, this results in it not being necessary to apply a negative voltage to form the blocking layer as is the case with the second possibility.

According to this third possibility for the invention and with the exemplary configuration described in the part "principle of the invention", the supply circuit 350 may be configured to apply in operation:

- a source voltage Vs and gate voltage Vg that is zero, 0V, applied to the source zone 111 and to the first gate electrode 121,
- a drain voltage Vd of 100 mV to the drain zone 112, and
- a positive back gate voltage Vb comprised between 500 mV and 7V to the second gate electrode 125, this back gate voltage Vb having to be adapted according to the thickness of the second gate dielectric layer 135 and the operating current of the transistor.

Such a third possibility has the advantage that, as the source zone 111 and the first gate electrode 121 are short-circuited, it is only necessary to provide three interconnections between the detection structure 100 and the supply circuit 350. In this way, heat exchanges are limited between the detection structure and the supply circuit 350, which may reduce the temperature reached by the absorber and therefore the sensitivity of the detection component 1.

Fourth Possibility

Figure 4A:
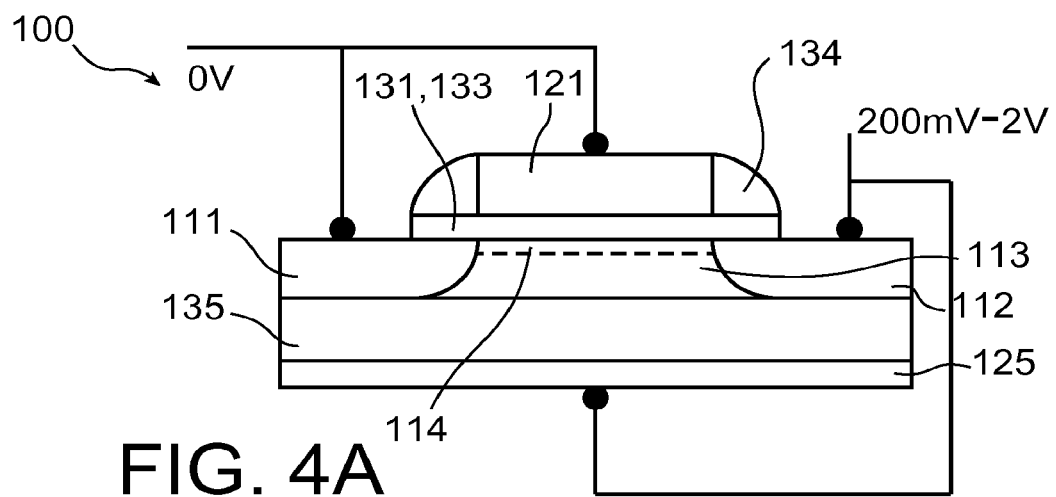
FIGS. 4A and 4B illustrate the operating principle of a detection component according to a fourth possibility for the invention by showing in FIG. 4A, by a cross-section view, the supply of a detection structure according to that fourth possibility for the invention and in FIG. 4B a detection structure with an optimized ratio of channel length L to channel width W.
Figure 4B:
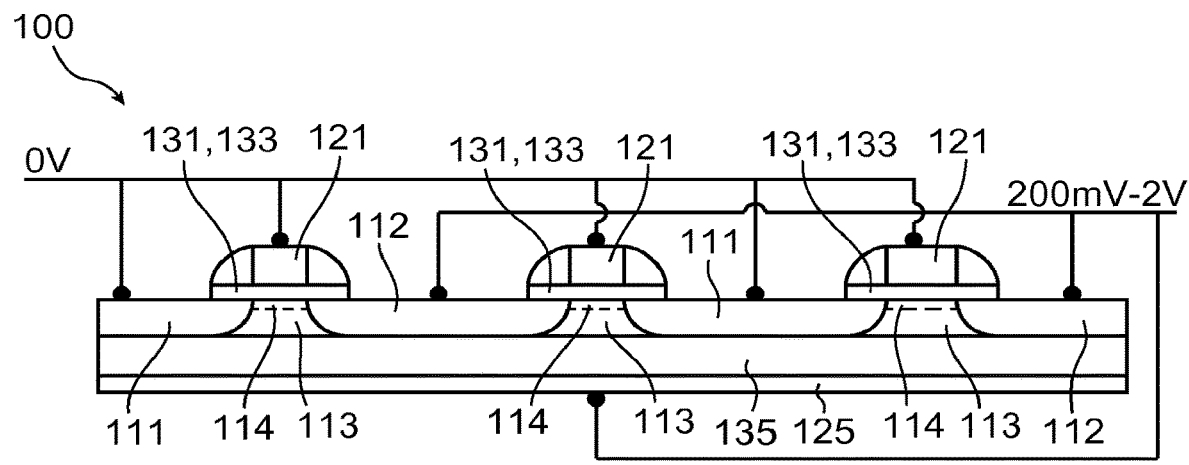

According to a fourth possibility for the invention illustrated in FIGS. 4A and 4B, the supply circuit 350 may be arranged to supply the source zone 111 and the first gate electrode 121 together, to supply the drain zone 112 and the second gate electrode 125 together, and to form the blocking layer 114 at the location of the first face of the channel layer 113. Furthermore, to enable such biasing, according to this fourth possibility, the detection structure 100 has "pre-biasing" of the blocking layer 114 similar to that described in the context of the third possibility.

In accordance with this fourth possibility, in order to minimize the biasing voltage of the second gate electrode 125 and thus the voltage applied to the drain zone 112, the thickness of the second gate dielectric layer 131 is chosen to be relatively low, it being possible for this to be comprised between 20 nm and 50 nm and preferably between 25 and 35 nm, or even substantially equal to 30 nm. In addition, the biasing voltage of the second gate electrode 125 and thus of the voltage applied to the drain zone 112 may also be reduced by optimization of the ratio of the width of the channel zone/to the length of the channel zone, this ratio preferably being greater than 150, or even 250, or even 300.

According to this fourth possibility for the invention and with the exemplary configuration described in the part "principle of the invention", the supply circuit 350 may be configured to apply in operation:

- a source voltage Vs and gate voltage Vg that is zero, 0V, applied to the source zone 111 and to the first gate electrode 121,
- a drain voltage Vd and back gate voltage Vb comprised between 200 mV and 2V applied to the drain zone 11 and to the second gate electrode 125, this voltage having to be configured according to the thickness of the second gate dielectric layer 135 and the operating current of the transistor and thus of the detection structure.

Such a fourth possibility has the advantage that, on account of the source zone 111 and the first gate electrode 121 being short-circuited and the drain zone 112 and the second gate electrode 125 being short-circuited, it is only necessary to provide two interconnections between the detection structure 100 and the supply circuit 350. In this way, heat exchanges are limited between the detection structure and the supply circuit 350, which may reduce the temperature reached by the absorber and therefore the sensitivity of the detection component 1.

FIG. 4B illustrates a particular configuration of the detection structure 100 according to this fourth possibility in which the detection structure 100 has an optimized ratio of width of the channel zone/to the length of the channel zone. Such optimization is obtained here by a triple gate configuration, or "three-tooth comb" (refer to FIG. 16B which illustrates a dual gate example or "two-tooth comb"), the structure comprising a source zone 111 and a drain zone 112 that are doubled and a tripled channel zone. As a matter of fact, as FIG. 4B shows, the detection structure is formed by the succession of a "first" source sub-zone 111, a "first" channel sub-zone 113, a "first" drain sub-zone 112, a "second" channel sub-zone 113, a "second" source sub-zone 111, a "third" channel sub-zone 113 and a "second" drain sub-zone 112.

Of course, in accordance with this example, the person skilled in the art is able to generalize such a configuration and is capable, in order to optimize the ratio of width of the channel zone/to the length of the channel zone, of using a multiple-gate configuration or "multiple-tooth comb", it being possible for the number of gates or "teeth" to be greater than or equal to 2.

Fifth Possibility

The fifth possibility corresponds to the first possibility for the invention applied to a structure comprising a depletion transistor.

Figure 5A:
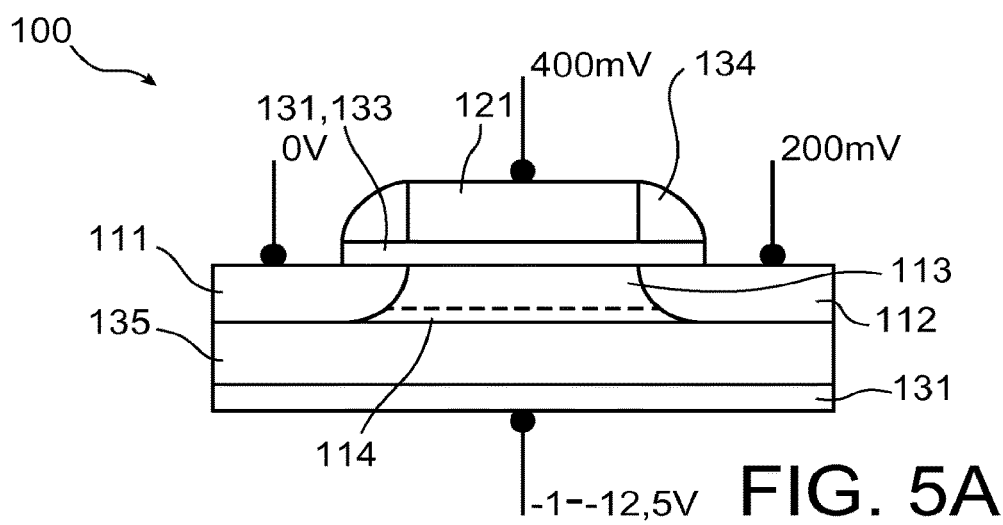
FIGS. 5A to 5C illustrate the principle of operation of a detection component according to a fifth possibility for the invention with FIG. 5A illustrating by a cross-section view the supply of a detection structure according to this fifth possibility, FIG. 5B illustrating the operating principle of such a detection structure and FIG. 5C illustrating graphically the sensitivity of such a detection structure according to the drain current compared with that of a detection structure in accordance with the teaching by document U.S. Ser. No. 16/334,109.
Figure 5B:
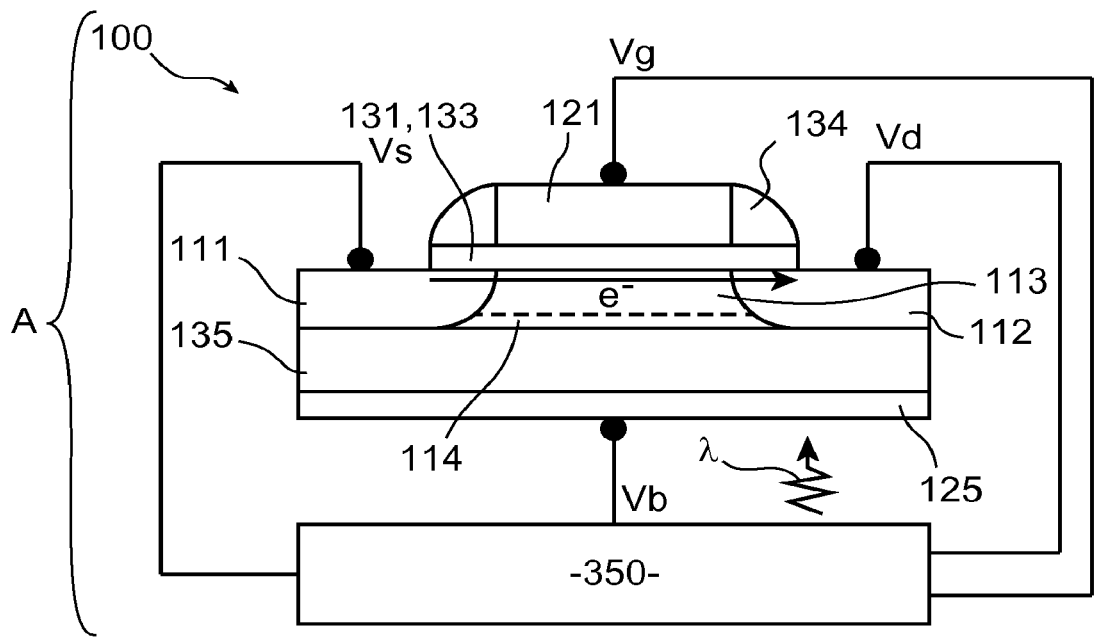
Figure 5:
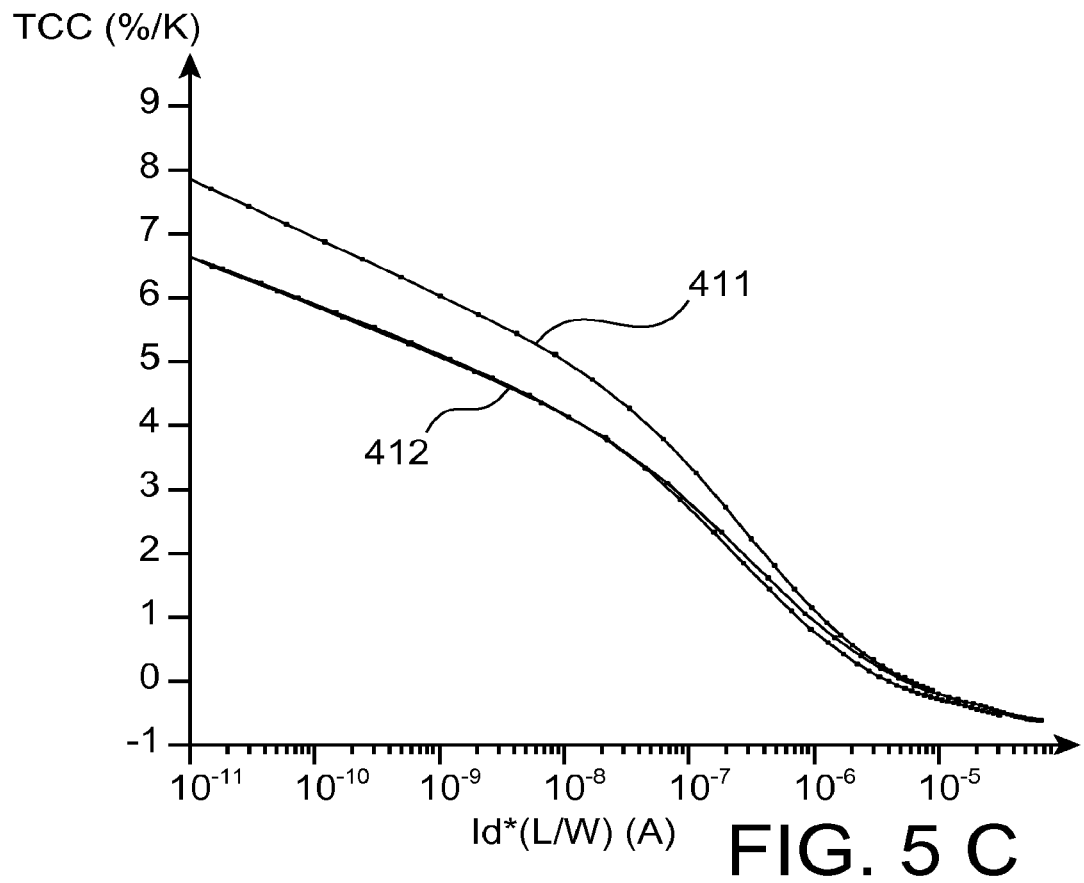

Thus, according to this fifth possibility for the invention, illustrated in FIGS. 5A to 5C, the supply circuit 350 may be arranged to independently electrically supply each of the source zone 111, the drain zone 112, the first electrode 121 and the second electrode 125 and to form the blocking layer 114 at the location of the second face of the channel layer 113.

According to this fifth possibility for the invention and with the exemplary configuration described in the part "principle of the invention", the supply circuit 350 may be configured to apply in operation:

- a source voltage Vs of zero, 0V, to the source zone 111,
- a drain voltage Vd of 200 mV to the drain zone 112,
- a gate voltage Vg on the first gate electrode 121, provided to adjust the operating current of the transistor, for example a voltage Vg of 400 mV and
- a negative back gate voltage Vb comprised between −1 V and −12.5 V to the second gate electrode 125, this gate voltage Vb having to be adapted according to the thickness of the second gate dielectric layer 135.

In this way, the negative back gate voltage Vb makes it possible to create a blocking layer 114 taking the form of an inversion layer at the location of the second face of the channel zone 113.

In the same way as for the structures comprising a conventional transistor of MOSFET type in accordance with the first possibility, according to the principle of the invention and as the inventors have discovered, such a blocking layer 114 makes it possible to reduce the effectiveness (the strength) of coupling between the gate voltage and the surface potential of the channel face that is an opposite face to that at which the blocking layer is created. Due to this, the variation in surface potential is less constrained by the gate voltage and is better able to vary with the temperature than that which characterizes the prior art. This therefore results in better sensitivity of the detection structure relative to components of the prior art such as that taught by the document U.S. Ser. No. 16/334,109.

Thus, in order to illustrate this improvement in sensitivity, FIG. 5C illustrates the variation in the thermal current coefficient, also known by its initialism TCC, with the transistor current normalized by the width to length ratio of the transistor calculated for a component according to this fifth possibility, this variation being referenced 411, and for a transistor, having the same characteristics, and which should conform to the teaching of document U.S. Ser. No. 16/334,109 applied to a depletion transistor, this variation being referenced 412. The features in common are: in addition to those already set out, a channel length of 500 nm, in order to normalize the current, and a thickness of the second oxide layer of 145 nm.

Thus in FIG. 1C it is observed that, for normalized currents ranging from 100 pA to 10 nA, the increase in the thermal current coefficient for the configuration of the invention is greater than $1\%\cdot K^{-1}$ and is greater than $0.5\%\cdot K^{-1}$ for normalized currents comprised between 10 nA and 100 nA. Moreover, the inventors have identified that, in the case of depletion transistors too, this increase is accompanied by a reduction in 1/f noise of the transistor. Thus, with an increase in sensitivity and and reduced 1/f noise, a detection component 1 according to the invention has a signal/noise ratio particularly optimized relative to the components of the prior art.

Sixth Possibility

Figure 6:
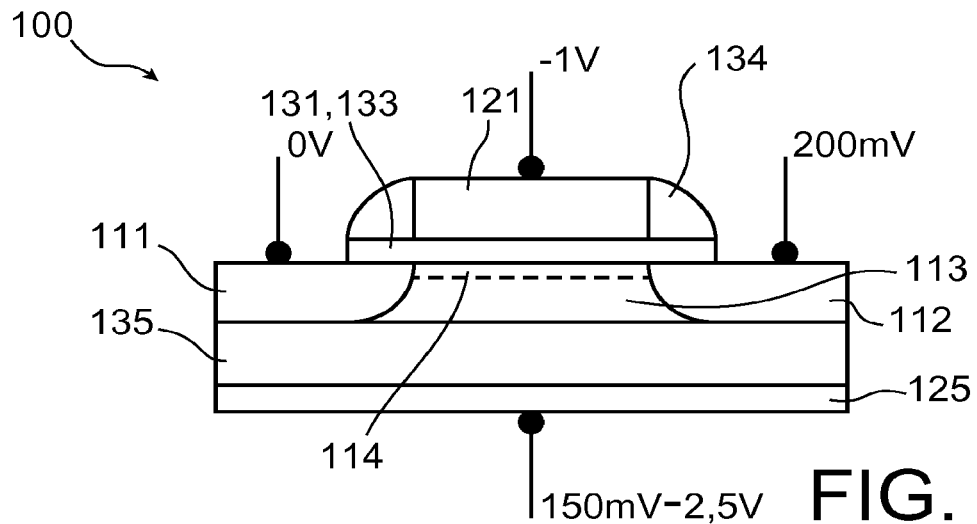
FIG. 6 illustrates the operating principle of a detection component according to a sixth possibility for the invention by showing, by a cross-section view, the supply of a detection structure according to that sixth possibility for the invention.

According to a sixth possibility for the invention illustrated in FIG. 6, the supply circuit 350 may be arranged to independently electrically supply each of the source zone 111, the drain zone 112, the first electrode 121 and the second electrode 125 and to form the blocking layer 114 at the location of the first face of the channel zone 113.

According to this sixth possibility for the invention and with the exemplary configuration described in the part "principle of the invention", the supply circuit 350 may be configured to apply in operation:
  a source voltage Vs of zero, 0V, to the source zone 111,
  a drain voltage Vd of 200 mV to the drain zone 112,
  a gate voltage Vg of −1 V on the first gate electrode 121, and
  a positive back gate voltage Vb comprised between 150 mV and 2.5V to the second gate electrode 125, this back gate voltage Vb having to be adapted according to the thickness of the second gate dielectric layer 135 and the operating current of the transistor.

Thus, the negative gate voltage Vg makes it possible to create a blocking layer 114 taking the form of an inversion layer at the location of the first face of the channel zone 113, the back gate voltage being chosen to set to depletion, in neutral operation or accumulation, the rest of the channel zone according to the voltage applied to the opposite gate to the blocking layer.

In accordance with the first and second possibilities described above and according to a variant of this fifth and sixth possibility, the supply circuit 350 may be configured to supply the detection structure according to the fifth possibility and according to the sixth possibility, it being possible for the supply circuit to be controlled to pass from one to the other or configured to pass from one to the other according to certain conditions, for example such as conditions that are internal to the component, such as the source-drain current Ids or conditions that are external to the component, such as an instruction for passing from one to the other of the first and second possibility.

Seventh Possibility

Figure 7:
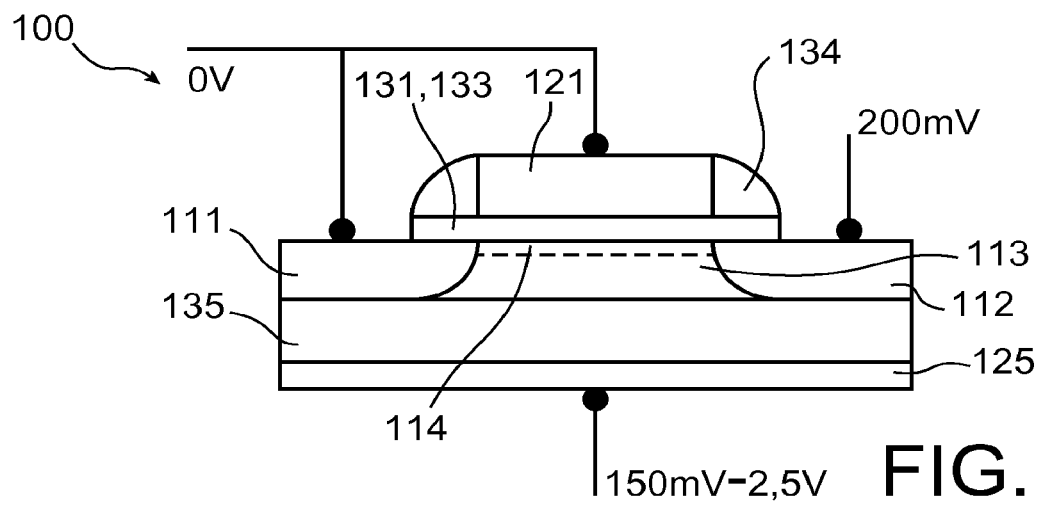
FIG. 7 illustrates the operating principle of a detection component according to a seventh possibility for the invention by showing, by a cross-section view, the supply of a detection structure according to that seventh possibility for the invention.

According to a seventh possibility for the invention illustrated in FIG. 7, the supply circuit 350 may be arranged to supply the source zone 111 and the first gate electrode 121 together, the drain zone 112, and the second gate electrode 125 being supplied independently of one another and of the source zone 111/first gate electrode pair, and to form the blocking layer 114 at the location of the first face of the channel layer 113. Furthermore, in accordance with the third and fourth possibilities described earlier for enabling such biasing, according to that seventh possibility, the detection structure 100 has "pre-biasing" of the blocking layer 114 supplied by:
  either, a first gate dielectric layer 121 comprising a first and a second sub-layer respectively of a first and a second dielectric material suitable for forming together a dipolar interface by the creation of an electrostatic dipole between them,
  or, over-doping a portion of the channel zone 113 provided for forming the blocking layer 114 with electron acceptor doping elements, such as boron or indium atoms obtained by ionic implantation of Boron B, Boron fluoride ions BF2 or indium ions In.

Thus, with such a dipole interface of the first oxide layer 121 or such an over-doping of the portion of the channel zone 113 provided for forming the blocking layer 114, both equivalent to pre-biasing of the channel zone 113 at the location of its first face, it is possible to obtain a shift in the threshold voltage of the first gate electrode of +1 V, or even, if these two possibilities are combined, a shift in the threshold voltage of the first gate electrode 121 of +2 V. With such a "pre-biasing" at the location of the first gate electrode 121, this results in it not being necessary to apply a negative voltage to form the blocking layer as is the case with the sixth possibility.

According to this seventh possibility for the invention and with the exemplary configuration described in the part "principle of the invention", the supply circuit 350 may be configured to apply in operation:
  a source voltage Vs and gate voltage Vg that is zero, 0V, applied to the source zone 111 and to the first gate electrode 121,
  a drain voltage Vd of 200 mV to the drain zone 112, and
  a positive back gate voltage Vb comprised between 150 mV and 2.5 V to the second gate electrode 125, this back gate voltage Vb having to be adapted according to the thickness of the second gate dielectric layer 135 and the operating current of the transistor.

Such a seventh possibility has the advantage that, as the source zone 111 and the first gate electrode 121 are short-circuited, it is only necessary to provide three interconnections between the detection structure 100 and the supply circuit 350. In this way, heat exchanges are limited between the detection structure and the supply circuit 350, which may reduce the temperature reached by the absorber and therefore the sensitivity of the detection component 1.

Eighth Possibility

Figure 8:
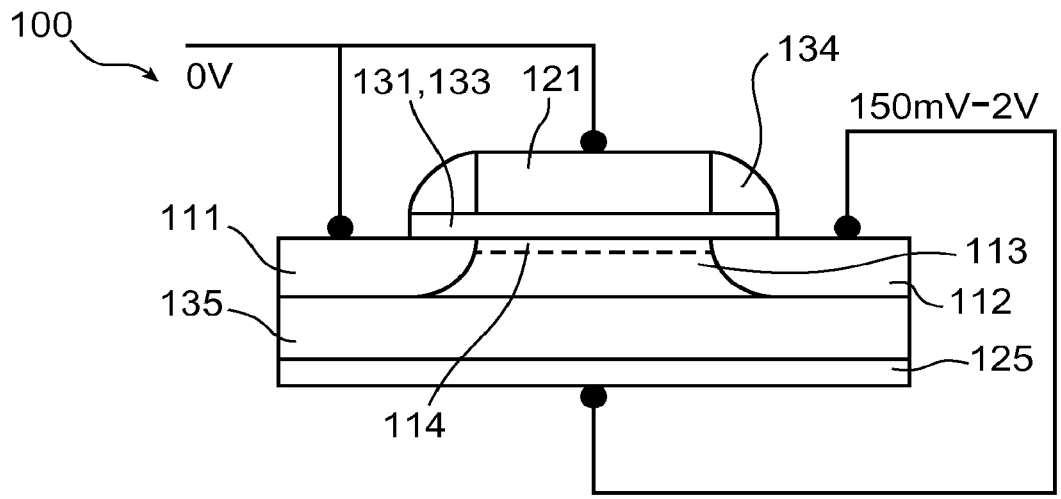
FIG. 8 illustrates the operating principle of a detection component according to an eighth possibility for the invention by showing, by a cross-section view, the supply of a detection structure according to that eighth possibility for the invention.

According to an eighth possibility for the invention illustrated in FIG. 8, the supply circuit 350 may be arranged to supply the source zone 111 and the first gate electrode 121 together, to supply the drain zone 112 and the second gate electrode 125 together, and to form the blocking layer 114 at the location of the first face of the channel layer 113. Furthermore, to enable such biasing, according to this eighth possibility, the detection structure 100 has "pre-biasing" of the blocking layer 114 similar to that described in the context of the third, fourth and seventh possibilities.

In accordance with this eighth possibility, in order to minimize the biasing voltage of the second gate electrode 125 and thus the voltage applied to the drain zone 112, the thickness of the second gate dielectric layer 131 is chosen to be relatively low, it being possible for this to be comprised between 20 nm and 50 nm and preferably between 25 and 35 nm, or even substantially equal to 30 nm. In addition, the biasing voltage of the second gate electrode 125 and thus of the voltage applied to the drain zone 112 may also be reduced by optimization of the ratio of the width of the channel zone/to the length of the channel zone, this ratio preferably being greater than 150, or even 250, or even 300.

According to this eighth possibility for the invention and with the exemplary configuration described in the part "principle of the invention", the supply circuit 350 may be configured to apply in operation:
- a source voltage Vs and gate voltage Vg that is zero, 0 V, applied to the source zone 111 and to the first gate electrode 121,
- a drain voltage Vd and back gate voltage Vb comprised between 150 mV and 2 V applied to the drain zone 112 and to the second gate electrode 125, this voltage having to be configured according to the thickness of the second gate dielectric layer 135 and the operating current of the transistor.

Ninth Possibility

Figure 9A:
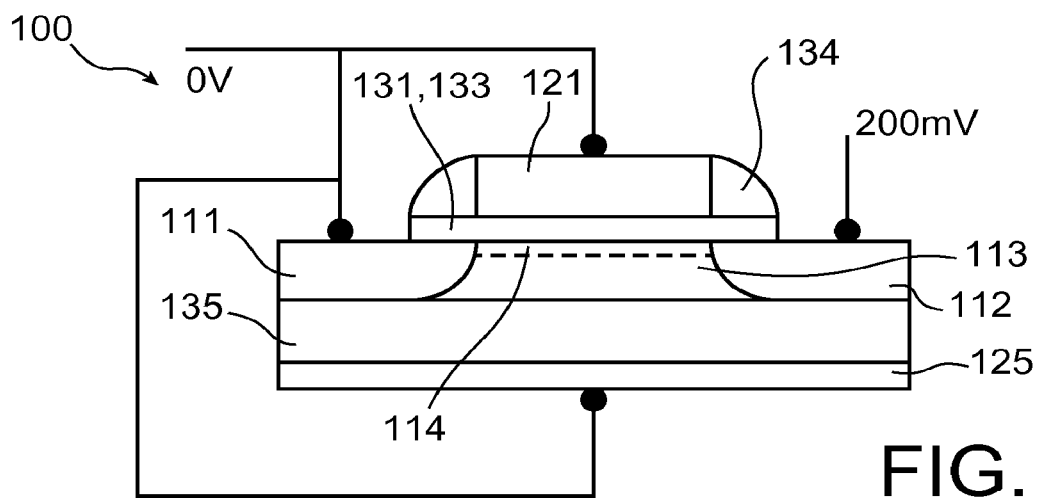
FIGS. 9A and 9B illustrate the operating principle of a detection component according to a ninth possibility for the invention by showing in FIG. 9A, by a cross-section view, the supply of a detection structure according to that ninth possibility for the invention and in FIG. 9B a detection structure with an optimized ratio of channel length L to width W of the channel.
Figure 9B:
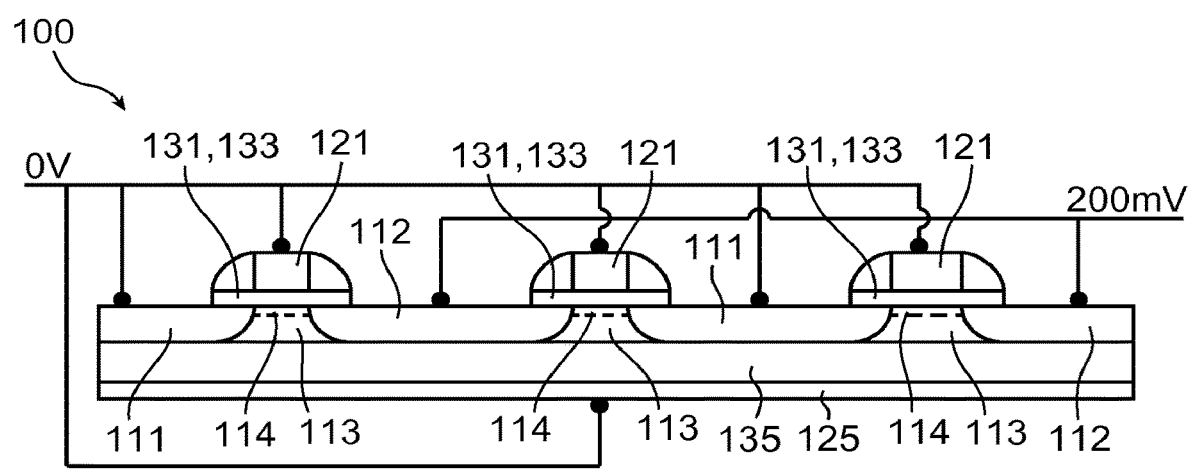

According to a ninth possibility for the invention illustrated in FIGS. 9A and 9B, the supply circuit 350 may be arranged to supply the source zone 111, the first gate electrode 121 and the second gate electrode 125 together, to supply the drain zone 112 individually, and to form the blocking layer 114 at the location of the first face of the channel layer 113. Furthermore, to enable such biasing, according to this ninth possibility, the detection structure 100 has "pre-biasing" of the blocking layer 114 similar to that described in the context of the third, fourth seventh and eighth possibilities.

In accordance with this ninth possibility, in order to reduce to zero the biasing voltage of the second gate electrode 125, the thickness of the second gate dielectric layer 131 is chosen to be relatively low, it being possible for this to be comprised between 20 nm and 50 nm and preferably between 25 and 35 nm, or even substantially equal to 30 nm. In addition, the biasing voltage of the second gate electrode 125 may also be reduced to zero by optimization of the ratio of the width of the channel zone/to the length of the channel zone, this ratio preferably being greater than 150, or even 250, or even 300.

According to this ninth possibility for the invention and with the exemplary configuration described in the part "principle of the invention", the supply circuit 350 may be configured to apply in operation:
- a source voltage Vs, gate voltage Vg and back gate voltage that is zero, 0 V, applied to the source zone 111, to the first gate electrode 121 and to the second gate 125,
- a drain voltage Vd typically equal to 200 mV.

Such a ninth possibility has the advantage that, as the source zone 111 the first gate electrode 121 and the second gate electrode 125 are short-circuited and that the drain zone 112 is independent, it is only necessary to provide two interconnections between the detection structure 100 and the supply circuit 350. In this way, heat exchanges are limited between the detection structure and the supply circuit 350, which may reduce the temperature reached by the absorber and therefore the sensitivity of the detection component 1.

FIG. 9B illustrates a particular configuration of the detection structure 100 according to this ninth possibility in which the detection structure 100 has an optimized ratio of width of the channel zone/to the length of the channel zone. Such optimization is obtained here by a "triple transistor" configuration, or "three-tooth comb" (refer to FIG. 23B which illustrates a dual gate example or "two-tooth comb"), the structure comprising a source zone 111 and a drain zone 112 that are doubled and a tripled channel zone. As a matter of fact, as FIG. 9B shows, the detection structure is formed by the succession of a "first" source zone 111, a "first" channel zone 113, a "first" drain zone 112, a "second" channel zone 113, a "second" source zone 111, a "third" channel zone 113 and a "second" drain zone 112.

In the same way as for the fourth possibility, the person skilled in the art is capable of generalizing such a configuration and of using a multiple gate or "multiple-tooth comb" configuration with any number of gates/teeth, the number of gates or "teeth" being greater than or equal to 2.

In order to illustrate these different possibilities for the invention, practical embodiments of the invention are described below.

First Embodiment

Figure 10:
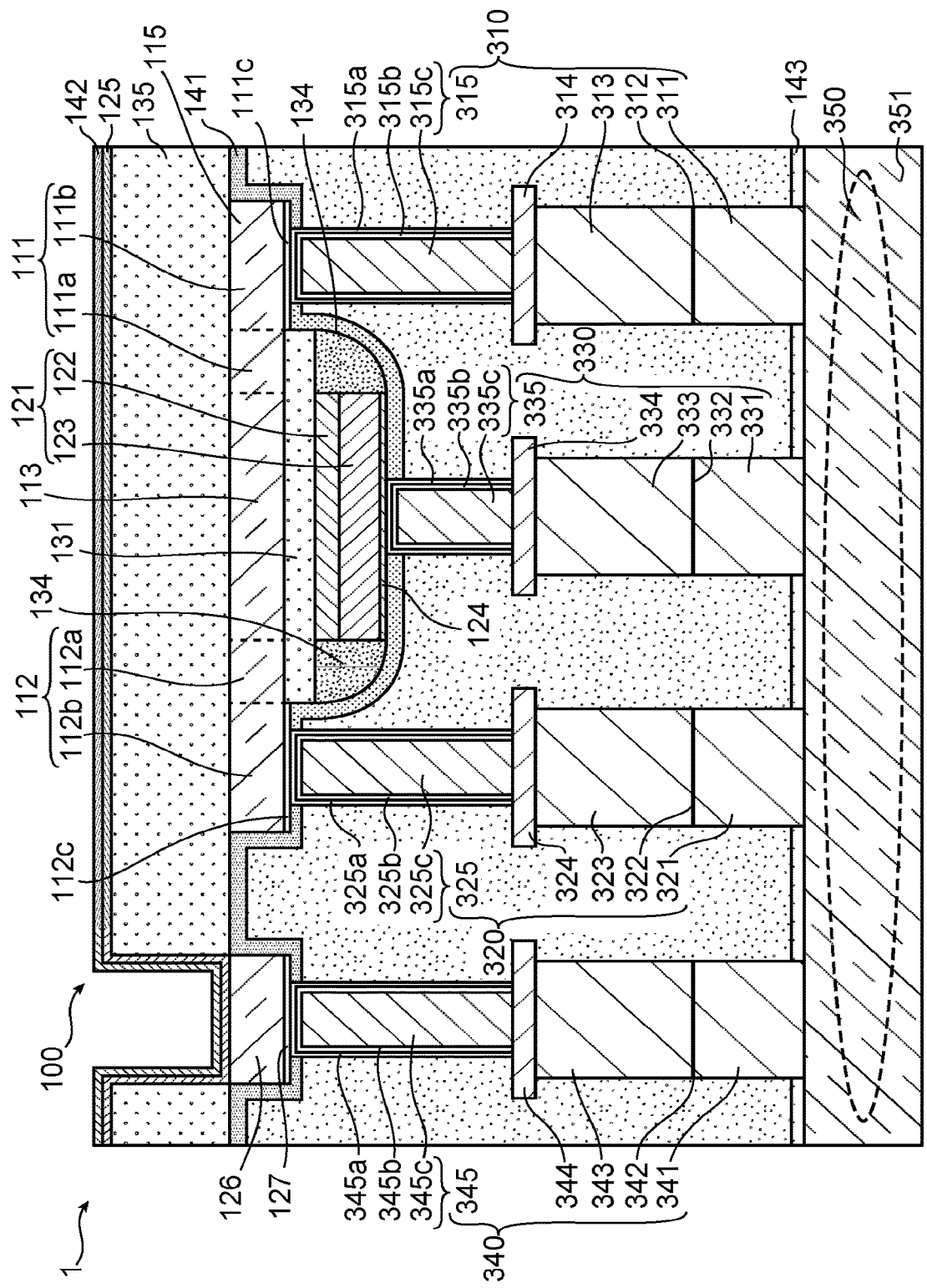
FIG. 10 illustrates a detection component according to a first embodiment in accordance with the first possibility for the invention.

FIG. 10 thus illustrates a first embodiment of the invention in accordance with the first and second possibilities for the invention.

Thus, according to this first embodiment and as illustrated in FIG. 10, the detection component 1 comprises:
- the detection structure 100, in which the second gate electrode 125 forms part of the absorption element,
- a first, a second, a third and a fourth connection arm 310, 320, 330, 340 for connecting the supply circuit 350 to respectively the source zone 111, the drain zone 112, the first gate electrode 121 and the second gate electrode,
- a reading substrate 351 in which is provided at least partly the supply circuit 350, the supply circuit forming, in the present embodiment, the reading circuit of the detection component 350.

More specifically, the detection structure 100 comprises:
- the second oxide layer 135,
- a first semiconductor layer 115 in which are provided the source 111, drain 112, and channel 113 zones and a connecting zone 126 for the second gate electrode 125, the first semiconductor layer 115 is arranged in contact with the second oxide layer 125,
- the first oxide layer 131 comprising, according to this first embodiment, a layer of silicon dioxide, the first oxide layer 131 being disposed in contact with the first semiconductor layer 115 on an opposite face of the semiconductor layer 115 to the second oxide layer 135 the first oxide layer being located opposite the channel zone 113 and a first part 111a, 112a of each of the source zone 111 and of the drain zone 112,
- the first gate electrode 121 comprising a first conductor layer 122, such as a layer of titanium nitride TiN, in contact with the first gate oxide layer, and a second layer of doped polysilicon pSi 123, a first and second spacer element 134 disposed on opposite sides of the first gate electrode 121 covering the rest of the first oxide layer 131 which is not covered by the first gate electrode, the second gate electrode 125 covering the second gate dielectric layer 135 over one face of the second gate dielectric layer 135 which is an opposite face to the first semiconductor layer 115, a first, a second and a third stop layer 141, 142, 143 which are optional, such as layers of alumina $Al_2O_3$ or aluminum nitride AlN, arranged to protect the rest of the structure in upon chemical attack, such as an operation of etching with hydrofluoric acid in the manufacturing method.

More specifically, the second gate dielectric layer 135 is a layer of silicon dioxide $SiO_2$ such as a buried oxide layer of a substrate of the semiconductor-on-oxide type known by the initialism SOI used below. The second gate dielectric layer 125 has a thickness comprised between 10 and 150 nm, or even between 50 and 100 nm and advantageously between 60 and 80 nm. Typically, the second gate dielectric layer may thus have a thickness substantially equal to 70 nm. Such a thickness may be provided by a step of thinning a buried oxide layer of an SOI substrate.

A first semiconductor layer 115 may be a layer of silicon Si from an SOI substrate, of thickness less than or equal to 100 nm, such as a thickness of 70 nm. The first semiconductor layer may also have a thickness less than 50 nm or even substantially equal to 30 nm, this being by means of a prior step of thinning the first semiconductor layer 115. Such a step may be carried out, for example, by thermal oxidation of the first semiconductor layer 115.

The source 111, drain 112 and channel 113 zones are provided in the first semiconductor layer 115. The source zone 111 and the drain zone 112 are of a first conductivity type for which the majority carriers are electrons, in other words, they are N-doped. Each of the source zone 111 and the drain zone 112 have a first part 111a, 112a which is relatively weakly doped and a second part 111b, 112b that is relatively strongly doped in order to promote making contact. The first part 111a, 112a of the source zone 111 and of the drain zone may thus have a concentration of majority carriers of the first conductivity type comprised between $5.10^{16}$ cm$^{-3}$ and $1.10^{18}$ cm$^{-3}$, preferably between $1.10^{17}$ cm$^{-3}$ and $5.10^{17}$ cm$^{-3}$. In the same way, the second part 111b, 112b of the source zone 111 and of the drain zone 112 may have a concentration of majority carriers of the first conductivity type comprised between $5.10^{19}$ cm$^{-3}$ and $5.10^{20}$ cm$^{-3}$, preferably between $1.10^{20}$ cm$^{-3}$ and $2.10^{20}$ cm$^{-3}$.

The channel zone 113 has the second type of conductivity, that is to say here P-doped, with a concentration of majority carriers of the second type of conductivity less than $1.10^{16}$ cm$^{-3}$, this preferably being less than $5.10^{15}$ cm$^{-3}$. Thus, the channel zone 113 may have a concentration substantially equal to $1.10^{15}$ cm$^{-3}$. As a variant, the channel zone 113 may have intrinsic doping.

The first semiconductor layer 115 also comprises an electrically insulated portion of the source 111, drain 112 and channel 113 zones. The electrically insulated portion forms a connection zone 126 for the second gate electrode 125. Said electrically insulated portion has a concentration of majority carriers preferably greater than $1.10^{19}$ cm$^{-3}$, or even $1.10^{20}$ cm$^{-3}$ so as to have reduced resistivity. The connection zone is preferably degenerated.

In order to promote making contact, each connection zone 126 and second parts 111b, 112b of the source zone 111 and of the drain zone 112 may each be provided, on a face which is an opposite face to the second gate dielectric layer 135, with an interface comprising a silicide, such as an interface 111c, 112c, 127 of nickel silicide $SiNi_2$.

Thus, in this first embodiment, the second parts 111b, 112b of the source zone 111 and of the drain zone 112 and the connection zone 126 are in contact, by their respective interface comprising a silicide, with, respectively, the first connection arm 310, the second connection arm 320 and the fourth connection arm 340.

The channel zone 113 and the first parts 111a, 112a of the source zone 111 and of the drain zone 112 are covered by the first gate oxide layer 131. The first oxide layer is formed from silicon dioxide and has a thickness comprised between 5 and 15 nm.

According to a variant of this first embodiment not illustrated, the first gate dielectric layer 131 may comprise a first gate dielectric sub-layer formed from silicon dioxide, in contact with the channel zone 113, and a second gate dielectric sub-layer formed from a "dielectric insulator having a high dielectric constant", better known by the designation "high-K" dielectric, such as a hafnium dioxide $HfO_2$, said second sub-layer being arranged between the first gate dielectric sub-layer and the first conductor layer 122. According to this variant, the first gate dielectric sub-layer may have a thickness comprised between 5 and 15 nm while the second gate dielectric layer has a thickness comprised between 1 and 5 nm, such as a thickness of 3 nm.

It must be understood above and in the rest of this document that by "dielectric insulator having a high dielectric constant" or according to the designation generally employed by the person skilled in the art, by "high-K" dielectric material, is meant an insulating material of which the dielectric constant is high relative to that of silicon dioxide which is equal to 3.9. Thus, a dielectric material can be considered as a material having a high dielectric constant, if it has a dielectric constant greater than or equal to at least 1.5 times, or even 2 to 3 times, that of silicon dioxide.

The gate electrode 121 comprises the first conductor layer 122 and the second conductor layer 123.

The first conductor layer 122 is preferably produced from a conductor material of the "mid-gap" type for the channel zone 113, the first conductor layer 122 preferably being of a conductor material chosen from the group comprising titanium nitrides TiN, tantalum nitrides TaN and molybdenum silicides $MoSi_2$ for a channel zone 113 produced from silicon, the first conductor layer 122 advantageously being produced from a titanium nitride TiN for a channel zone 113 produced from silicon.

By taking into account the configuration of the first conductor layer 122 of the gate electrode 121, so as to promote the absorption capacities of the first conductor layer 122 of the gate electrode 121, the first conductor layer 122 and the first gate oxide layer 131 which supports it may be chosen so as to satisfy the following inequalities:

$$150\Omega \leq \frac{\rho}{Ep} \leq 700\Omega \qquad (1)$$

in which ρ is the equivalent resistivity of the first gate electrode conductor layer 121 and Ep is the thickness of the first conductor layer 122 of the first gate electrode 121. It will be noted that still more preferably p/E$_p$ is chosen to be close, or even equal, to 376.9 Ω.

Thus, the first conductor layer 122 may be produced from titanium nitride TiN and have a thickness comprised between 5 and 15 nm, or even substantially equal to 10 nm.

The second conductor layer 123 may be made from doped polysilicon pSi of thickness comprised between 50 nm and 100 nm.

In such a way as to promote making contact with the third connection arm 330, the second conductor layer 123 may have, on an opposite face to the first conductor layer 121, an interface comprising a silicide, such as an interface 124 of nickel silicide SiNi$_2$.

Thus, in this first embodiment, the second conductor layer 123 is in contact, by its interface comprising a silicide, with the third connection arm.

The first gate electrode 121 is extended, respectively in contact with the first part 111a, 112a of the source zone 111 and of the drain zone 112, by a spacer element 134 produced from a dielectric material such as a silicon nitride Si$_3$N$_4$.

As FIG. 10 shows, the portions of the connection zone 126, of the second parts 111b, 112b of the source zone 111 and of the drain zone 112, the flanks of the first gate dielectric layer 131, the part of the second conductor layer 123 which are not in contact with one of the first, second third and fourth connection arms 310, 320, 330, 340, the spacer elements 134 and the parts of the second gate 135 which are not in contact with the first semiconductor layer 115, are covered by the first stop layer 141.

The second gate dielectric layer 135 is in contact, on its opposite face to the first semiconductor layer 115, with the second gate electrode 125. The second gate electrode 125, in the same way as for the first conductor layer 122, is preferably produced from a conductor material of the "mid-gap" type for the channel zone 113, the second gate electrode 125 preferably being of a conductor material chosen from the group comprising titanium nitrides TiN, tantalum nitrides TaN and molybdenum silicides MoSi$_2$ for a channel zone 113 produced from silicon, the first conductor layer 122 advantageously being produced from a titanium nitride TiN for a channel zone 113 produced from silicon.

By taking into account the configuration of the second gate electrode 125, so as to promote the absorption capacities of the second gate electrode, the gate electrode and the second gate oxide layer that supports it may be chosen so as to satisfy the following inequalities:

$$150\Omega \le \frac{\rho}{Ep} \le 700\Omega \quad (1)$$

in which ρ is the equivalent resistivity of the second gate electrode 125 and Ep is the thickness of the second gate electrode 125. It will be noted that still more preferably ρ/E$_p$ is chosen to be close, or even equal, to 376.9 Ω.

Thus, the second gate electrode 125 may be produced from titanium nitride TiN and have a thickness comprised between 5 and 15 nm, or even substantially equal to 10 nm.

The second gate electrode 125 is covered, on its opposite face to the second gate dielectric layer 135, by the second stop layer 142.

As illustrated in FIG. 10, the first, second, third and fourth connection arms 310, 320, 330, 340 make it possible to connect the detection structure to the supply circuit 350 while thermally insulating the reading substrate 351 comprising said supply circuit 350.

Each of the first, second, third and fourth connection arms 310, 320, 330, 340 comprises:

a first contact part 315, 325, 335, 345 for electrically contacting respectively the source zone 111, the drain zone 112, the first gate electrode 121 and the connection zone 126, a second thermal insulation part 314, 324, 334, 344, embodied by a single thin layer or a set of thin layers, said insulating part being in accordance with the insulation arm as taught by the document U.S. Ser. No. 16/334,109, the second part enabling thermal insulation between the first contact part 315, 325, 335, 345 and a third bonding part 313, 323, 333, 343, the third bonding part 313, 323, 333, 343 configured to enable bonding with a fourth bonding part 311, 321, 331, 341 of a reading medium 351, the fourth bonding part 311, 321, 331, 341 configured to enable bonding with the third part and connected to the supply circuit 350.

Each first contact part 315, 325, 335, 345 of the connection arms 310, 320, 330, 340 comprises:

a body of tungsten W 315a, 325a, 335a, 345a, a first conductor coating 315b, 325b, 335b, 345b, of titanium nitride TiN covering the tungsten body, a second conductor coating 315c, 325c, 335c, 345c of titanium Ti covering the first conductor coating 315b, 325b, 335b, 345b, The first conductor coating 315b, 325b, 335b, 345b and the second conductor coating 315c, 325c, 335c, 345c may have a respective thickness comprised between 30 and 90 nm, preferably substantially equal to 60 nm and between 20 and 40 nm, preferably substantially equal to 30 nm.

Each second thermal insulation part 314, 324, 334, 344 comprises:

a first stiffening layer, not shown, opposite the second gate dielectric layer 135, a corresponding conducting track, not shown, in contact with the first stiffening layer on the opposite face of the first stiffening layer 312, 322 to the second gate dielectric layer 135, a second stiffening layer, not shown, in contact with the corresponding conducting track on the opposite face of the conducting track to the first stiffening layer.

The first conducting track of each second thermal insulation part 314, 324, 334, 344 is in electrical contact with each of the first connection part 315, 325, 335, 345 and the third bonding part 313, 323, 333, 343. The first conducting track of each second thermal insulation part 314, 324, 334, 344 at one of its ends to the corresponding first connection part 315, 325, 335, 345 and for its other ends to the corresponding third bonding part 313, 323, 333, 343.

In order to provide a thermal insulation function, the second thermal insulation part 314, 324, 334, 344 can extend within a plane substantially parallel to the plane of the first semiconductor layer 115 in a serpentine configuration.

Each third contact part 313, 323, 333, 343 is formed from a material configured to enable molecular bonding with the fourth contact part 311, 321, 331, 341. Thus for example each third contact part 313, 323, 333, 343 may for example be produced from copper, so as to enable mixed copper/sacrificial material molecular bonding on copper/sacrificial material. As shown in FIG. 10, each third bonding part 313, 323, 333, 343 may take the form of a tubular stud.

In identical manner, each fourth bonding part 311, 321, 331, 341 may be produced from the same material as the third bonding part 313, 323, 333, 343, so as to enable molecular bonding between them. Thus, each of the fourth contact parts 313, 323, 333, 343 may for example be produced from copper. As shown in FIG. 10. Furthermore, each fourth bonding part 311, 321, 331, 344 may take the form of a tubular stud with a configuration complementary to the third complementary bonding part.

It will be noted that, by way of illustration and to enable better understanding of the principle of assembly used in the context of the present embodiment, the molecular bonding interface 312, 322, 332, 342 between the fourth bonding parts 313, 323, 333, 343 and the third bonding parts 311, 321, 331, 341 is represented. Of course, according to the molecular bonding principle, such an interface is not presented on the detection device 1.

Of course, such a configuration of the connection arms is only given by way of example, it being perfectly possible to envision other configurations without departing from the scope of the invention. It will be noted, in particular in a variant not illustrated, that it may be envisioned for the detection component according to this first embodiment to comprise only three connection arms, or even two connection arms, at least one of these two, or even three arms comprising several connection tracks in order to enable the connection of the source and drain zones 111, 112 and of the first and second gate electrodes 121, 125.

The fourth bonding parts 311, 321, 331, 341 of the connection arms 310, 320, 330, 340 are in contact with respectively a first, second, third and fourth connection zone for supply of the supply circuit 350 which are flush with a surface of a reading substrate 351.

In the present embodiment, the reading substrate 351 is a silicon substrate in which is provided the supply circuit 350. The supply circuit is, in the context of the present embodiment, a reading circuit configured to supply the detection structure in conformity with at least one of the first and second possibilities for the invention. In accordance with the variant of the first and second possibilities for the invention, the supply circuit may also be configured to supply the detection structure according to the first possibility and according to the second possibility, it being possible for the supply circuit 350 to be controlled to pass from one to the other or to be configured to pass from one to the other according to certain conditions.

It will be noted that, in accordance with the method for manufacturing such a detection component 1 described below, the reading substrate 351 may, on the surface on which the first, second, third and fourth supply connection zones of the supply circuit 350 are flush, have a third stop layer 143 covering the parts of said surface which are not in contact with the connection arms 310, 320, 330, 340. Said third stop layer 143, such as a layer of alumina $Al_2O_3$ or of aluminum nitride AlN, is arranged to protect the reading substrate 351 at the time of a chemical attack, such as etching with hydrofluoric acid.

Such a detection component 1 may be manufactured with a manufacturing method of which the main steps are illustrated in FIGS. 11A to 11H and which comprises three phases:
- a first phase of manufacturing a detection support 101 configured for the manufacture of the detection structure 100,
- a second phase of manufacturing a reading support 352, and
- a third phase of assembly of the detection support 100 with the reading support 352 here to form the detection component 1.

Figure 11A:
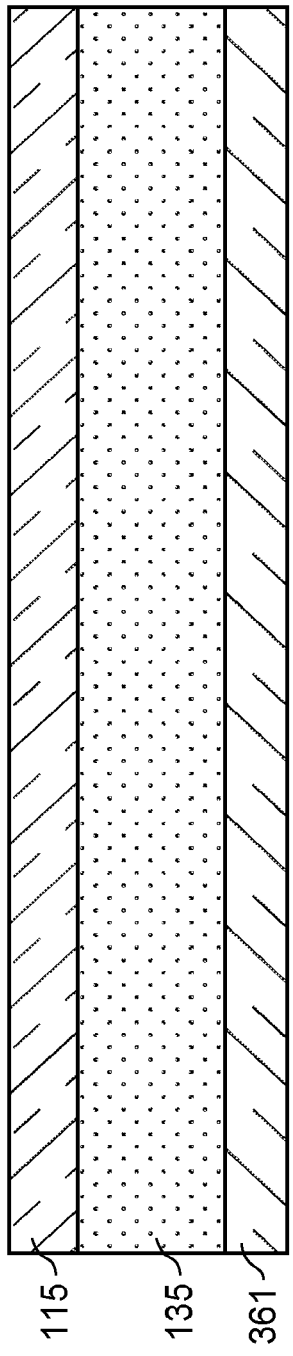
FIGS. 11A to 11H illustrate the main steps of a method for manufacturing a detection component according to a first embodiment.
Figure 11B:
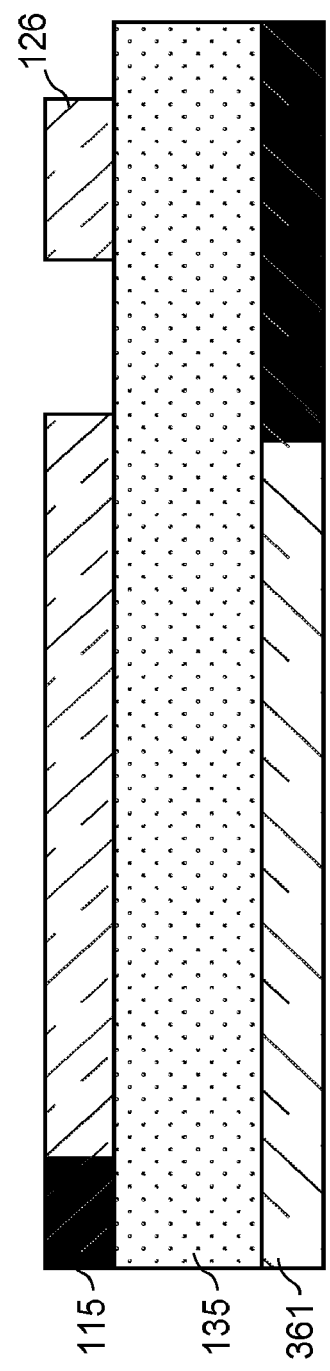
Figure 11C:
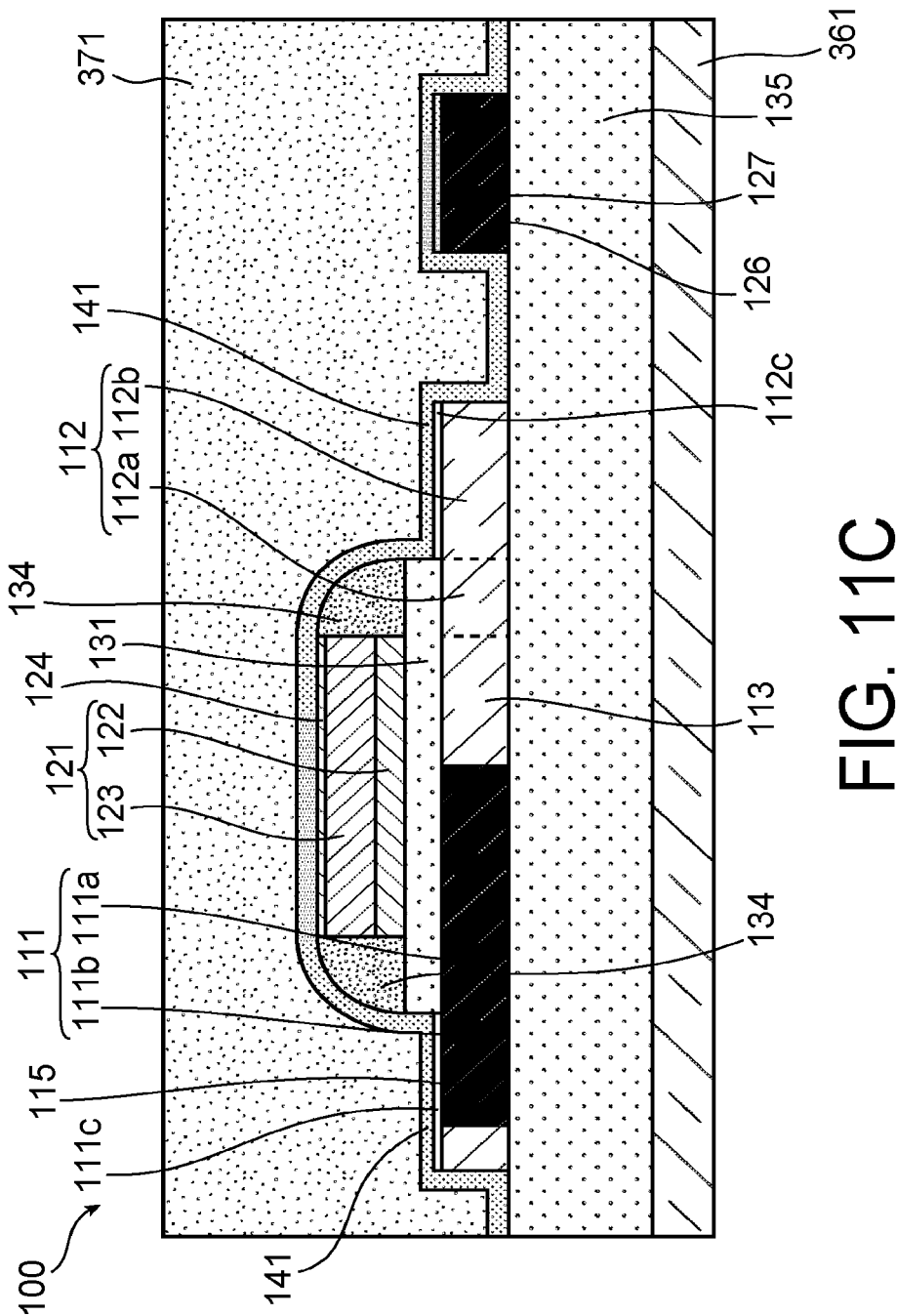
Figure 11D:
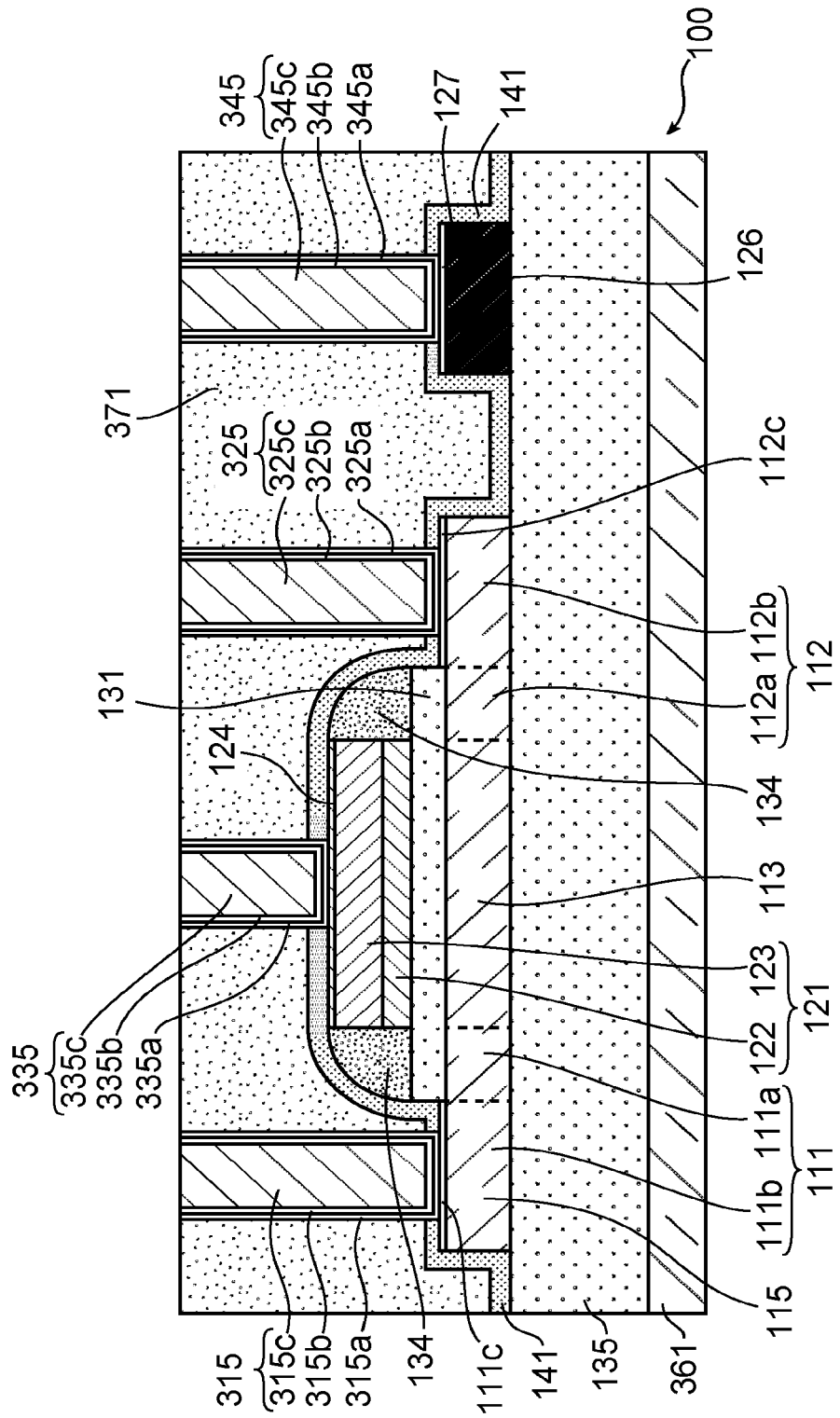
Figure 11E:
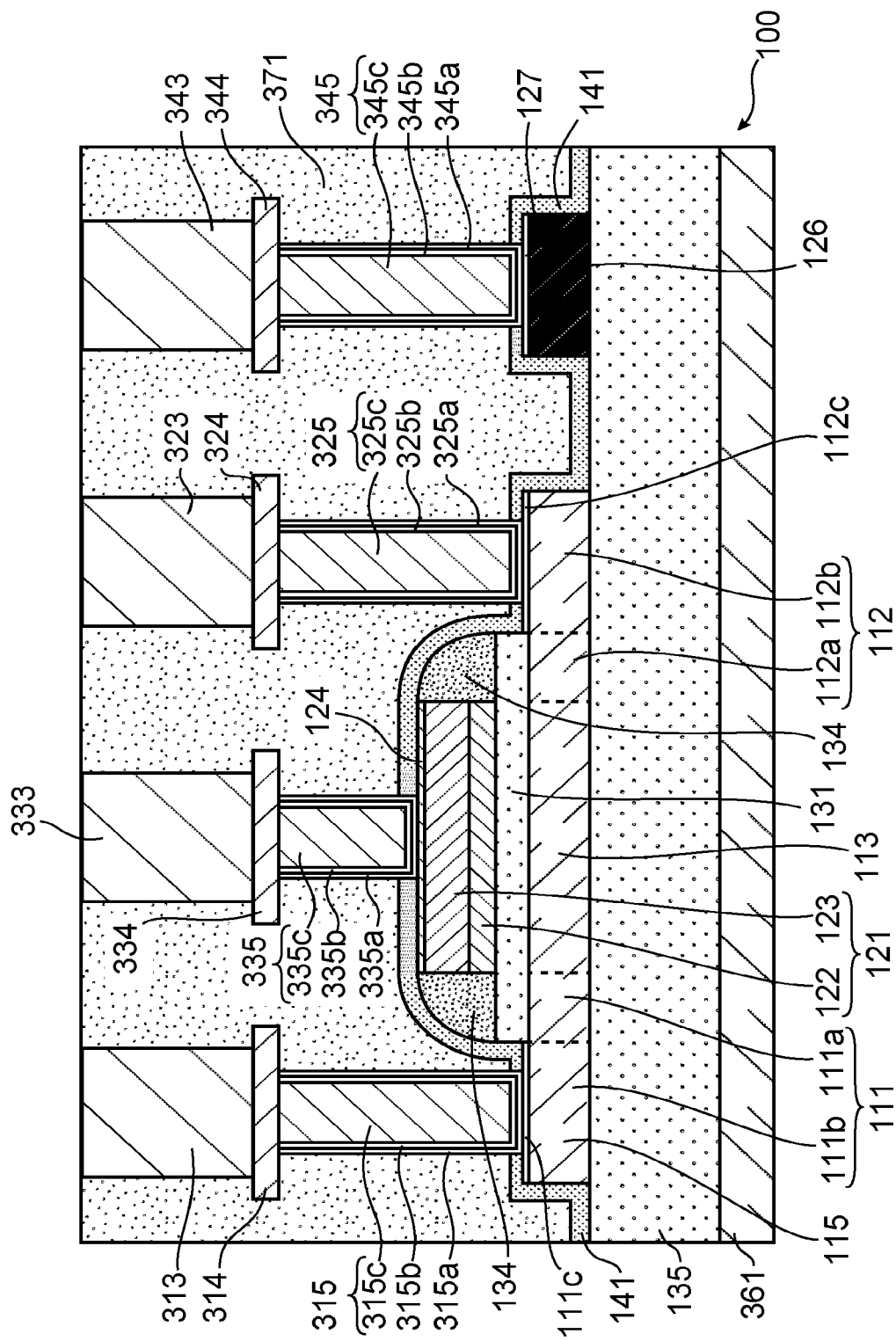

The first phase of manufacturing the detection structure 100 comprises the following steps:

providing an SOI substrate comprising a semiconductor substrate 361, an oxide layer configured to form the second gate dielectric layer 135 and a first semiconductor layer 115, the first semiconductor layer 115 having the second type of conductivity with a concentration of majority carriers of the channel zone 113, as illustrated in FIG. 11A, optional thinning of the first semiconductor layer 115, for example through the intermediary of thermal oxidation and etching of said thermal oxide, localized etching of the first semiconductor layer 115 in order to preserve the parts of the first semiconductor layer 115 configured to form the connection zone 126 and the source, drain, and channel zones 111, 112, 113, as illustrated in FIG. 11B, thermal oxidation of the semiconductor layer 115, so as to form the first gate dielectric layer 131, successive deposit of the first conductor layer 122 in contact with the first gate dielectric layer 131 and of the second conductor layer 123 in contact with the first conductor layer 122, this depositing step being followed by a step of local etching so as to form the first gate electrode 121 opposite the channel zone 113, implantation of doping elements of the first conductivity type in the parts of the semiconductor layer 115 corresponding to the source zone 111, the drain zone 112 and the connection zone 126, the channel zone 113 being protected by the first gate electrode 121, the first parts 111a, 112a of the source zone 111 and of the drain zone being thus formed, localized deposit of the spacer elements 134 in line with the first gate electrode 121 respectively opposite the first parts 111a, 112a of the source zone 111 and of the drain zone 112, the additional implantation of doping elements of the first conductivity type in the parts of the semiconductor layer 115 corresponding to the second parts 111b, 112b of the source zone 111 and of the drain zone 112 and at the connection zone 126, the channel zone 113 and the first parts 111a, 112b of the source zone 111 and of the drain zone 112 being protected by the first gate electrode 121 and the spacer elements 134, activation thermal annealing, such as thermal annealing under nitrogen, in order to activate and diffuse the doping elements implanted in the source, drain and connection zones 111, 112 126, said annealing being of the type conventionally designated by the person skilled in the art as "Rapid Thermal Anneal", from 1 to 15 s.

forming a respective interface 124, 111c, 112c, 127 comprising a silicide in contact with respectively the first gate electrode 121, the second parts of the source zone 111 and of the drain zone and of the connection zone 126, these interfaces being formed by deposit of nickel or titanium and annealing of the type conventionally designated by the person skilled in the art as "Rapid thermal Process".

deposit of the first stop layer 141 in contact with the connection zone 126, the second parts 111b, 112b of the source zone 111 and of the drain zone 112, the flanks of the first gate dielectric layer 131, the second conductor layer 123, the spacer elements 134 and the second gate dielectric layer 135, deposit of a layer of sacrificial material 371, such as silicon dioxide, so as to cover the assembly formed by the first semiconductor layer 115, the first gate dielectric layer 131, the first gate electrode 121, and the stop layer 141, as illustrated in FIG. 11C, planarization of the layer of sacrificial material 37, localized etching of the layer of sacrificial material 371 so as to form a respective opening corresponding to the first part 315, 325, 335, 345 of respectively the first, second, third and fourth connection arms 310, 320, 330, 340, said openings being open to the first stop opposite respectively the second parts 111*b*, 112*b* of the source and drain zones 111, 112, of the first gate electrode 121 and of the connection zone 126, etching the portions of the first stop layer freed from the layer of sacrificial material 371, deposit of a layer of titanium Ti through the openings made in the layer of sacrificial material so as to form the second conductor coating 315*c*, 325*c*, 335*c*, 345*c* of titanium Ti of each of the first connection parts of the first, second, third and fourth connection arms 310, 320, 330, 340, deposit of a layer of titanium nitride TiN through the openings made in the layer of sacrificial material and in contact with the second conductor coating 315*c*, 325*c*, 335*c*, 345*c* of titanium Ti so as to form the first conductor coating 315*b*, 325*b*, 335*b*, 345*b* of titanium nitride of each of the first connection parts of the first, second, third and fourth connection arms 310, 320, 330, 340, filling the openings formed in the layer of sacrificial material 371 with tungsten W so as to form a body of tungsten 315*a*, 325*a*, 335*a*, 345*a* of each of the first, second, third and fourth connection arms 310, 320, 330, 340, planarization of the layers of titanium, titanium nitride, tungsten and of the sacrificial material 371 so as to remove the excess of the layers of titanium, titanium nitride and tungsten as illustrated in FIG. 11D, forming the second thermal insulation parts 314, 324, 334, 344 of the connection arms 310, 320, 330, 340 in accordance with the teaching of document U.S. Ser. No. 16/334,109, depositing an additional layer of sacrificial material 371 in contact with the layer of sacrificial material 371 and the second thermal insulation parts 314, 324, 334, 344, localized etching of the layer of sacrificial material 371 so as to form a respective opening corresponding to the third bonding part 313, 323, 333, 343 of each of the first, second, third and fourth connection arms 310, 320, 330, 340, filling the openings formed in the additional layer of sacrificial material 371 by a conductor coating of titanium nitride TiN (not shown in the Figure and conventional for the person skilled in the art) and by copper Cu so as to form the third bonding part 313, 323, 333, 343 of each of the first, second, third and fourth connection arms 310, 320, 330, 340, planarization of the layer of titanium nitride, the copper layer and the additional layer of sacrificial material 371 so as to remove the excess copper and titanium nitride, the detection support 101 being thus formed, as illustrated in FIG. 11E.

Figure 11F:
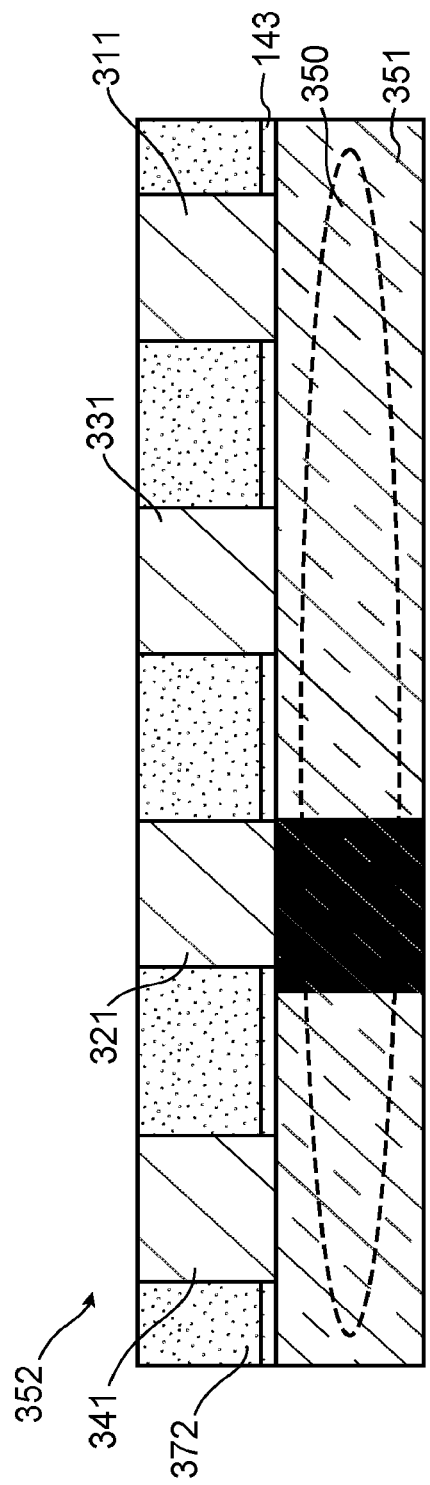

The second phase of manufacturing the reading support 352 may comprise the following steps:

providing the first reading substrate 351 in which is provided the supply circuit 350, the supply circuit 350 comprising, on a first face of the first reading support 351 a first, second, third and fourth supply connection zone, not illustrated, corresponding respectively to the source zone 111, the drain zone 112 and the first and second gate electrode 121, 125, depositing a third stop layer 143 ($Al_2O_3$ or AlN) in contact with the first face of the reading support 351, depositing a layer of sacrificial material 372 in contact with the third stop layer 143, localized etching of the layer of sacrificial material and of the third stop layer 143 to form a first, second, third and fourth opening in the layer of sacrificial material 372, said openings being open respectively on the first, second, third and fourth supply connection zone, filling the first, second and third and fourth opening by a conductor coating of titanium nitride TiN (not shown) and by copper Cu so as to form the fourth part 311, 321, 331, 341 of the first, second, third and fourth connection arms 310, 320, 330, 340, planarization of the layer of sacrificial material in order to remove the excess titanium nitride and copper, the reading support 352 being thus formed, as illustrated in FIG. 11F.

Figure 11G:
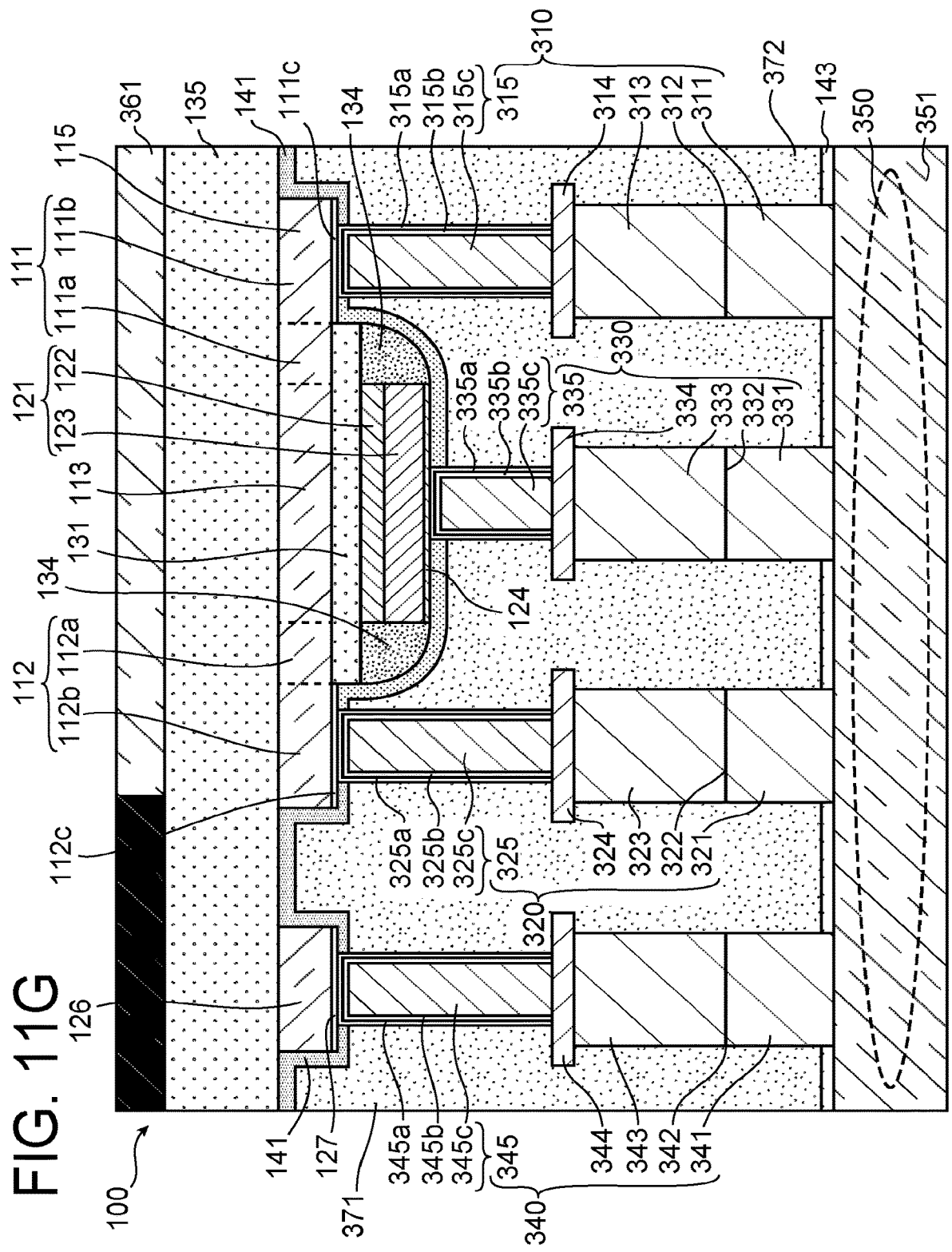
Figure 11H:
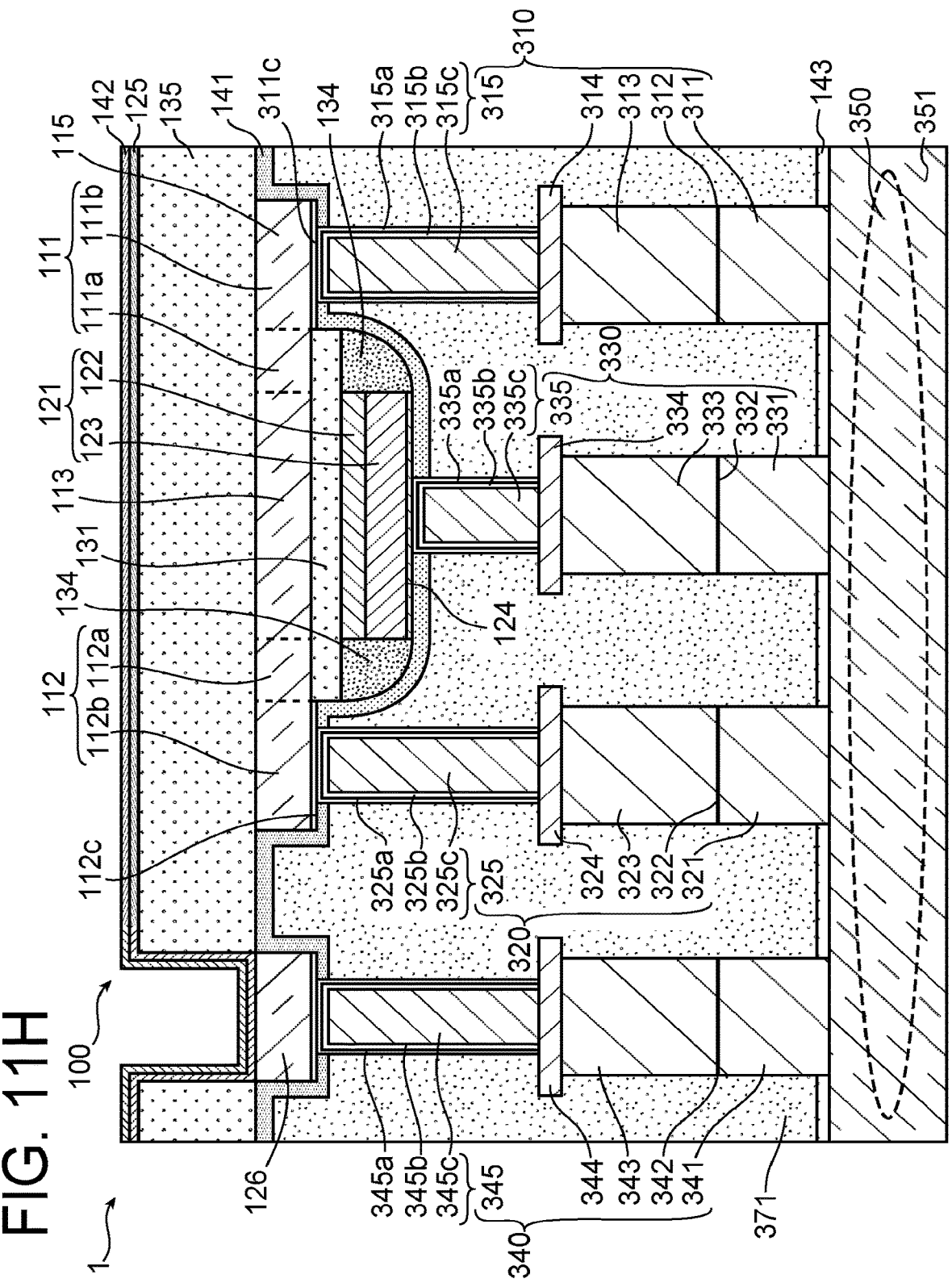

The third phase of assembly of the detection structure with the reading substrate comprises the following steps:

bonding the detection support 101 with the reading support 352 by mixed copper/copper and sacrificial material/sacrificial material molecular bonding in assembling the face of the detection support comprising the third detection parts 313, 323, 333, 343 of the connection arms 310, 320, 330, 340 with the face of the reading support 352 comprising the fourth detection parts 312, 322, 332, 342 of the connection arms 310, 320, 330, 340 as illustrated in FIG. 11G.

removing the semiconductor substrate 361, optional partial etching of the second gate dielectric layer 135 so as to reduce the thickness of the second gate dielectric layer 135, forming an opening in the second gate dielectric layer 135 that opens on the connection zone 126, depositing a layer of titanium nitride TiN to form the second gate electrode 125 in contact with the second gate dielectric layer 135, localized etching at the periphery of the detection structure 100, of the second gate electrode 125 and of the second gate dielectric layer 135, stopping the etching on the first stop layer, depositing the second stop layer 142, as illustrated in FIG. 11H, optionally individualizing, here in particular in the context of collective manufacture of detectors for example in the form of arrays, of the detection structure 100 by localized etching at the periphery of the detection structure of the second stop layer 142, and of the first stop layer 141, stopping the etching on the layer of sacrificial material 371, removing, by selective etching, the sacrificial material 371, 372 in particular by placing in contact the assembly of detection support 101/reading support 252 with hydrofluoric acid in vapor phase, the detection component 1 being thus formed as illustrated in FIG. 10.

Second Embodiment

Figure 12:
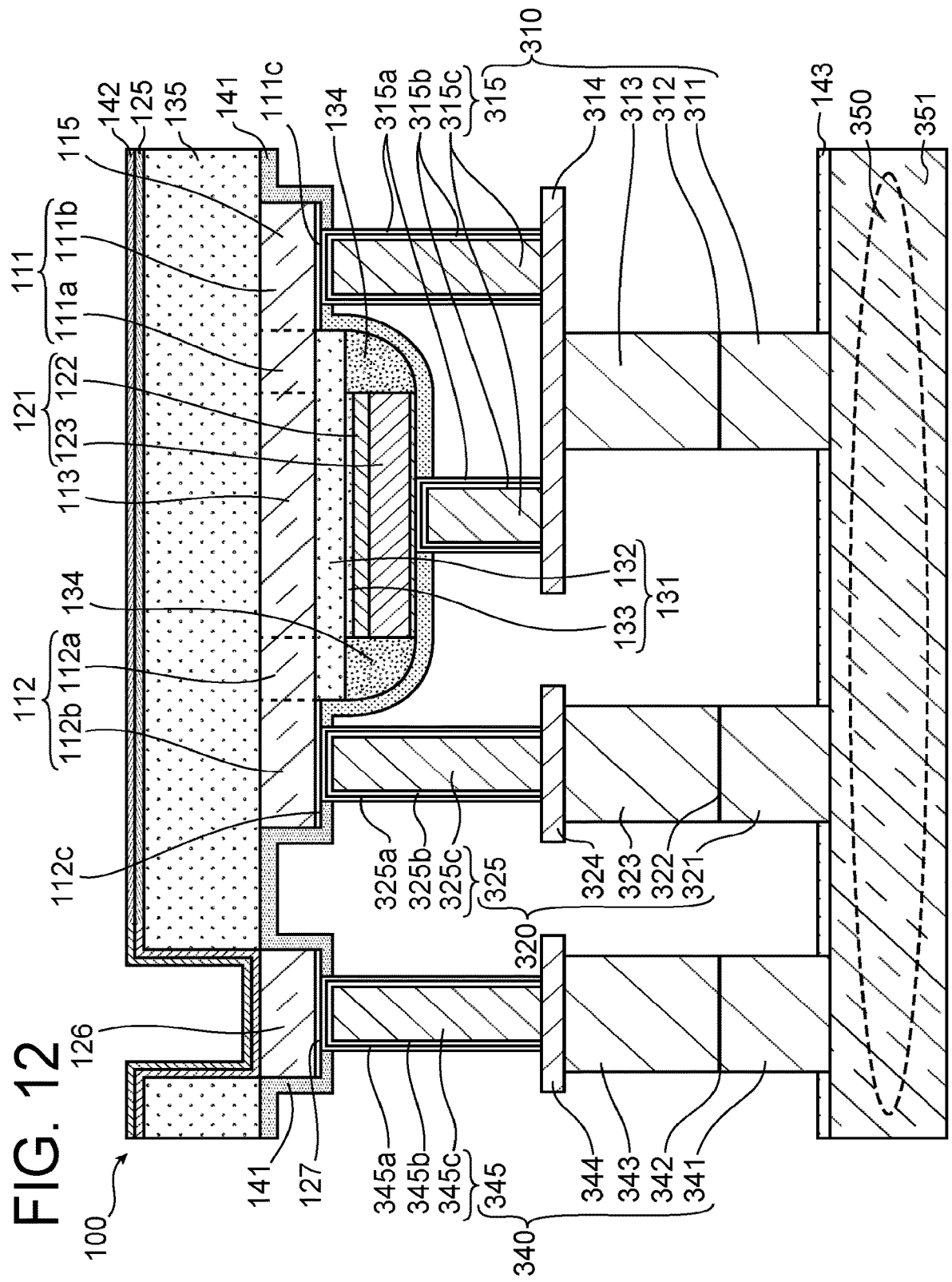
FIG. 12 illustrates a detection component according to a second embodiment in accordance with the third possibility for the invention, FIGS. 13A and 13B respectively illustrate a first and a second specific step of a method for manufacturing a detection component according to the second embodiment.

FIG. 12 illustrates an electromagnetic radiation detection component 1 according to a second embodiment in accordance with the third possibility for the invention.

Thus in accordance with the third possibility for the invention, a detection component 1 according to this second embodiment is distinguished from a detection component 1 according to the first embodiment in that the source zone 111 and the first gate electrode 121 are short-circuited, these sharing the first connection arm 310 which has a separation in order to apply to them a same biasing in parallel, in that the first gate dielectric layer 131 has a dipolar interface, in that the supply circuit 350 makes it possible to supply the detection structure 1 in accordance with the third possibility for the invention.

Thus, as shown in FIG. 12, in this second embodiment, the first gate dielectric layer 131, in order to enable such formation of a dipolar interface, comprises a first and a second sub-layer 132, 133 of respectively a first and a second dielectric material able to form together the dipolar interface by the creation of an electrostatic dipole between them. In the present second embodiment, the first sub-layer 132, which is the one covering the channel zone 113 and the first parts 111a, 112a of the source zone 111 and of the drain zone 112, is a layer of silicon dioxide while the second sub-layer 133, disposed between the first sub-layer 132 and the gate electrode, is produced from alumina $Al_2O_3$.

The first sub-layer 132 may have a thickness comprised between 5 and 15 nm while the second sub-layer 133 has a thickness comprised between 3 and 15 nm.

Similarly, as shown in FIG. 12, the first connection arm 310 has a double fifth connection part 315, one extending between the second thermal insulation part 314 and the first connection gate 121 and the other extending between the second thermal insulation part 314 and the second part 111b of the source zone 111.

Thus, the detection component only comprises a first, a second and a fourth connection arm 310, 320, 340 and the connection circuit 350 only comprises a first, second and third supply connection zone in connection with said first, second and fourth connection arms 310, 320, 340.

Figure 13A:
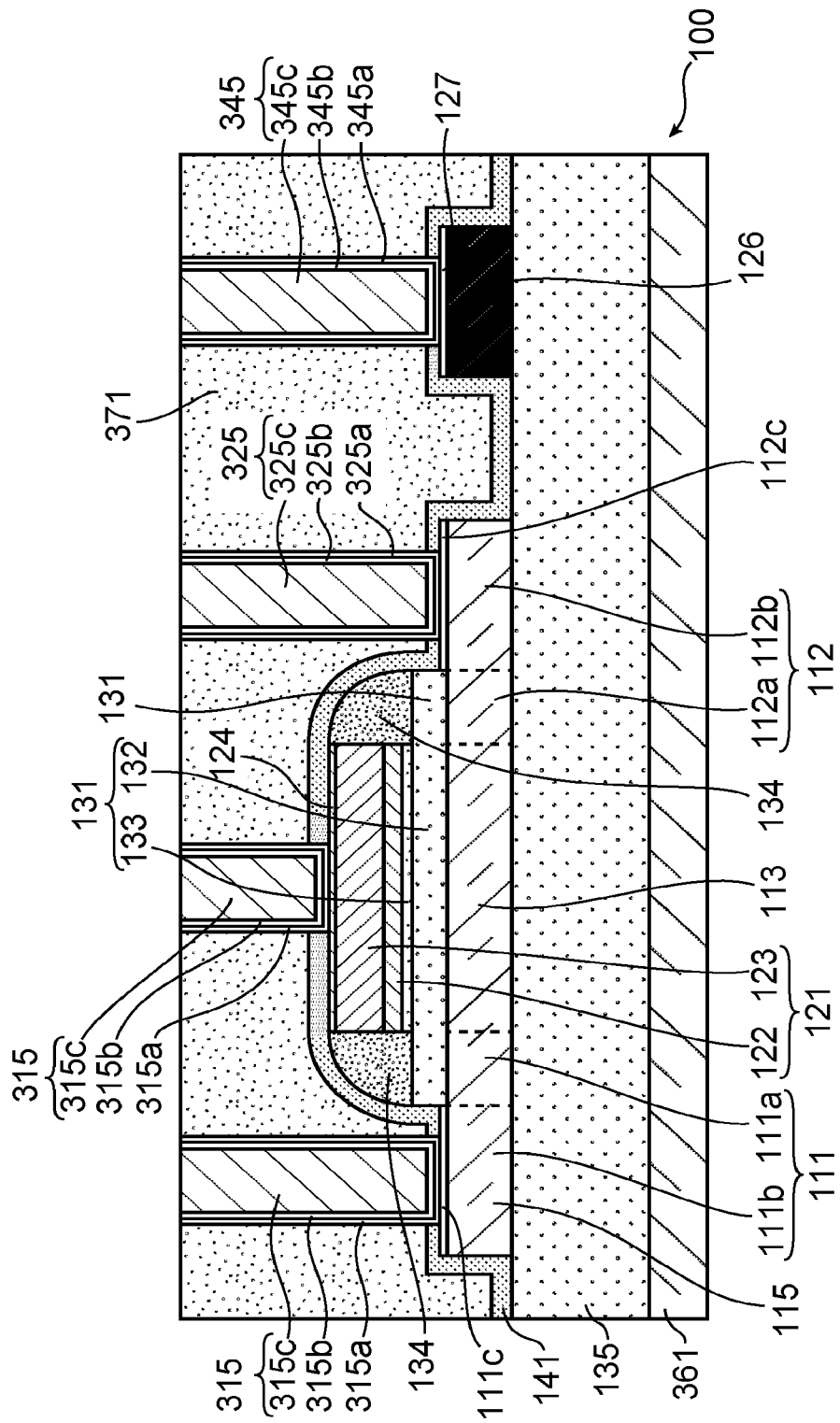
Figure 13B:
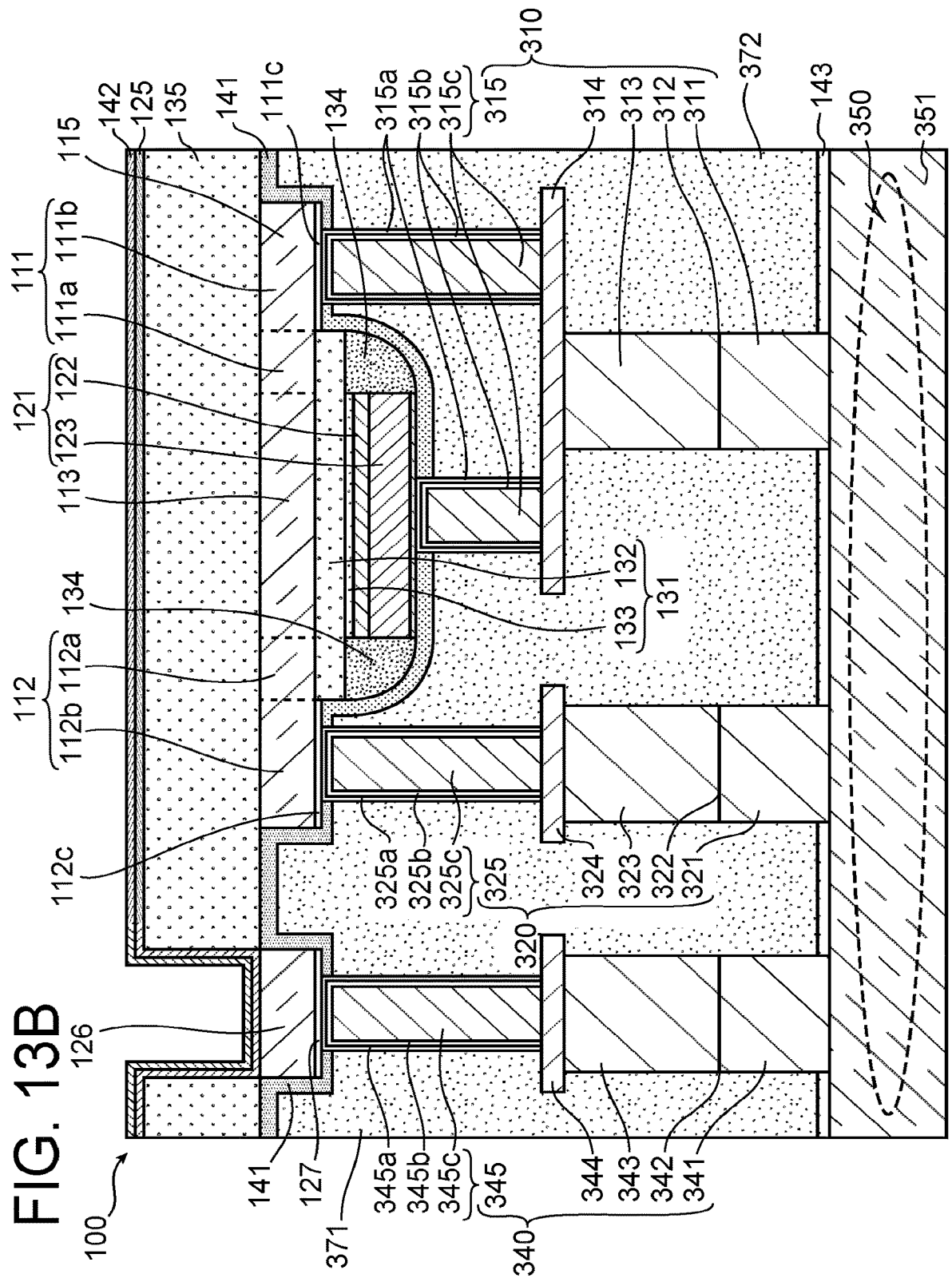

A method for manufacturing a detection component 1 according to the second manufacturing method is distinguished from a manufacturing method according to the first embodiment in that:
the step of thermal oxidation of the semiconductor layer 115 makes it possible to form the first sub-layer 132 of the first gate dielectric layer 131,
between the step of thermal oxidation of the semiconductor layer 115 and the step of successive and localized deposition of the first conductor layer 122 and of the second conductor layer 123, there is provided an additional step of localized deposit of the second sub-layer 133 in contact with the first sub-layer 132,
at a step of forming the third thermal insulation parts 314, 324, 344 of the connection arms 310, 320, 340 in accordance with the teaching of document U.S. Ser. No. 16/334,109, only the first, second and third second thermal insulation parts 314, 324, 344 are formed, as shown in FIGS. 12 and 13A,
at the step of providing the reading substrate, the supply circuit 351 only comprises a first and a third supply zone and is in accordance with the third possibility for the invention,
at the steps related to the manufacture of the fourth and third bonding parts 311, 321, 331, 322, 322, 332 of the connection arms 310, 320, 340, only the first, second and fourth fourth and third bonding parts 311, 321, 331, 322, 322, 332, are produced, as shown in FIG. 13B.

Figure 14:
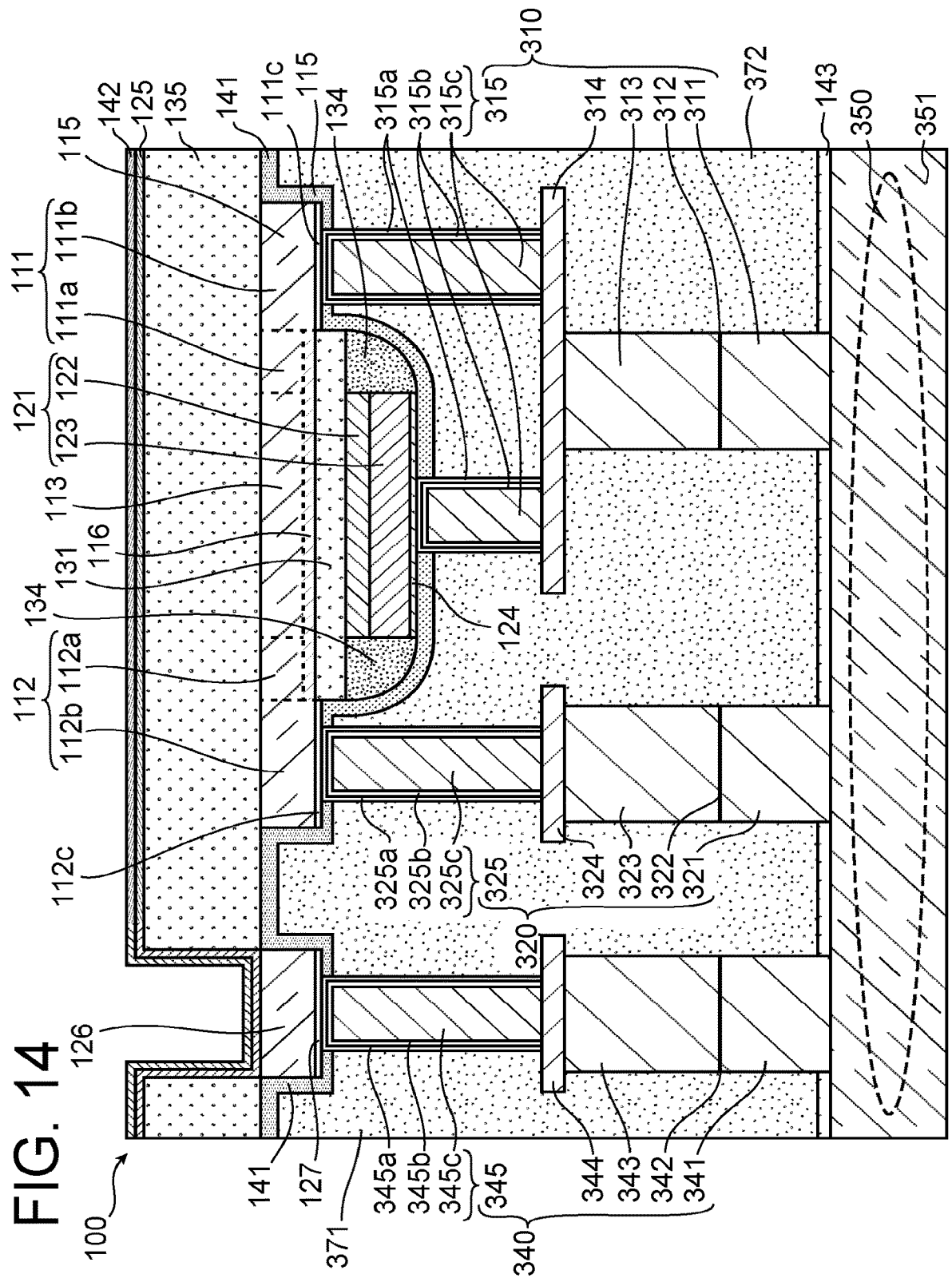
FIG. 14 illustrates a detection component according to a variant of the second embodiment in accordance with the variant of the third possibility for the invention.

FIG. 14 illustrates a detection device 1 according to a variant of this second embodiment in which the detection structure 100 comprises, instead of a dipolar interface, over-doping of a portion 116 of the channel zone configured for the formation of the blocking layer 114 in doping elements of the second conductivity type, that is to say, in the present embodiment, electron acceptor doping elements, such as atoms of boron or indium obtained by ionic implantation of ions of boron B, boron fluoride BF2 or ions of indium In.

Thus, according to this variant, such a detection device 1 is distinguished from a detection device 1 according to the second embodiment in that:
the first gate dielectric layer 131 comprises a single dielectric layer, in the present variant a silicon dioxide in accordance with the teaching of the first embodiment,
the channel zone 113 comprises a portion 116, configured to form the blocking layer 114, having over-doping in electron acceptor elements, such as over-doping of the order of $1.10^{19}$ cm$^{-3}$ over a thickness of 20 nm.

Figure 15:
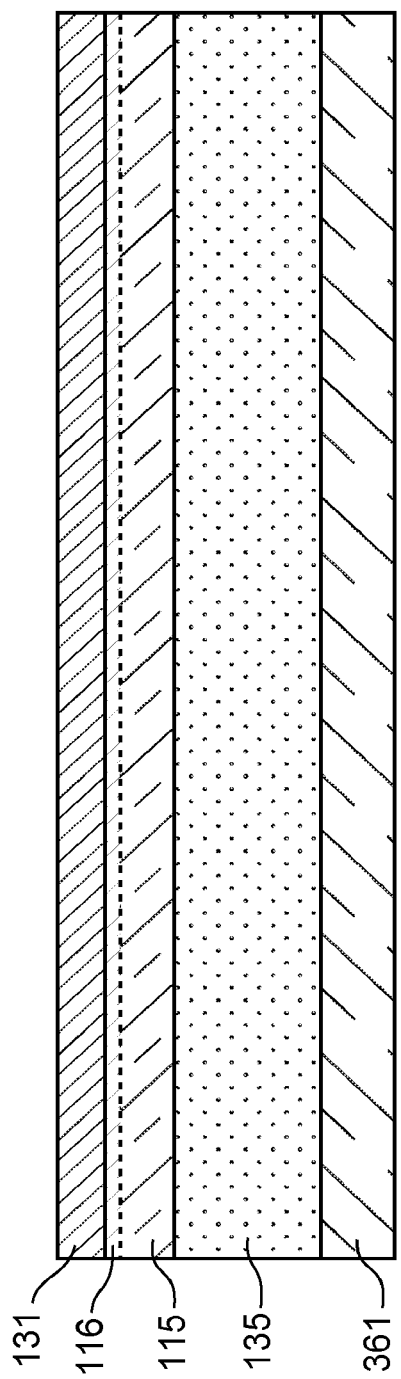
FIGS. 15A to 15C illustrate, for FIGS. 15A and 15B, a first and a second specific step of a method for manufacturing a detection component according to the variant of the second embodiment and, for FIG. 15C, a graph showing the doping principle implemented in the context of the manufacture of a detection component according to the variant in the second embodiment of the invention.

Thus, the method for manufacturing a detection device according to this variant of the second embodiment is distinguished from a method for manufacturing a device according to the second embodiment in that:
before the step of oxidizing the first semiconductor layer 115 to form the first gate dielectric layer 131, there are provided the additional steps of forming a layer of sacrificial oxide, implanting the channel zone 113 over part of its depth with doping elements of the second conductivity type, and of removing the layer of sacrificial oxide, the step of activation thermal annealing also making it possible to activate the doping elements of the second conductivity type implanted in part of the channel zone 113 configured to form the blocking layer, as illustrated in FIG. 15A,
no additional step is provided of localized deposition of the second sub-layer 133 in contact with the first sub-layer 132.

Figure 15B:
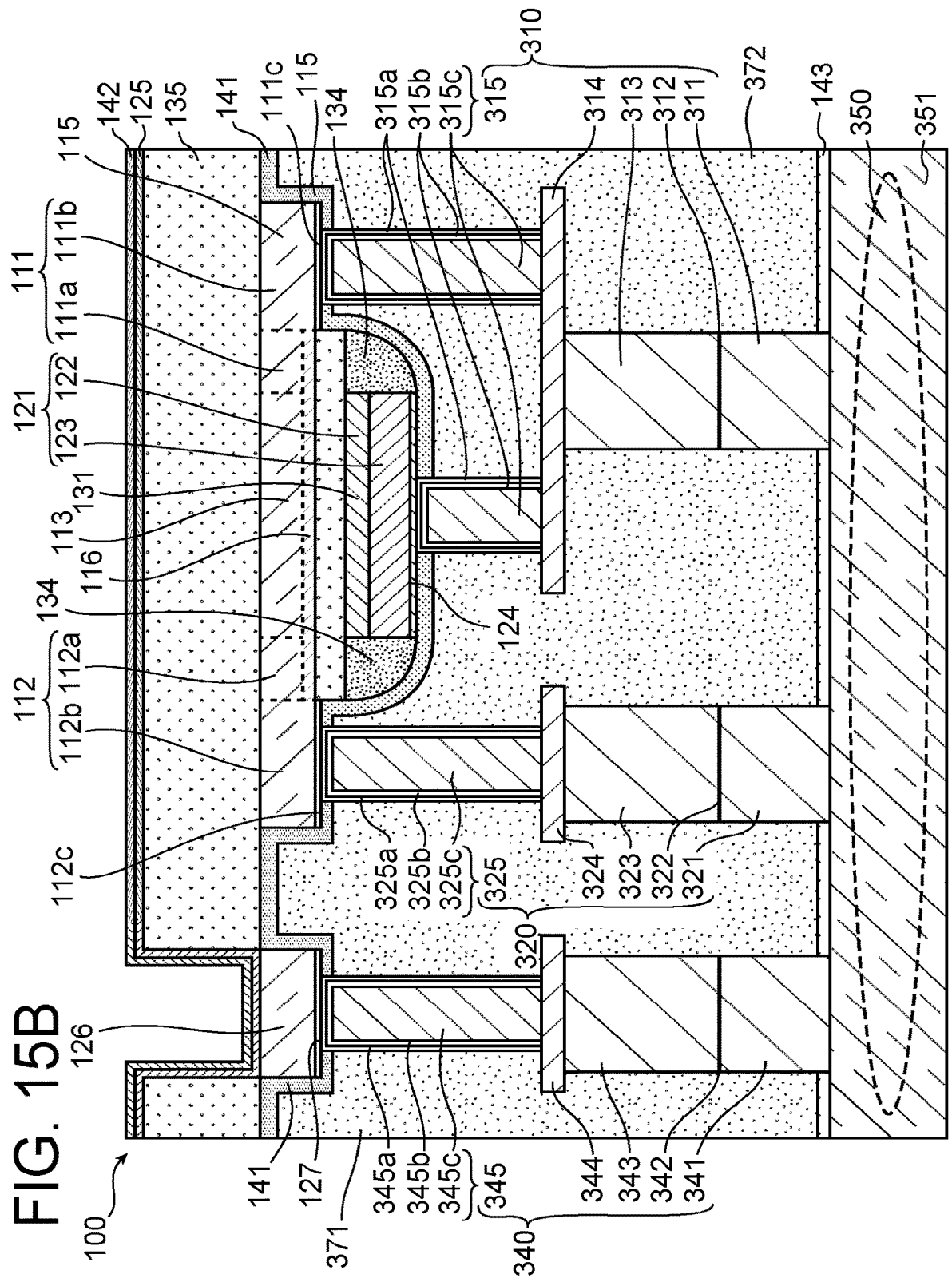

Thus, in this variant of the second embodiment, in accordance with the second embodiment, the first insulation arm is arranged to enable voltage supply of the source zone 111 and of the first gate electrode 121, as illustrated in FIG. 15B illustrating the manufacture of the component just prior to the step of selective etching of the sacrificial material.

Figure 15C:
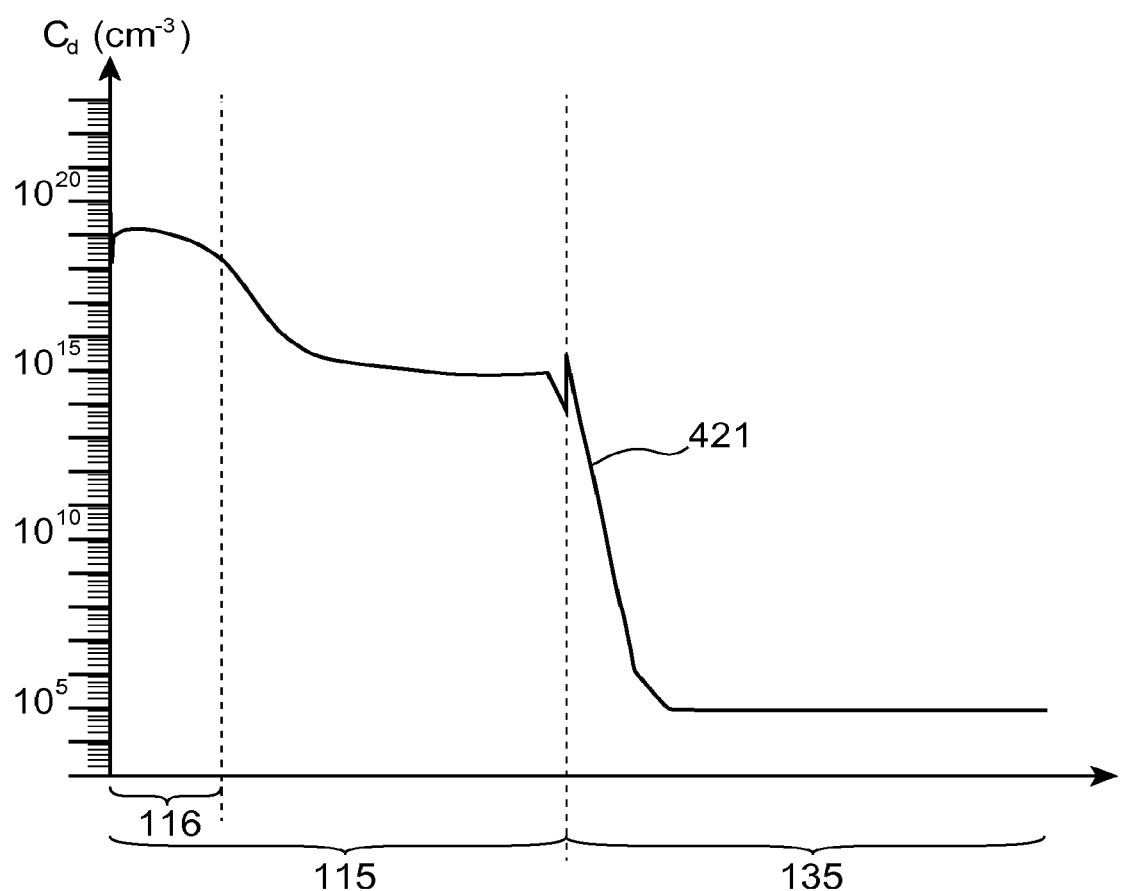

Using a graph, FIG. 15C illustrates the principle of localized implantation which can be implemented in such a variant of the second embodiment. As a matter of fact, this figure shows the simulated result of an implantation with boron fluoride ions $BF_2+$ through a layer of silicon dioxide of a thickness of 10 nm for a dose of $1.10^{15}$ cm$^{-2}$ at an implantation energy of 3 keV for a first layer of silicon of 67 nm and activation thermal annealing for 1 s at 1050° C.

In this figure showing the concentration of doping elements Cd as a function of the depth obtained with such a procedure, it can thus be seen that it is possible to form a portion 116 of the channel zone 113 configured for forming the blocking layer 114 having a concentration of majority carriers of the second conductivity type of the order of $10^{19}$ cm$^{-3}$ over a thickness of 20 nm, the rest of the layer having a concentration of majority carrier of the second conductivity type tending towards $10^{15}$ cm$^{-3}$. It will be noted that, in accordance with the manufacturing method, the portion 116 also extends in the first parts 111a, 112a of the source zone 111 and of the drain zone 112.

Thus, according to this variant of the second embodiment, at the additional step of localized implantation of the channel zone, it is possible to achieve implantation of boron fluoride ions $BF_2+$ with a dose comprised between $1.10^{14}$ and $1.10^{15}$ cm$^{-2}$ and an implantation energy comprised between 3 and 8 keV.

Third Embodiment

Figure 16A:
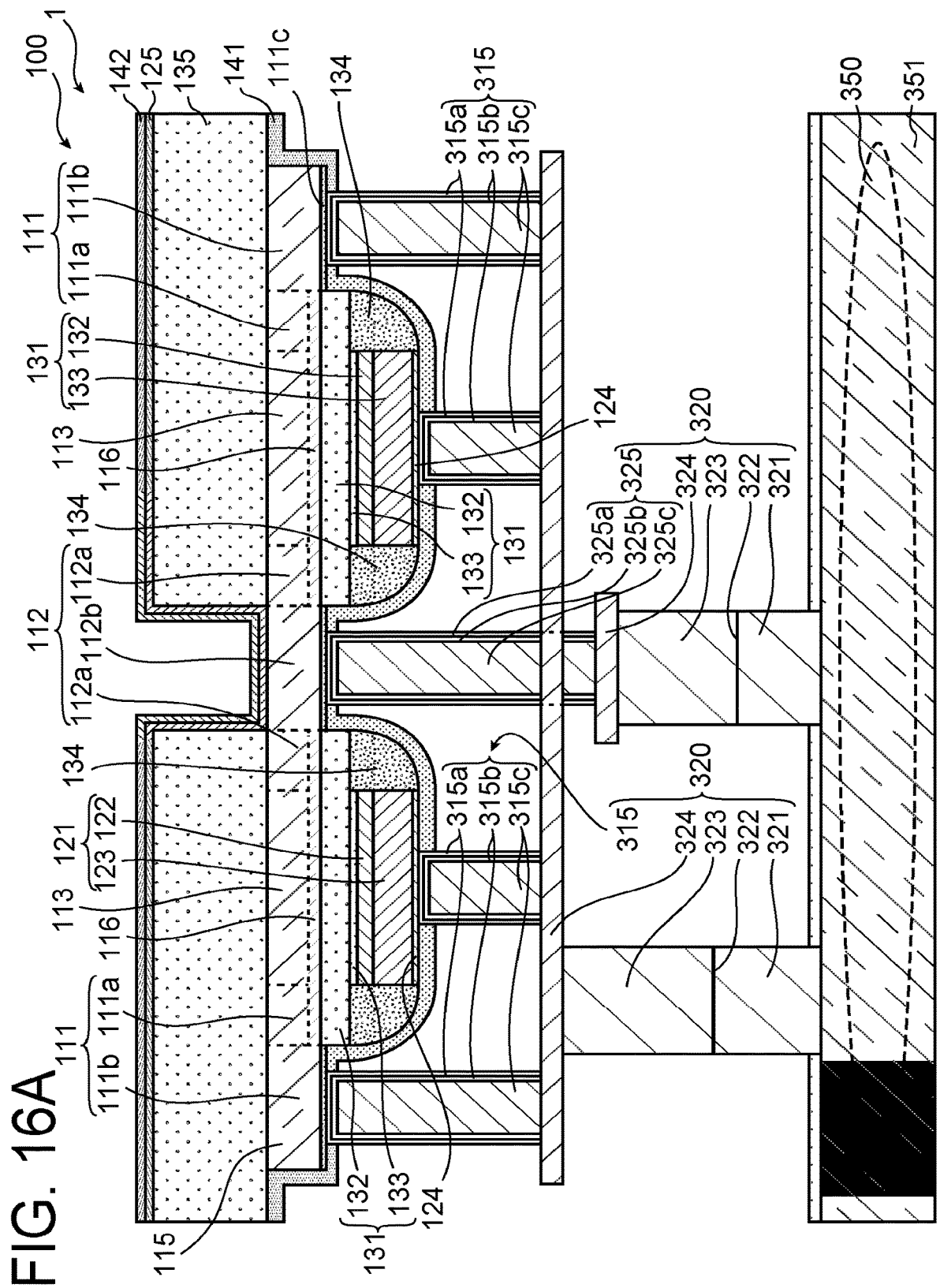
FIGS. 16A and 16B illustrate a component respectively according to a third embodiment in accordance with the fourth possibility for the invention and a variant of that third embodiment, FIG. 16A illustrating a cross-section view of such a detection component and FIG. 16B illustrating a view from below showing the contact tracks of said variant enabling the biasing of the source and drain zones and of the first and second gate electrodes.
Figure 16B:
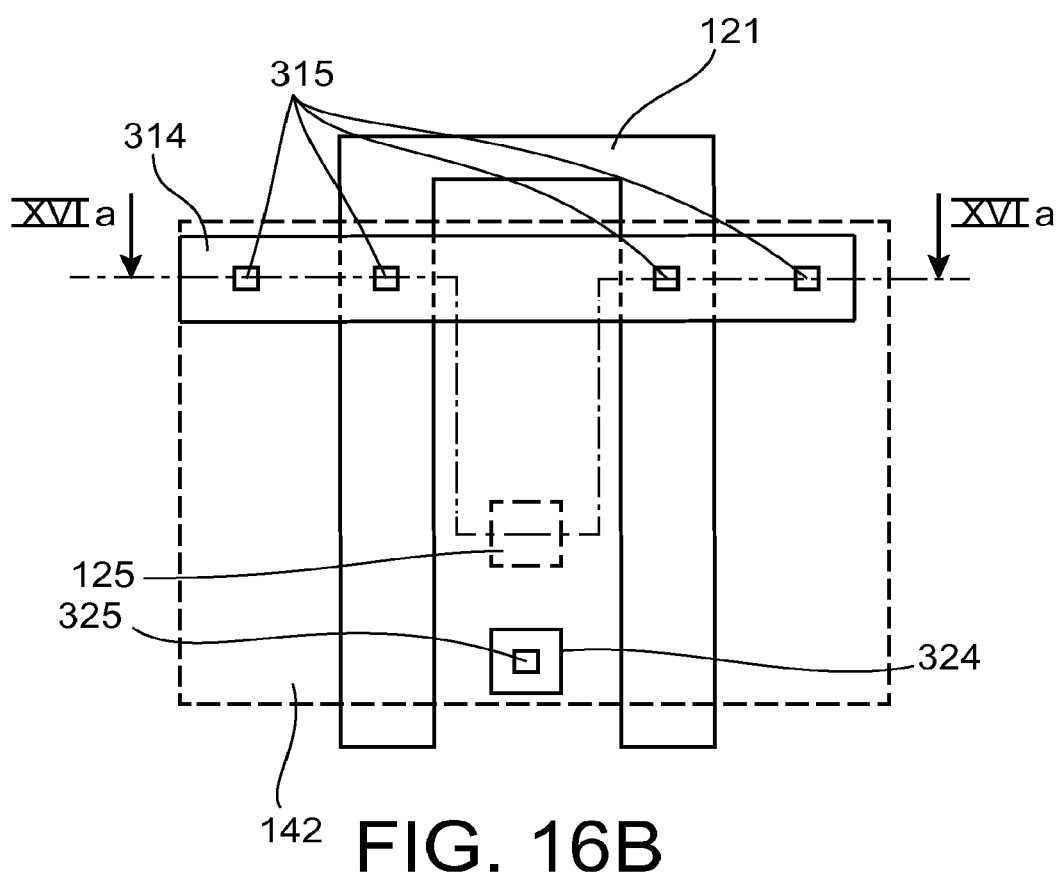

FIGS. 16A and 16B illustrate an electromagnetic radiation detection component 1 according to a third embodiment in accordance with the fourth possibility for the invention in the configuration in which the detection structure has a ratio of width of the channel zone/to length of the channel zone optimized according to a principle similar to that of FIG. 4B.

A detection component 1 according to this third embodiment is distinguished from a detection component according to the second embodiment in that:

- there is provided an over-dosing of the portion 116 of the channel zone 113 configured for forming the blocking layer 114 in accordance with the variant of the second embodiment,
- the second gate electrode 125 is short-circuited with the drain zone 112, such a configuration being provided in this present embodiment by substituting the drain zone 112 for the connection zone 126 as FIGS. 16A and 16B show, the detection structure 100 being thus devoid of connection zone 126 as such,
- the source zone 111 and the channel zone 113 are doubled into respectively two source sub-zones and two channel sub-zones, the source sub-zones and the channel sub-zones being disposed on opposite sides of the drain zone so as to form a double transistor, in accordance with the doubling of the channel zone 113, the first gate electrode 121 is also doubled, as illustrated in FIGS. 16A and 16B, and
- the supply circuit 350 makes it possible to supply the detection structure 1 in accordance with the fourth possibility for the invention.

It will be noted that, in accordance with the manufacturing method, in this third embodiment, the over-doped portion 116 also extends in the first parts 111a, 112a of the source zone 111 and of the drain zone 112.

It can thus be seen that in this third embodiment, the channel zone 113 has, in similar manner to the variant of the second embodiment, over-doping of doping elements of the second conductivity type in a portion 116 of the channel zone 113 configured for the formation of the blocking layer 114, such as over-doping of the order of $1.10^{19}$ cm$^{-3}$ over a thickness of 20 nm.

Similarly, as illustrated in FIG. 16A in order to optimize the ratio of width of the channel zone/to length of the channel zone, the detection structure has a central drain zone 112 with on one side a first source sub-zone and channel sub-zone assembly and on the other side a second source sub-zone and channel sub-zone assembly.

In FIGS. 16A and 16B it is also possible to see that, in this embodiment, in similar manner to the second embodiment, the first connection arm 310 has a first connection part 315 quadrupled to enable connection of each of the source sub-zones 111 and of each of the gate sub-electrodes 121, the second thermal insulation part 314 extending over the full width of the detection structure 100, or even beyond, in order to make it possible to connect all the elements of the quadrupled first connection part 315 of the first connection arm 310.

The method for manufacturing a detection component 1 according to this third embodiment is distinguished from a detection component 1 according to the second embodiment in that:

- at the step of localized etching of the first semiconductor layer 115, this etching is carried out in order to preserve the part of the first semiconductor layer 115 configured to form the source and channel sub-zones 111, 113 and the central drain zone 112, this part being devoid of any connection zone as such since it is the drain zone 112 which serves as connection zone for the second gate electrode 121,
- before the step of oxidizing the first semiconductor layer 115 to form the first gate dielectric layer 131, there are provided the additional steps of forming a layer of sacrificial oxide, localized implanting of the channel zone 113 over part of its depth with doping of the second conductivity type, and removing the layer of sacrificial oxide, the step of activation thermal annealing also making it possible to activate the doping elements of the second conductivity type implanted in the blocking layer,
- at the step of localized etching of the layer of sacrificial material 371 to form a respective opening corresponding to the first part 315, 325 of each connection arm 310, 320, there are provided four openings for the first connection part 315 of the first connection arm 310 open respectively on each of the source sub-zones 111 and sub-first gate electrodes 121 and a single opening for the first connection part 325 of the second connection arm 320 corresponding to the drain zone 112, as such, the second gate electrode 125 being in contact with the drain zone 112 by an opening 313 through the second oxide layer 135, said two openings on the drain zone being superposed in the case of FIG. 16A and offset in the case of FIG. 16B,
- at the step of forming the second thermal insulation parts 314, 324 of the connection arms 310, 320 in accordance with the teaching of document U.S. Ser. No. 16/334,109, only the first and second thermal insulation parts 314, 324 are formed, the second thermal insulation parts 314 of the first connection arm 310 being in contact with each of the elements of the first connection part 315 of the connection arm 310,
- at the step of providing the reading substrate, the supply circuit only comprises a first and a second supply zone and the supply circuit is in accordance with the fourth possibility for the invention,
- at the steps related to the manufacture of the fourth and third bonding parts 311, 321, 322, 322 of the connection arms 310, 320, there are only produced the fourth and third bonding parts 311, 321, 322, 322 of the first and second connection arms 310, 320.

Of course, such a third embodiment is in particular provided in order to illustrate the possibility of optimizing the ratio of width of the channel zone/to length of the channel zone in the context of the invention by providing a transistor with channel multi-zones or multiple gates or for instance having a "multiple-tooth comb" gate, the structure having, in the present embodiment, two channel sub-zones 113 and thus a double gate electrode. According to the same principle and as already presented in connection with FIG. 4B, it can perfectly well be envisioned, without departing from the scope of the invention, to provide a detection component 1 having a number of channel sub-zones 113, and thus gates, greater than 2 (FIG. 4B), for example 3, or even 4 or even 7 channel sub-zones 113. Such a configuration is also known under the designation "multiple-tooth comb" gate.

Fourth Embodiment

Figure 17:
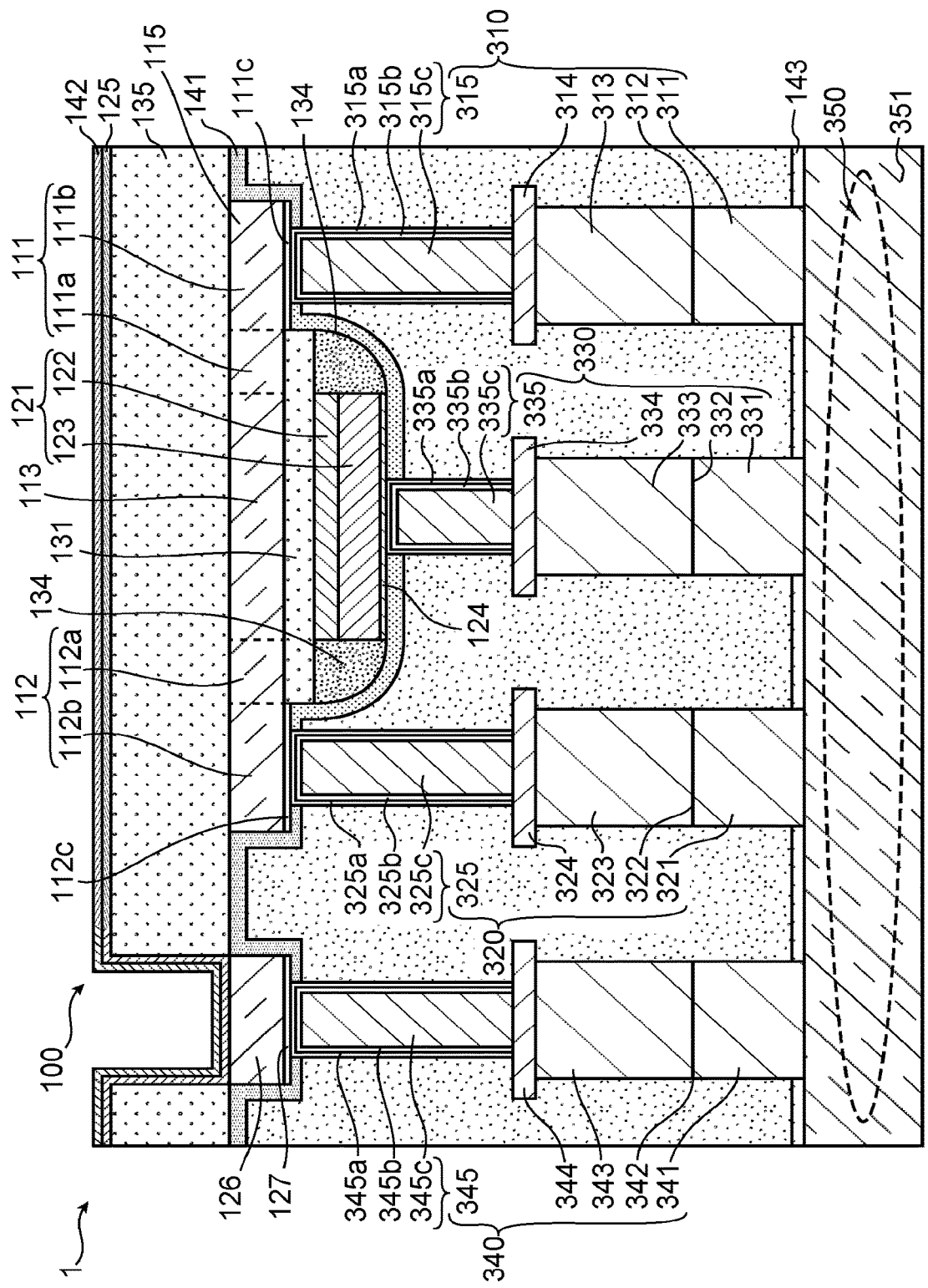
FIG. 17 illustrates a detection component according to a fourth embodiment in accordance with the fifth possibility for the invention.

FIG. 17 illustrates a detection device 1 according to a fourth embodiment of the invention in accordance with the fifth and sixth possibilities for the invention.

Thus a detection device 1 according to the fourth embodiment is distinguished from a detection device 1 according to the first embodiment in that the channel zone has the first conductivity type, that is to say, in this fourth embodiment, N-doping, and in that the supply circuit is configured to supply the detection structure 100 in accordance with one of the fifth and sixth possibility for the invention.

A method for manufacturing a detection device 1 according to this fourth embodiment is distinguished from a method for manufacturing a detection device 1 according to the first embodiment in that:

at the step of providing the SOI substrate comprising the semiconductor substrate 361, the layer of oxide configured to form the second gate dielectric layer 135 and the first semiconductor layer 115, the first semiconductor layer has the first conductivity type, and at the step of providing the first reading substrate 351, the supply circuit is in accordance with the fifth or sixth possibility.

Of course, in accordance with the first embodiment, as a variant, the supply circuit may also be configured to supply the detection structure according to the fifth possibility and according to the sixth possibility, it being possible for the supply circuit 350 to be controlled to pass from one to the other or to be configured to pass from one to the other according to certain conditions.

Fifth Embodiment

Figure 18:
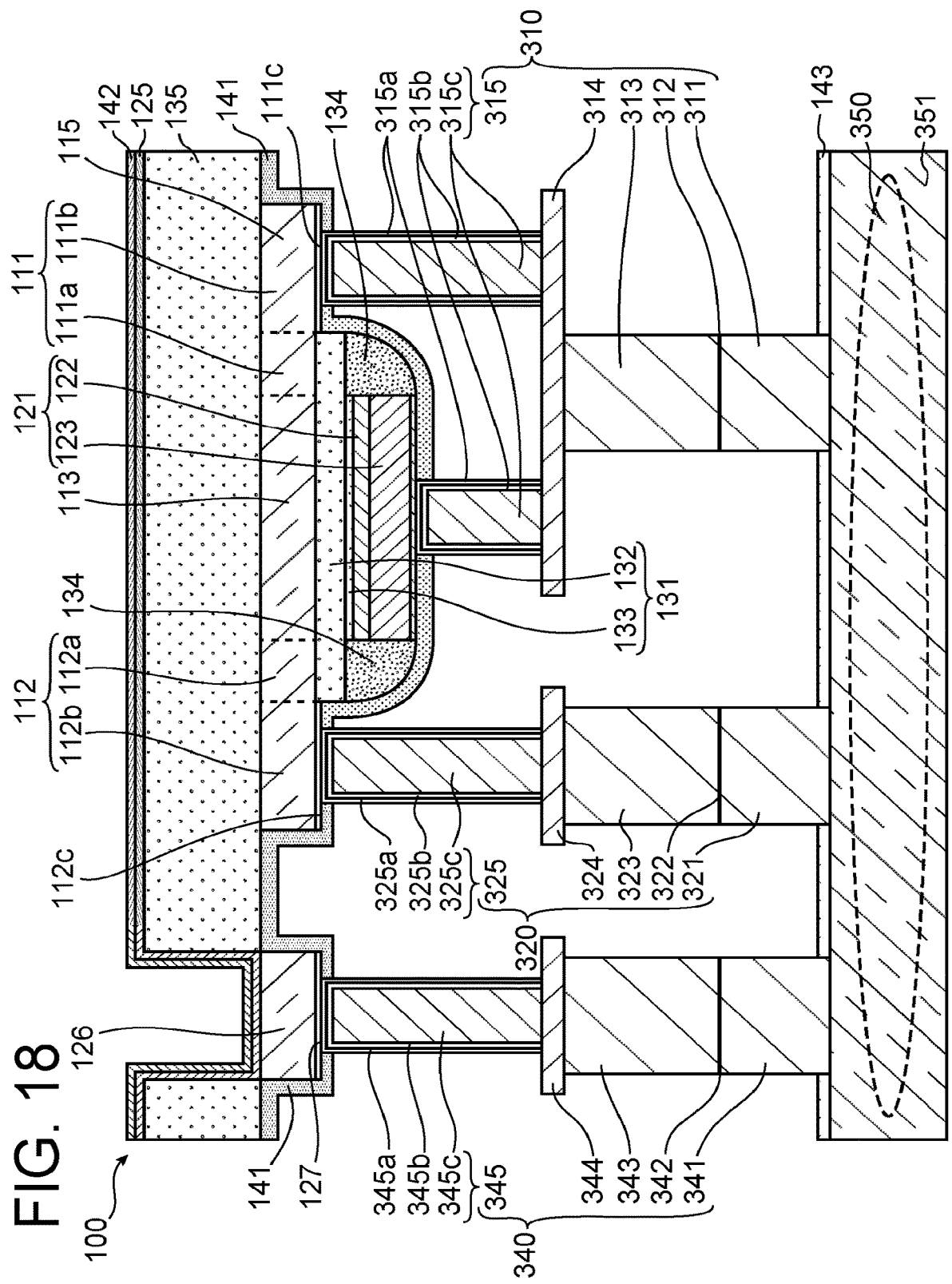
FIG. 18 illustrates a detection component according to a fifth embodiment in accordance with the seventh possibility for the invention, FIGS. 19A and 19B respectively illustrate a first and a second specific step of a method for manufacturing a detection component according to the fifth embodiment.

FIG. 18 illustrates a component according to a fifth embodiment in accordance with the seventh possibility for the invention.

Thus a detection device 1 according to the fifth embodiment is distinguished from a detection device 1 according to the second embodiment in that the channel zone has the first conductivity type, that is to say, in this fourth embodiment, N-doping, and in that the supply circuit is configured to supply the detection structure 100 in accordance with the seventh possibility for the invention.

A method for manufacturing a detection device 1 according to this fifth embodiment is distinguished from a method for manufacturing a detection device 1 according to the second embodiment in that:

at the step of providing the SOI substrate comprising the semiconductor substrate 361, the layer of oxide configured to form the second gate dielectric layer 135 and the first semiconductor layer 115, the first semiconductor layer has the same conductivity type, and at the step of providing the first reading substrate 351, the supply circuit is in accordance with the seventh possibility.

Figure 19A:
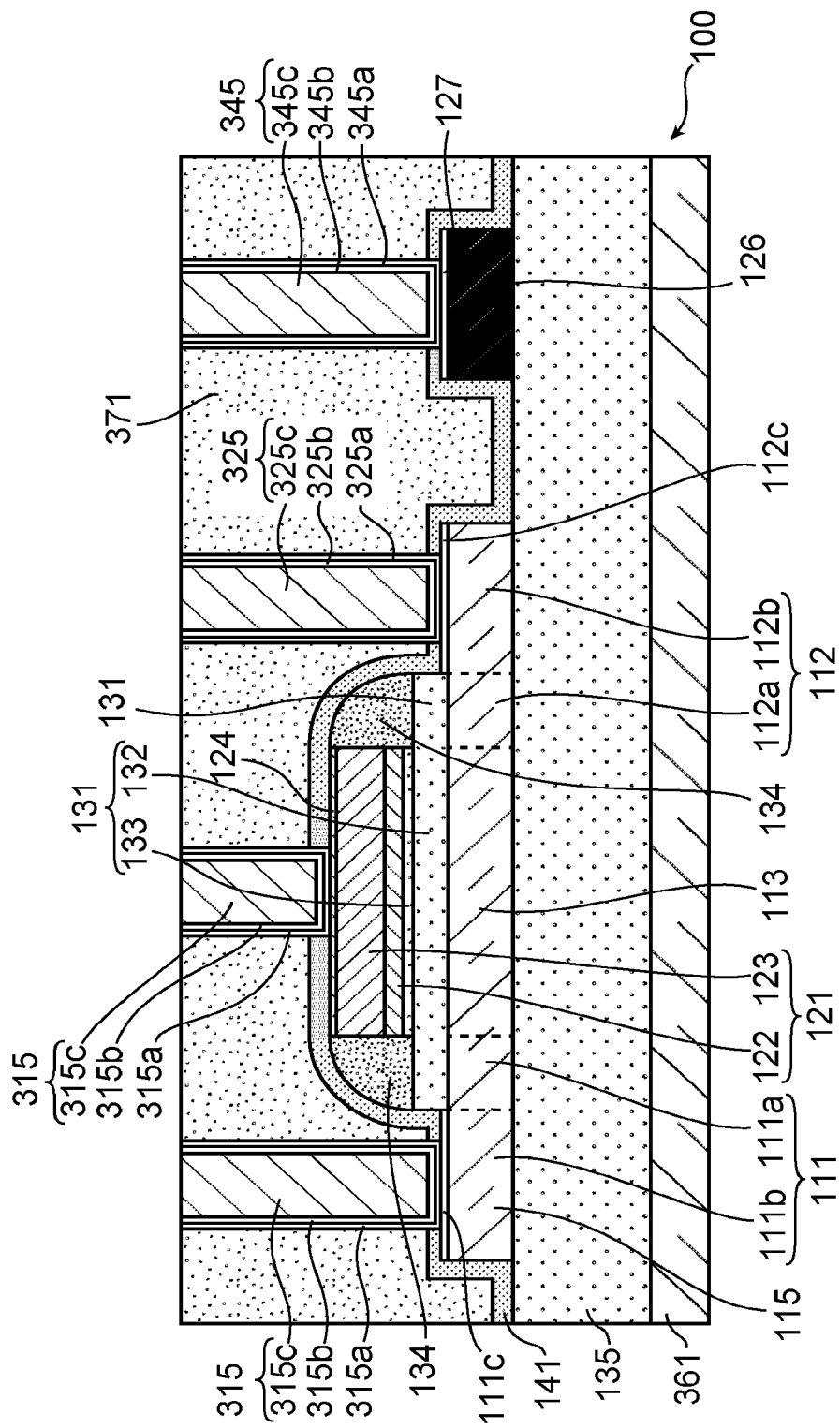

It will be noted in particular, that in accordance with the second embodiment and as illustrated in FIG. 19A, the first gate dielectric layer 131, in order to enable such formation of a dipolar interface, comprises a first and a second sub-layer 132, 133 of respectively a first and a second dielectric material able to form together the dipolar interface by the creation of an electrostatic dipole between them. In the present fifth embodiment, the first sub-layer 132, which is the one covering the channel zone 113 and the first parts 111a, 112a of the source zone 111 and of the drain zone 112, is a layer of silicon dioxide while the second sub-layer 133, disposed between the first sub-layer 132 and the gate electrode, is produced from alumina $Al_2O_3$.

Figure 19B:
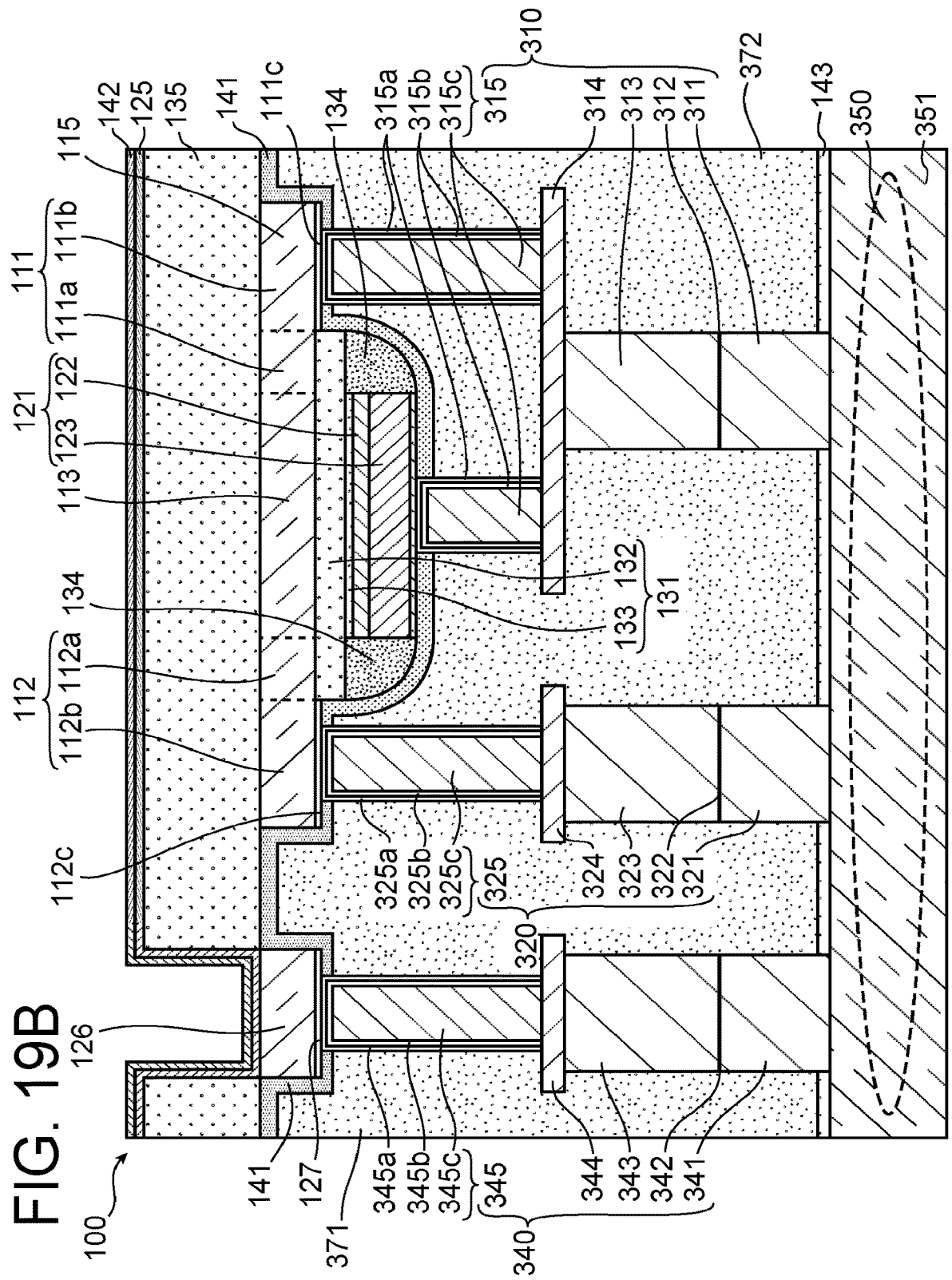

Moreover, as FIG. 19B shows, in such a fifth embodiment, the detection component 1 only comprises the second thermal insulation parts 314, 324, 344 of the first, second and fourth connection arms 310, 320, 340 that are formed such that the second thermal insulation part 314 of the first connection arm 310 makes it possible to connect the doubled first connection part of the first connection arm 310.

Figure 20:
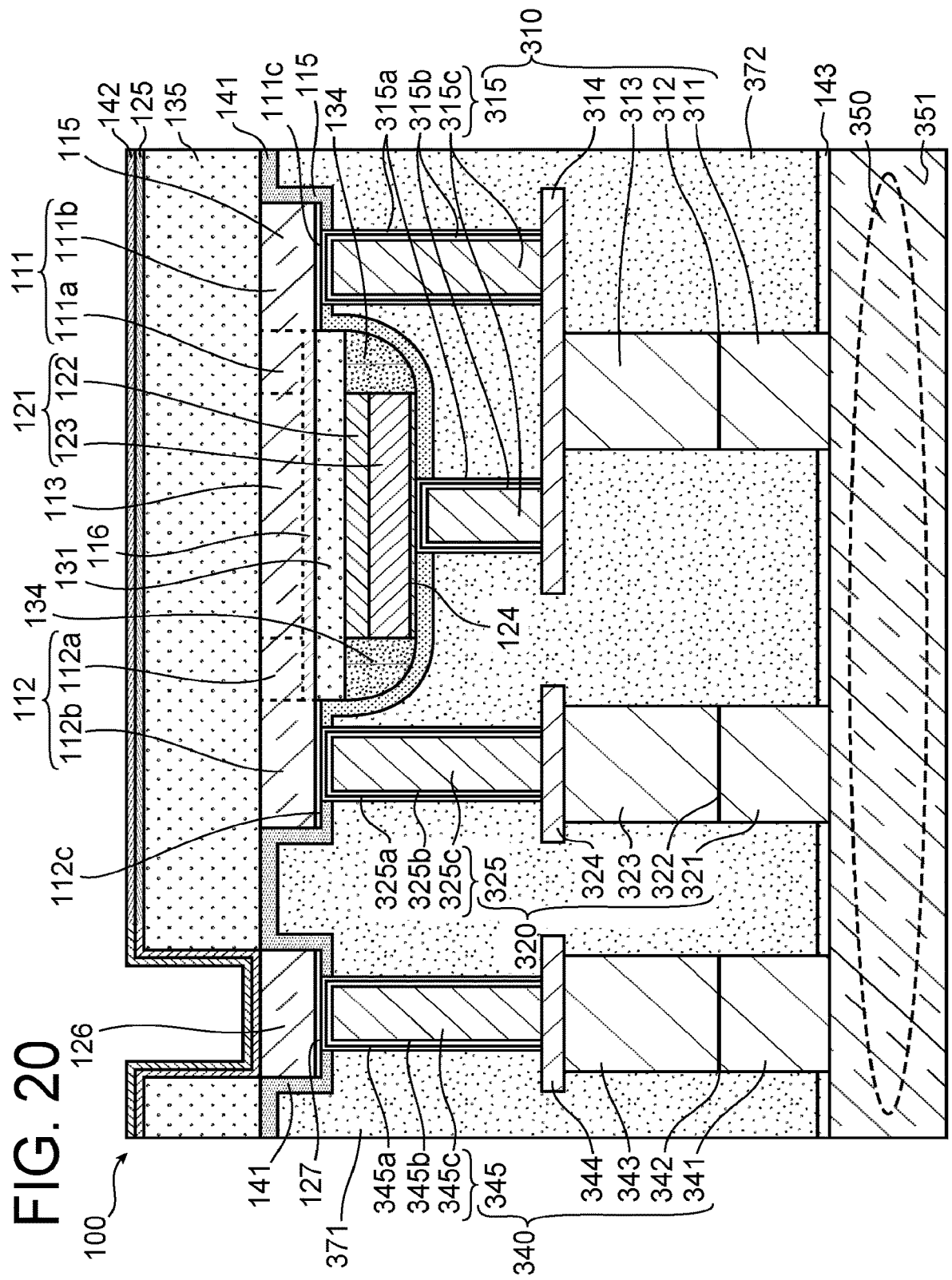
FIG. 20 illustrates a detection component according to a variant of the fifth embodiment in accordance with a variant of the seventh possibility for the invention, FIGS. 21A and 21B respectively illustrate a first and a second specific step of a method for manufacturing a detection component according to the variant of the fifth embodiment.

FIG. 20 illustrates a component according to a variant of the fifth embodiment in accordance with a variant of the seventh possibility for the invention.

Thus a detection device 1 according to this variant of the fifth embodiment is distinguished from a detection device 1 according to the variant of the second embodiment in that the channel zone has the first conductivity type, that is to say, in this variant of the fifth embodiment, N-doping, and in that the supply circuit is configured to supply the detection structure 100 in accordance with the seventh possibility for the invention.

A method for manufacturing a detection device 1 according to this fifth embodiment is distinguished from a method for manufacturing a detection device 1 according to the second embodiment in that:

at the step of providing the SOI substrate comprising the semiconductor substrate 361, the layer of oxide configured to form the second gate dielectric layer 135 and the first semiconductor layer 115, the first semiconductor layer has the same conductivity type, and at the step of providing the first reading substrate 351, the supply circuit is in accordance with the seventh possibility for the invention.

Figure 21A:
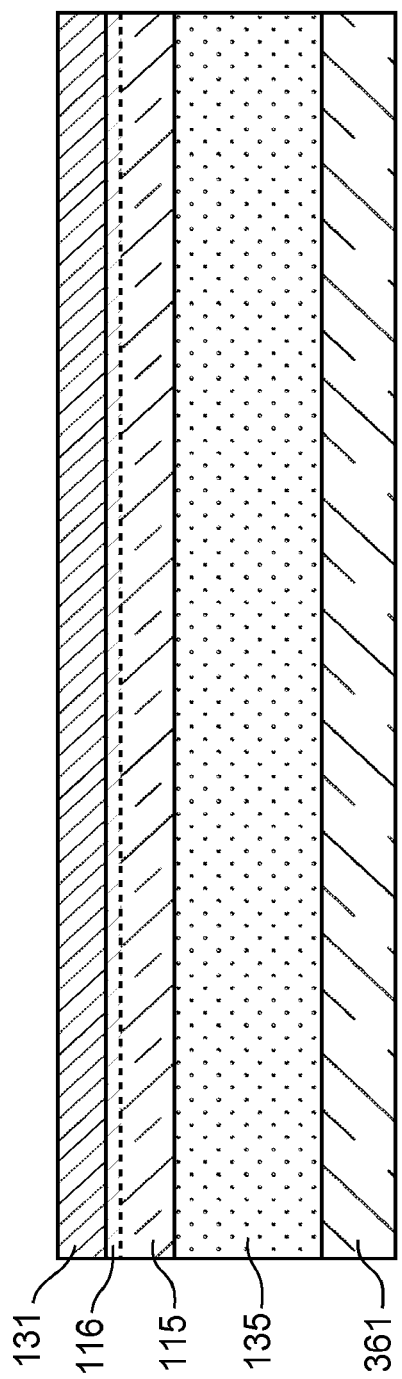

A detection component, according to the principle already presented in the context of the variant of the second embodiment in connection with FIG. 15C, forming the blocking layer by over-doping of a portion of the channel zone 113 configured for forming the latter may be obtained by means of implantation with boron fluoride ions $BF_2+$ or of indium In with a dose comprised between $1.10^{14}$ and $1.10^{15}$ $cm^{-2}$ and an implantation energy comprised between 3 and 8 keV, as illustrated in FIG. 21A.

Figure 21B:
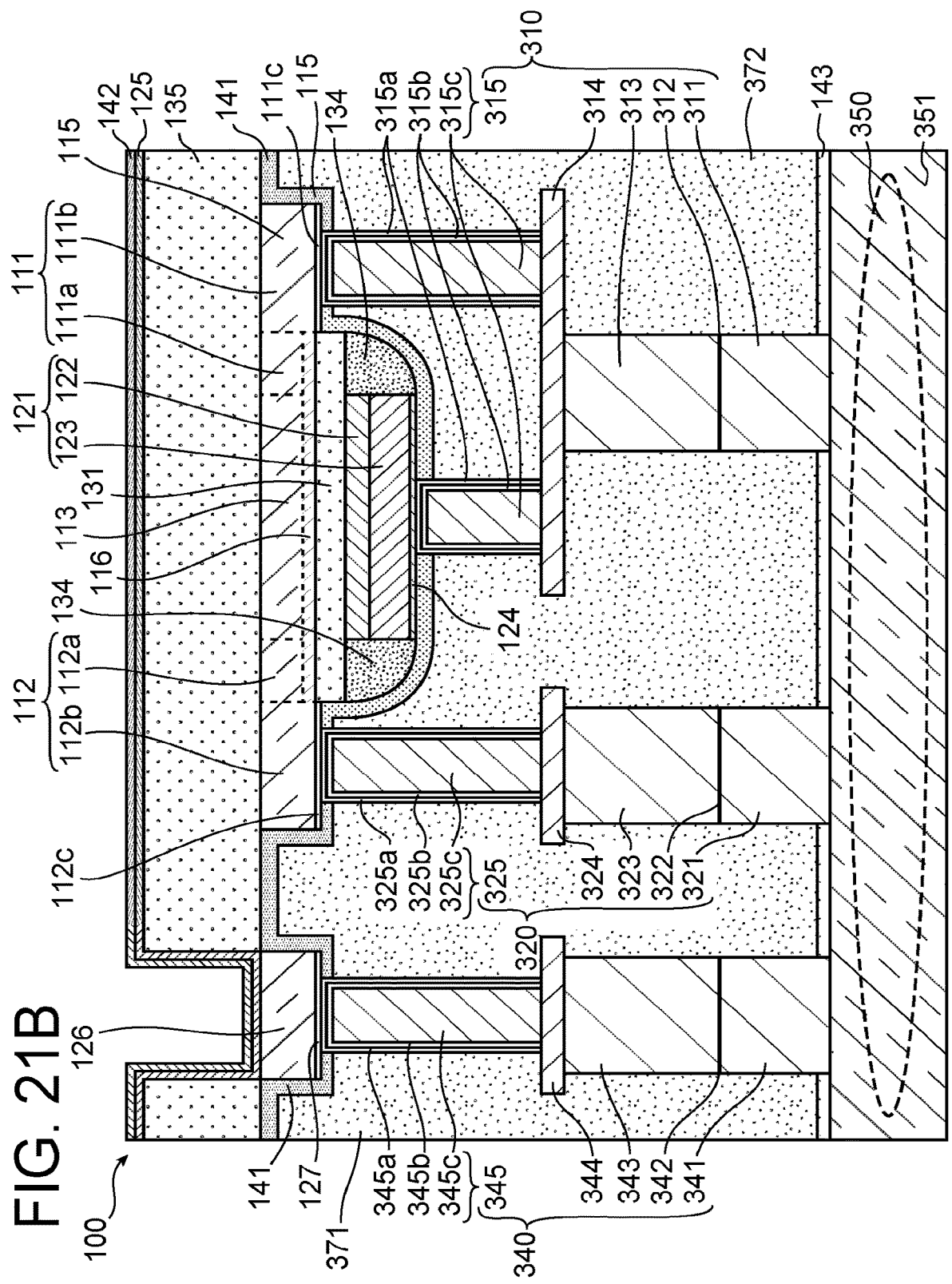

Furthermore according to this variant and in accordance with the fifth embodiment, the detection component 1 only comprises the second thermal insulation parts 314, 324, 344 of the first, second and fourth connection arms 310, 320, 340. As a matter of fact, as shown in FIG. 21B, from the second thermal insulation part 314 making it possible to connect the first doubled connection part of the first connection arm 310 and thus the source zone 111 and the first gate electrode 121.

Sixth Embodiment

Figure 22:
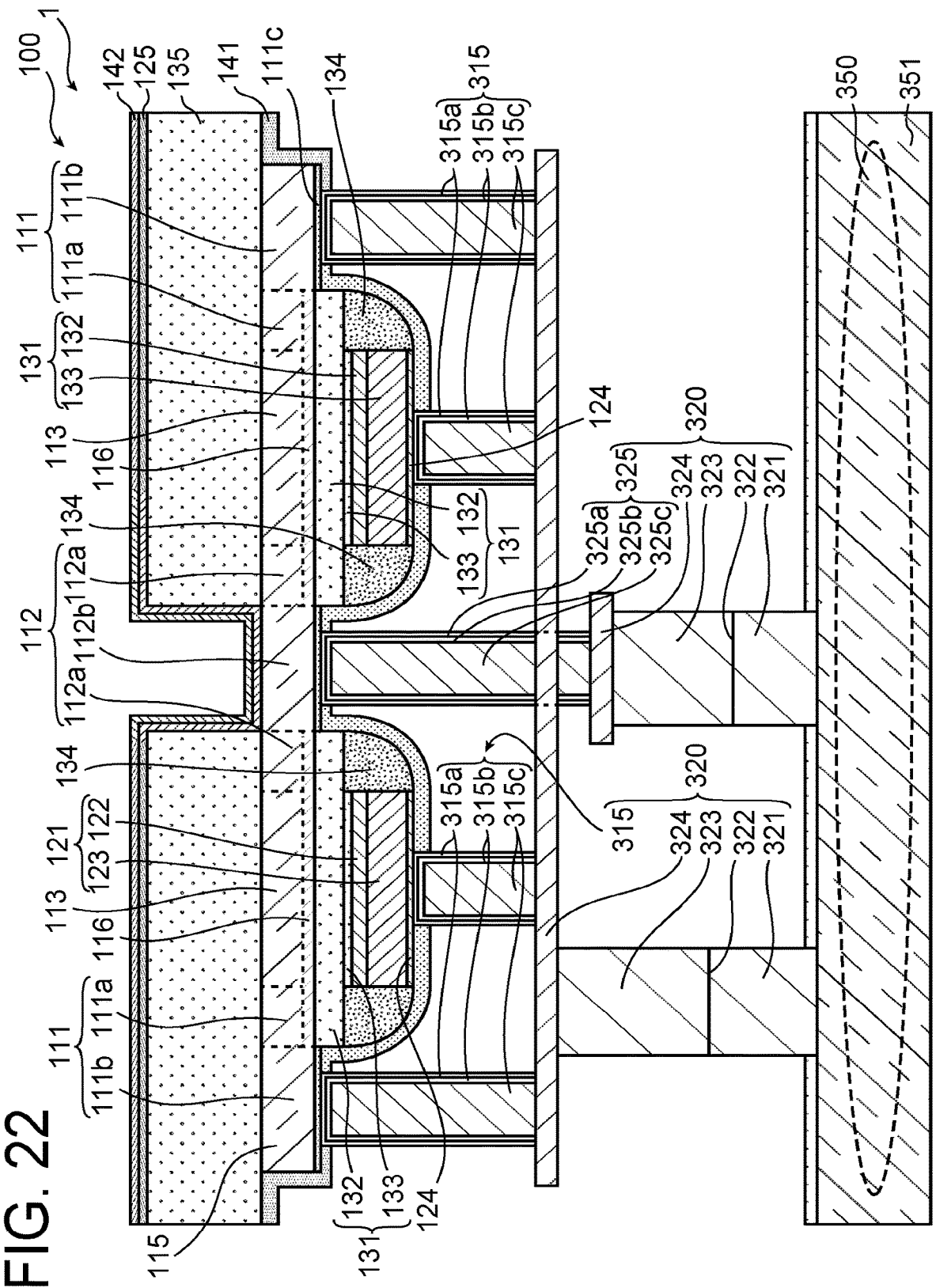
FIG. 22 illustrates a component according to a sixth embodiment in accordance with the eighth possibility for the invention, FIGS. 23A and 23B respectively illustrate a cross-section view of a component according to a seventh embodiment in accordance with the ninth possibility for the invention and a view from below of that same component, said view showing the contact tracks enabling the biasing of the source and drain zones and of the first and second gate electrodes, FIGS. 24A to 24C respectively illustrate a first and a third specific step of a method for manufacturing a detection component according to the seventh embodiment. Parts that are identical, similar or equivalent of the various drawings bear the same numerical references so as to facilitate the passage from one drawing to the other.

FIG. 22 illustrates a detection component 1 according to a sixth embodiment in accordance with the eighth possibility for the invention.

Thus a detection device 1 according to the sixth embodiment is distinguished from a detection device 1 according to the third embodiment in that the channel zone 113 has the first conductivity type, that is to say, in this fourth embodiment, N-doping, and in that the supply circuit is configured to supply the detection structure 100 in accordance with the eighth possibility for the invention.

Thus, as FIG. 22, shows, in this sixth embodiment, the first connection part is quadrupled so as to supply voltage to the two source sub-zones 111, the two sub-first gate electrodes 121. As regards the second gate electrode 125, its electrical supply is provided through the drain zone 112.

A method for manufacturing a detection device 1 according to this sixth embodiment is distinguished from a method for manufacturing a detection device 1 according to the second embodiment in that:

at the step of providing the SOI substrate comprising the semiconductor substrate 361, the layer of oxide configured to form the second gate dielectric layer 135 and the first semiconductor layer 115, the first semiconductor layer has the same conductivity type, and at the step of providing the first reading substrate 351, the supply circuit is in accordance with the eighth possibility for the invention.

Seventh Embodiment

Figure 23B:
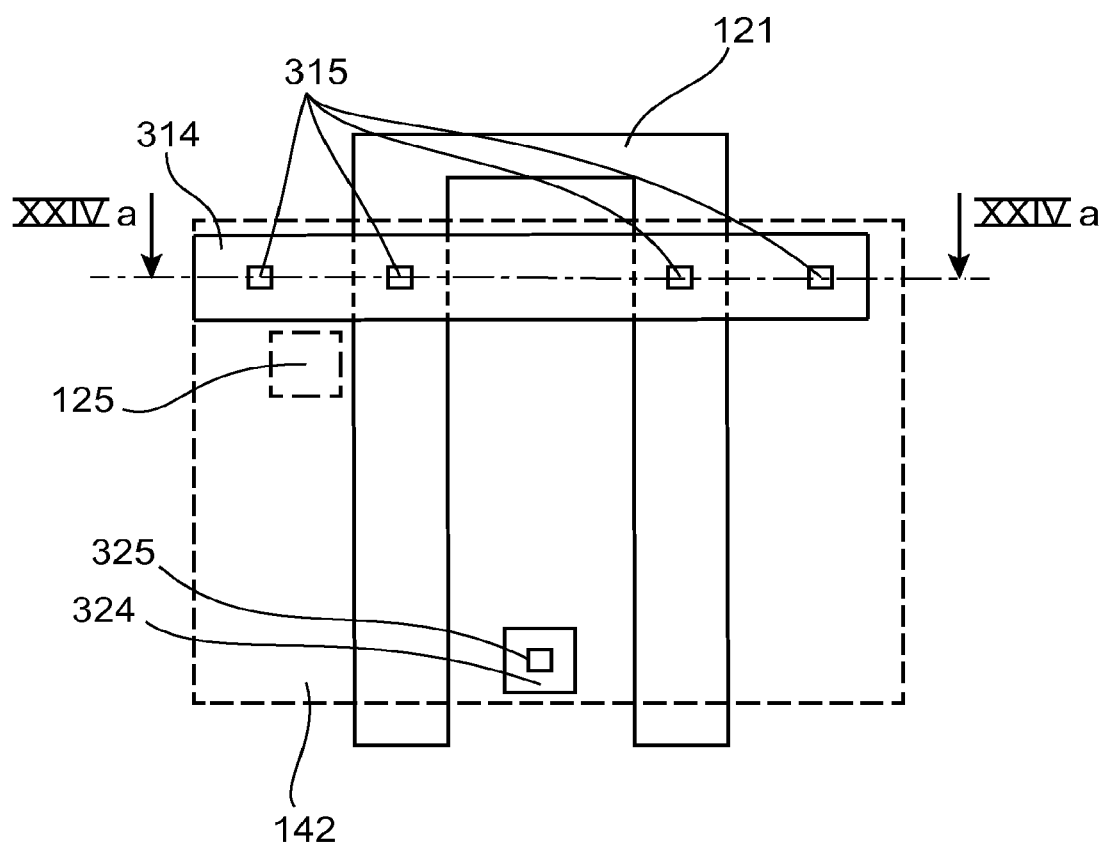

FIGS. 23A and 23B illustrate a detection component 1 according to a seventh embodiment in accordance with the ninth possibility for the invention.

Thus a detection device 1 according to the seventh embodiment is distinguished from a detection device 1 according to the sixth embodiment in that the source sub-zone 111, the first gate electrode 121 and the second gate electrode 122 are short-circuited and in that the supply circuit is configured to supply the detection structure 100 in accordance with the ninth possibility for the invention.

In this seventh embodiment, in the same way as for the sixth embodiment, in order to optimize the ratio of width of the channel zone to length of the channel zone, the detection structure has a central drain zone 112 with on one side a first source sub-zone and channel sub-zone assembly and on the other side a second source sub-zone and channel sub-zone assembly.

The first connection arm 310 has a quadrupled first connection part 315 to enable connection of each of the source sub-zones 111 and of each of the sub-first gate electrodes 121. The second gate electrode 125 extends partly in an opening of the second gate dielectric layer 135 in contact with one of the source sub-zones 111 forming a connection zone for said second gate electrode 125.

Figure 24A:
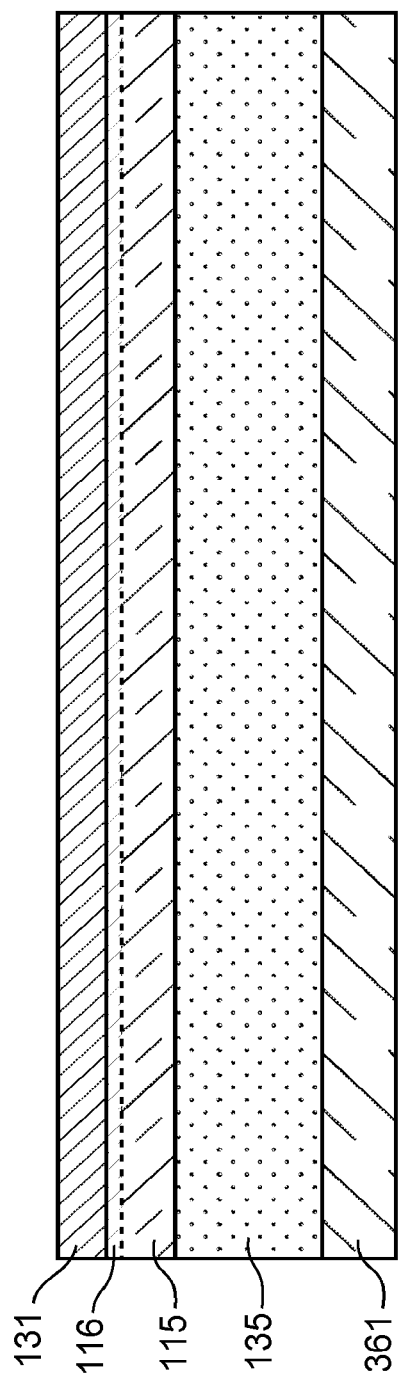
Figure 24B:
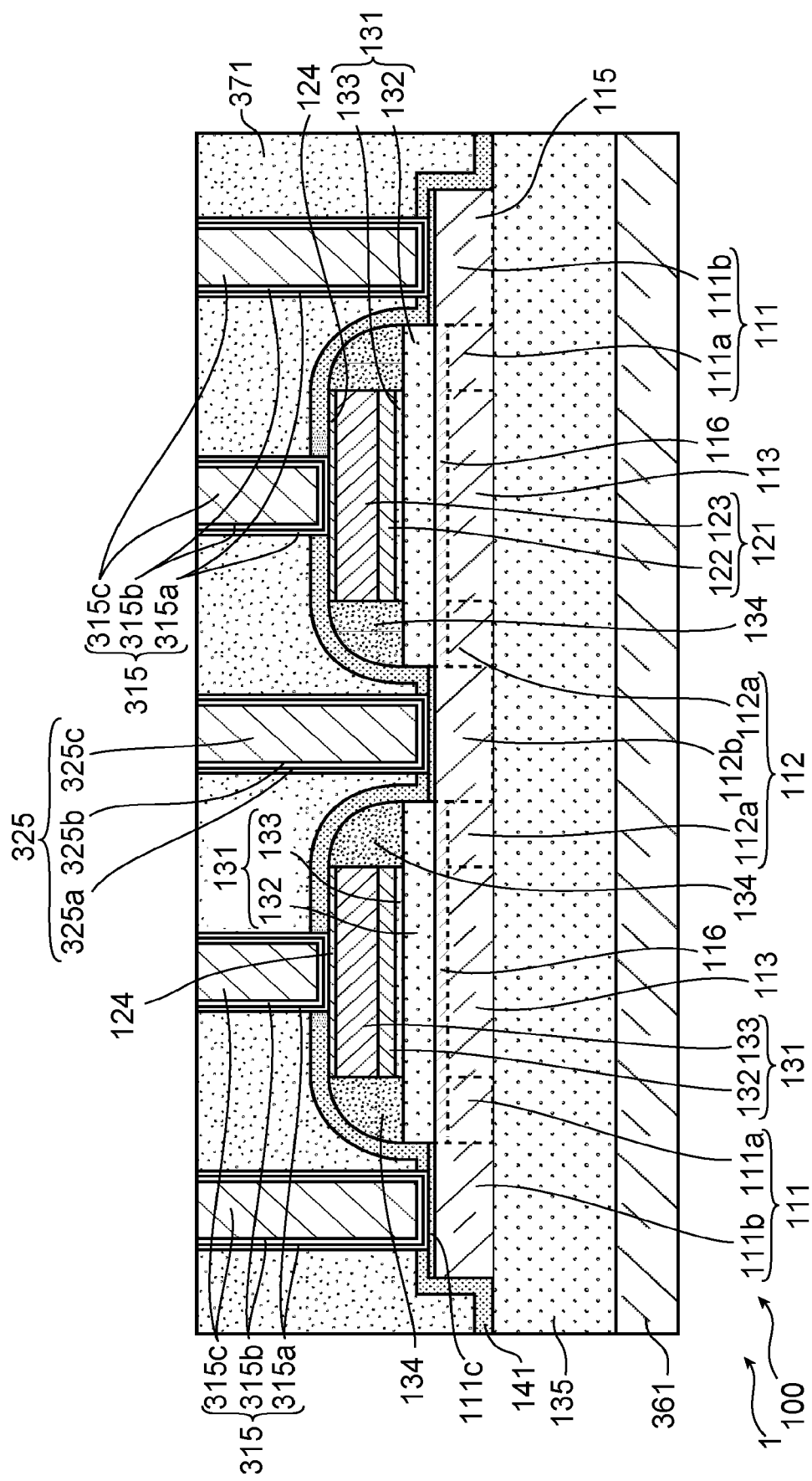
Figure 24C:
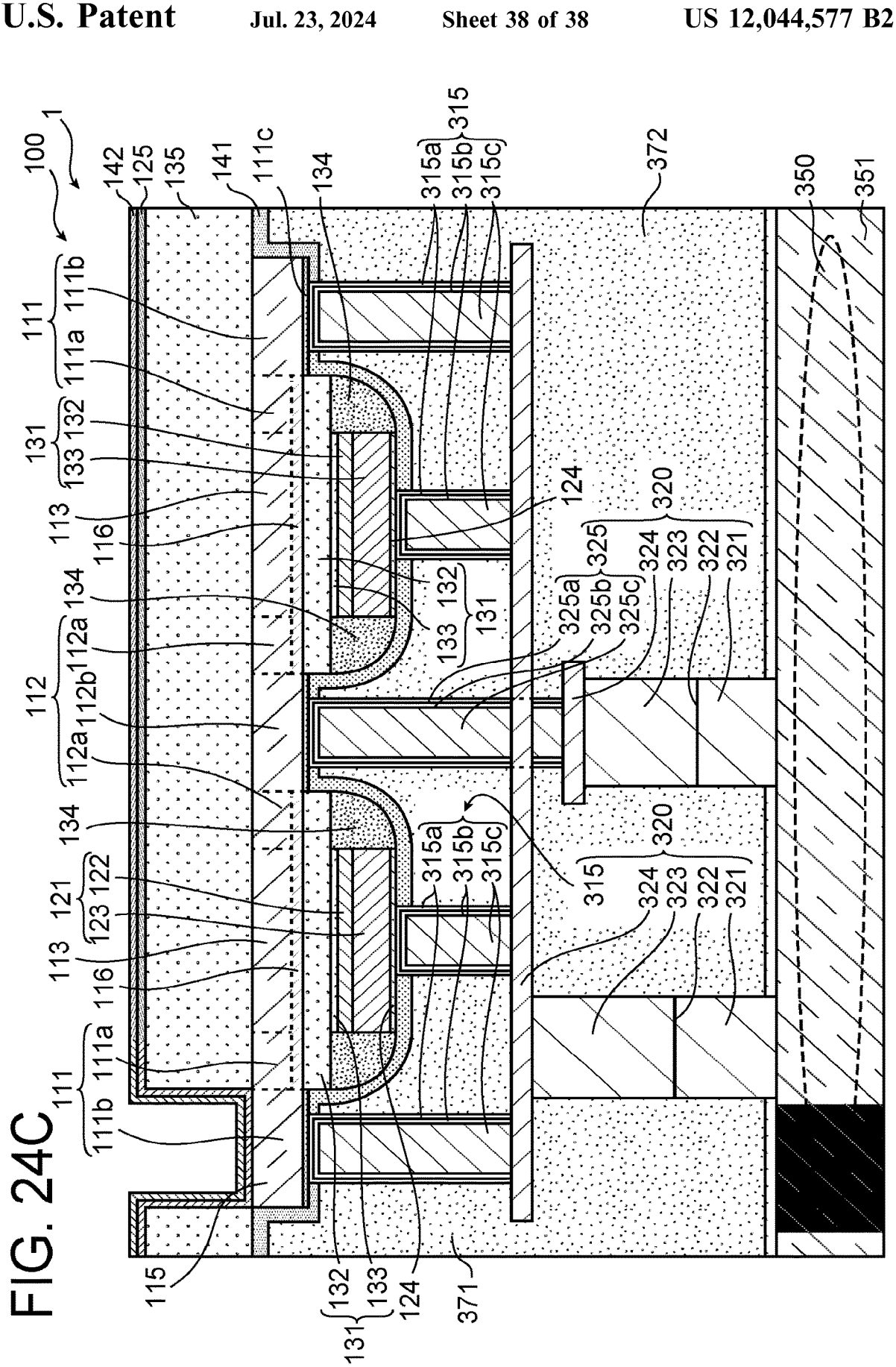

The method for manufacturing a detection component 1 according to this seventh embodiment is distinguished from a detection component 1 according to the sixth embodiment in that:

the additional implantation step is carried out on a portion 116 of the layer 115 such that a portion 116 of each of the two channel sub-zones 113 which is configured to form the blocking layer 114 has said over-doping, as illustrated in FIG. 24A, at the step of localized etching of the layer of sacrificial material 371 to form a respective opening corresponding to the first part 315, 325 of each connection arm 310, 320, there are provided four openings for the first connection part 315 of the first connection arm 310 opening respectively on each of the source sub-zones 111 and each of the sub-first gate electrodes 121, and a single opening for the first connection part 325 of the second connection arm 320 opening on the drain zone 112, as illustrated in FIGS. 23B and 24B, there is provided a step of forming an opening in the second gate dielectric layer 135 to enable making contact between the second gate electrode and one of the source sub-zones 111 the second gate electrode 125 and a single opening for the first connection part 325 of the second connection arm 320 opening on the drain zone 112, as illustrated in FIG. 24B, at the step of forming the second thermal insulation parts 314, 324 of the connection arms 310, 320 in accordance with the teaching of document U.S. Ser. No. 16/334, 109, only the second thermal insulation parts 314, 324 of the first and second connection arms 310, 320 are formed, the second thermal insulation part 314 of the first connection arm 310 being in contact with each element of the first connection part 315 of the first connection arm 310, as illustrated in FIG. 24C, at the step of providing the reading substrate 351, the supply circuit 350 only comprises a first and a second supply zone and is in accordance with the ninth possibility for the invention.

Such a seventh embodiment, in identical manner to the third and sixth embodiments, is in particular provided in order to illustrate the possibility of optimizing the ratio of width of the channel zone/to length of the channel zone in the context of the invention by providing a transistor with channel multi-zones or multi-gates or for instance having a "multiple-tooth comb" gate, the structure having, in the present embodiment, two channel sub-zones 113. According to the same principle and as already presented in connection with FIG. 9B, it can perfectly well be envisioned, without departing from the scope of the invention, to provide a detection component 1 having a number of channel sub-zones 113 greater than 2, for example 3, as illustrated in FIG. 9B, or even 4 or even 7 channel sub-zones 113. Such a configuration is also known under the designation "multiple-tooth comb" gate.

Of course, although in the present possibilities for the invention, embodiments and variants of the embodiments, it has been chosen to describe detection structures of which the first conductivity type is a conductivity type in which the electrons are the majority carriers, in other words corresponding to N-doping, it may also perfectly well be envisioned, without departing from the scope of the invention, for the first conductivity type to be a conductivity type in which the holes are the majority carriers, in other words constituting P-doping, without departing from the scope of the invention. The person skilled in the art is as a matter of fact capable, merely from routine tests, of extrapolating the present teaching for such a configuration which is equivalent.

Moreover, although in the context of the second, third, fifth, sixth and seventh embodiments, the "pre-biasing" provided either by an electrostatic dipole, or by over-doping, is directed to forming the blocking layer at the location of the first face of the channel zone, it can of course also be envisioned, with the departing from the scope of the invention, to use such "pre-biasing" for forming the blocking layer at the location of the second face of the channel zone.

The invention claimed is:

1. A component for detecting electromagnetic radiation comprising a detection structure and a supply circuit for said detection structure, the detection structure comprising:

at least one absorbent element configured to absorb the electromagnetic radiation, and a transistor associated with the absorbent element for detecting a rise in temperature of said absorbent element when electromagnetic radiation is absorbed, the transistor comprising:

at least one first semiconductor zone, referred to as source zone, and at least one semiconductor second zone, referred to as drain zone, each having a first type of conductivity, at least one third semiconductor zone, referred to as channel zone, separating the source zone and the drain zone from one another, having a first and a second face which are opposite faces, the first and second faces extending between the source zone and the drain zone, a first gate electrode arranged opposite the first face of the channel zone and configured to bias the channel zone, said first gate electrode being separated from the channel zone by a first gate dielectric layer, and a second gate electrode arranged opposite the second face of the channel zone and configured to bias the channel zone, said second gate electrode being separated from the channel zone by a second gate dielectric layer, wherein the supply circuit is configured to electrically supply each of the source zone, the drain zone, and the first and second gate electrodes of the detection structure by being connected to the source and drain zones, wherein the supply circuit is configured to supply the detection structure in operation such that the channel zone has at a location of one of the first and the second face a blocking layer in which carriers of a second type of conductivity opposite to the first type of conductivity are preponderant.

2. The component according to claim 1, wherein the second gate dielectric layer has a thickness comprised between 10 and 150 nm.

3. The component according to claim 1, wherein at least one of the first and of the second gate dielectric layer comprises a first and a second sub-layer of respectively a first and a second dielectric material able to form an electrostatic dipole, the first and second materials being respectively silicon dioxide and alumina.

4. The component according to claim 1, wherein the channel zone comprises in a portion provided to form the blocking layer a concentration of doping elements greater than a rest of the channel zone.

5. The component according to claim 3, wherein the source zone and the first gate electrode are short-circuited.

6. The component according to claim 5, wherein the drain zone and the second gate electrode are short-circuited.

7. The component according to claim 5, wherein the channel zone is of the first conductivity type, the blocking layer being an inversion layer, and wherein the second gate electrode is short-circuited with the first gate electrode and with the source zone.

8. The component according to claim 1, wherein the channel zone has the second conductivity type, the blocking layer being an accumulation layer.

9. The component according to claim 1, wherein the channel zone is of the first conductivity type, the blocking layer being an inversion layer.

10. The component according to claim 1, wherein the at least one absorbent element comprises at least one of:
at least one portion of the first gate electrode,
at least one portion of the second gate electrode, and
at least one conducting track connecting the detection structure and the supply circuit.

11. A method for manufacturing a component for detecting electromagnetic radiation, comprising:
providing a detection structure, the detection structure comprising:
at least one absorbent element configured to absorb the electromagnetic radiation, and
a transistor associated with the absorbent element for detecting a rise in temperature of said absorbent element when the electromagnetic radiation is absorbed, the transistor comprising:
at least one first semiconductor zone, referred to as source zone, and at least one second semiconductor zone, referred to as drain zone, having a first type of conductivity,
at least one third semiconductor zone, referred to as channel zone, separating the source zone and the drain zone from one another, having a first and a second face which are opposite faces and extending between the source zone and the drain zone,
a first gate electrode arranged opposite the first face of the channel zone and configured to bias the channel zone, and
a second gate electrode arranged opposite the second face of the channel zone and configured to bias the channel zone,
providing a supply circuit configured to electrically supply each of the source zone, the drain zone, and the first and second gate electrodes of the detection structure,
connecting the detection structure with the supply circuit, the connecting being either independent of providing the detection structure and of providing the supply circuit or concomitant with at least one of these, and
wherein the supply circuit is configured to supply the detection structure in operation such that the channel zone has at a location of one of the first and the second face a blocking layer in which carriers of a second type of conductivity opposite to the first type of conductivity are preponderant.

12. The component according to claim 2, wherein the second gate dielectric layer has a thickness comprised between 30 and 70 nm.

13. The method according to claim 11, wherein the step of providing the detection structure comprises forming at least one of a first and a second gate dielectric layer wherein said first and second gate dielectric layers comprise a first and a second sub-layer of respectively a first and a second dielectric material able to form an electrostatic dipole between them, the first and second materials respectively being silicon dioxide and alumina.

14. The method according to claim 11, wherein providing the detection structure comprises doping the channel zone so as to form a portion of the channel zone, provided for forming the blocking layer, with a higher concentration of doping elements than a rest of the channel zone.

15. The method according to claim 13, wherein one of forming the detection structure and connecting the detection structure with the supply circuit comprises placing the source zone and the first gate electrode in short-circuit.

16. The method according to claim 15, wherein one of forming the detection structure and connecting the detection structure with the supply circuit comprises placing the drain zone and the second gate electrode in short-circuit.

* * * * *